(12) United States Patent
Abedi

(10) Patent No.: US 8,422,453 B2
(45) Date of Patent: Apr. 16, 2013

(54) COMMUNICATION SYSTEMS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 948 days.

(21) Appl. No.: 12/335,848

(22) Filed: Dec. 16, 2008

(65) Prior Publication Data

US 2009/0163221 A1 Jun. 25, 2009

(30) Foreign Application Priority Data

Dec. 21, 2007 (GB) .................................. 0725053.3

(51) Int. Cl.
*H04W 4/00* (2009.01)

(52) U.S. Cl.
USPC .................. 370/330; 370/349; 455/452.1

(58) Field of Classification Search .................. 370/330, 370/349; 455/452.1
See application file for complete search history.

(56) References Cited

U.S. PATENT DOCUMENTS

| | | | | |
|---|---|---|---|---|
| 5,675,629 A | * | 10/1997 | Raffel et al. | 455/552.1 |
| 5,732,077 A | * | 3/1998 | Whitehead | 370/349 |
| 6,223,041 B1 | | 4/2001 | Egner et al. | |
| 2003/0210665 A1 | * | 11/2003 | Salmenkaita et al. | 370/330 |
| 2005/0037763 A1 | * | 2/2005 | Hamamoto et al. | 455/447 |
| 2005/0164701 A1 | | 7/2005 | Karabinis et al. | |
| 2010/0105406 A1 | * | 4/2010 | Luo et al. | 455/452.2 |

FOREIGN PATENT DOCUMENTS

| | | |
|---|---|---|
| EP | 1 257 092 | 11/2002 |
| GB | 2 234 142 | 1/1991 |
| JP | 2003-032268 | 1/2003 |
| JP | 2003-134133 | 5/2003 |
| JP | 2007-318235 | 12/2007 |
| WO | 01/17311 | 3/2001 |
| WO | 01/56318 | 8/2001 |
| WO | 01/56318 | 8/2008 |

OTHER PUBLICATIONS

UK Intellectual Property Office Search Report for corresponding Application No. GB0725053.3, date of search Apr. 19, 2008.
Extended European Search Report with Annex for corresponding European Patent Application No. 08171672.2, dated Oct. 9, 2009.
Kari Hooli, et al.; "IST-2003-507581 WINNER D6.1—WINNER Spectrum Aspects: Methods for efficient sharing, flexible spectrum use and coexistence"; IST-WINNER, [Online] Oct. 30, 2004, pp. 1-88;XP002547211; Retrieved from the Internet: URL:http://www.ist-winner.org/DeliverableDocuments/D6.1v1.1.pdf>; [retrieved on Sep. 23, 2009] * p. 31-p. 46** p. 65-p. 66 * [Ref.: ESR dated Oct. 9, 2009].

(Continued)

*Primary Examiner* — Phuc Tran
(74) *Attorney, Agent, or Firm* — Myers Wolin, LLC

(57) ABSTRACT

A spectrum-assignment method for use in a wireless communication system, the system comprising at least first and second communication apparatuses each having a portion of communication spectrum pre-assigned to it for communication, the method comprising: on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between the first and second communication apparatuses.

27 Claims, 53 Drawing Sheets

OTHER PUBLICATIONS

Matthew M-L Cheng et al; "Distributed Measurement-based Dynamic Channel Assignment for Personal Communications"; Jul. 25, 1995; Vehiclular Technology Conference, 1995 IEEE 45th Chicago, IL, USA Jul. 25-28, 1995, New York, NY, USA, IEEE, US p. 769-773 XP010167046; ISBN: 978-0-7803-2742-9; * abstract * * p. 769, col. 1-col. 2 * * p. 772, col. 1, paragraph D * [Ref.: ESR dated Oct. 9, 2009].

Notification of Reasons for Refusal issued for corresponding Japanese Patent Application No. 2008-323597 mailed Jul. 24, 2012 with English translation.

Notification of Reasons for Refusal issued for corresponding Japanese Patent Application No. 2008-323597, mailed Oct. 16, 2012, with English translation.

* cited by examiner

EXAMPLE SITUATION

- BEFORE RE-ASSIGNMENT

M = 3

- NEGOTIATION STAGE

- AFTER RE-ASSIGNMENT

M = 6

COMMUNICATION SYSTEMS

This application claims priority to United Kingdom Application No. 0725053.3 filed on Dec. 21, 2007, the disclosure of which is expressly incorporated herein by reference in its entirety.

The present invention relates to spectrum assignment, in particular to spectrum-assignment methods for use in wireless communication systems. Wireless communication systems typically comprise communication apparatuses operable to communicate (at the same time) using assigned portions of communication spectrum, the communication spectrum effectively being shared between the apparatuses. The present invention therefore extends to spectrum-assignment methods and to systems and communication apparatuses adapted to carry out part or all of such methods.

Taking radio communication systems as a specific example, communication apparatuses of the system generally communicate (with one another, and/or with other communication apparatuses) using radio transmissions that share the same transmission medium (commonly, the surrounding atmosphere). Although such radio transmissions are normally configured to occupy allocated or assigned frequency bands (or chunks, or blocks), the radio-frequency spectrum is nevertheless shared by such transmissions.

Radio transmissions occupying the same frequency allocations (i.e. the same parts of the shared communication spectrum) can interfere with one another. The level of interference will depend on a number of factors, for example on the power levels of the respective transmissions, and on the relative locations of the transmitters. In fact, many factors have impact on interference.

Considering a mobile telecommunications system comprising base stations (BSs) as an example, these factors include antenna orientation in the BSs, transmission schemes employed (say FDD or TDD) by the BSs, the nature of sectorisation within the cells of the BSs, the power control schemes employed, the handover schemes employed, the nature of traffic being handled by the BSs at each point in time, and the number of active subscribers (e.g. mobile stations, or MSs) assigned to each BS at each point in time. The smart antenna scheme employed in the BSs may also affect interference. Considering the impact of transmission power on interference, it is possible that a BS may be assigned a number of separate spectrum sub-chunks or sub-bands and that it may use different transmission power levels per sub-chunk. These different power levels can affect interference. Another important factor is the interference leakage between two adjacent sub-bands. Although in telecommunications systems the practical solution is to introduce guard bands to reduce such leakage, the arrangements of sub-bands assigned to a BS can nevertheless affect interference. Other important factors regarding interference may be, for example, surrounding atmospheric conditions and the presence or absence of obstructions to signal propagation. The effect of interference can be signal degradation and an overall drop in system performance as a whole, as compared to that in an "interference-free" system. It is therefore desirable to manage resource allocation or assignment in wireless communication systems.

Typically, mobile communication systems, being a type of radio communication system, are implemented as a hierarchical network of apparatuses for the benefit of efficient and scalable system organisation. FIG. 1 is a schematic diagram of an example mobile communication system or mobile communication network 1 useful for appreciating one type of system in which the present invention may be implemented. The network 1 is divided into a number of Radio Access Networks (RANs) 2 which each comprise a Gateway (GW) 4 for the purpose of accessing the RAN 2 from a higher Core Network (CN) 6, typically via an IP network 8. Each RAN 2 typically comprises one or more Base Stations (BSs) 10 connected to the GW 4. Each such BS 10 may transmit (and receive) radio signals to (and from) one or more User Equipments (UEs), within its geographical area of coverage (often referred to as a "cell"). UEs may be referred to as user terminals (UTs), terminal equipments (TEs) or Mobile Stations (MSs).

Communications between the CN 6, GWs 4 and BSs 10 may be across wired communication links (e.g. via fiber-optic links) or across wireless communication links (e.g. across radio or microwave links). Communications between the BSs 10 and the UEs 12 are typically across wireless links, generally employing radio transmissions.

The CN 6 may be distributed, for example across the IP network 8. The IP network 8 may, for example, include the Internet. Although only two RANs 2 are shown in FIG. 1, the network 1 may include any number of such RANs 2. Similarly, each RAN may have any number of GWs 4, BSs 10 and UEs 12. The UEs 12 may be mobile and move from the cell of one BS 10 to that of another BS 10, and even from one RAN 2 to another RAN 2. The BSs 10 may be dedicated to a particular RAN 2, or may be shared between RANs 2 on a temporary or non-temporary basis. One BS 10 may for example serve two RANs 2 at the same time. Although the RANs 2 in FIG. 1 are made up of the same component apparatuses, they may of course be different from one another. Typically, different RANs 2 may be operated by different mobile-network operators. Different RANs 2 and BSs 10 may have separate geographical areas of coverage, or may have partially or fully-overlapping areas of coverage. For example, one RAN 2 may effectively be co-located with another RAN 2.

The sharing of radio frequency spectrum in such networks is of particular concern, given the intense proliferation of UE usage in recent years, and the expected increase in the number of UEs in circulation in the near future. In this respect, the requirements of radio systems are changing. While some systems and mobile operators are starving for more spectrum resources, most of the existing radio spectrum resources remain under-utilised or unused most of the time. In the design of wireless radio infrastructure, it is therefore desirable to attempt to share the already existing spectrum in a way which would ultimately lead to better utilisation, thereby solving the problem of poor utilisation of spectrum in the presence of an increasing demand for wireless connectivity.

According to a first aspect of the present invention, there is provided a spectrum-assignment method for use in a wireless communication system, the system comprising at least first and second communication apparatuses each having a portion of communication spectrum pre-assigned to it for communication, the method comprising: on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses.

According to invention embodiments, spectrum re-assignment between two communication apparatuses is carried out dynamically and in dependence upon both spectrum requirements of the communication apparatuses and on interference expected to result. Such re-assignment is well adapted to modern system requirements and provides a simple framework for practical spectrum re-assignment.

The term dynamic implies at the very least that the method is carried out during run-time of a system and without manual system resetting. The method can take place automatically at appropriate time intervals. More preferably, the method takes place as needed rather than at predetermined or fixed intervals. In either case, the usual time scale for the re-assignment control can be short term, for example every few seconds. However, it may also be long term, for example every couple of minutes, if this time interval for reassessment is suitable for the system in question.

The communication apparatus may be, for example, a base station or a relay station or user equipment, for instance a mobile telephone, personal digital assistant, laptop or PC, or to an RFID tag.

The spectrum assignment method may comprise controlling the re-assignment of spectrum such as a portion of a spectrum band which was pre-assigned to at least one communication apparatus) from that apparatus to at least one other communication apparatus. In other words, where a first spectrum band (or spectrum bands) has been pre-assigned to a first communication apparatus, and a second spectrum band (or spectrum bands) has been pre-assigned to a second communication apparatus, the spectrum assignment process may comprise (for example during negotiations between the first and second apparatuses) controlling the re-assignment, from one of the said apparatuses to the other of the said apparatuses of some or all of the respective first or second pre-assigned spectrum band.

The term "pre-assigned" includes the situation in which the communication apparatus (or cell) to which the spectrum band has been pre-assigned is licensed for operation within that spectrum band. The method may also comprise the actual re-assignment step.

By "spectrum" there may be meant radio frequencies or any other range of frequencies of electromagnetic radiation suitable for communication. For example, the wireless communication system may be a radio access network (RAN) operating within the radio frequency range of the electromagnetic spectrum. Additionally or alternatively, the wireless communications systems may operate within a microwave frequency range, for example.

The term "wireless communication system" may relate to a wireless access network, for example a radio access network (RAN), including all of the elements of the network, for example base stations. It may relate to an RFID tag reader, or to a group of such readers forming a network, possibly including other equipment, e.g. control circuitry.

Preferably, the control of re-assignments is carried out within one of the first and second apparatuses or collectively between the first and second apparatuses. Both of these alternatives allow control by the apparatuses themselves without further entities being involved and advantageously control within one of the apparatuses involves a lower level of communication between the apparatuses and thus lower signalling overheads.

Where both apparatuses are involved in control it can be carried out based on negotiations between the first and second communication apparatuses.

Various indicators indicative of expected interference resulting from re-assignments (and optionally of current interference where necessary) can be appropriate. For example, one said indicator can be based on interference expected to be suffered by one or both of the first and second communication apparatuses. Another such indicator can reflect inflicted interference. Which indicator or indicators to select can depend on the ultimate goal of the re-assignment method, for example whether the goal is maximisation of the benefits for one of the apparatuses or the best situation for both apparatuses.

In preferred embodiments, the method includes identifying a plurality of candidate configurations for such selection, and selecting the configuration to be adopted from the plurality of candidate configurations. Identifying this plurality of candidate configurations allows simplification of the selection process from a large number of alternative configurations. For example candidate configurations may be limited to those that are feasible for the system or deemed appropriate for the system.

The candidate configurations can be found by identifying the plurality of candidate configurations by identifying a first such candidate configuration and identifying the further candidate configuration(s) by carrying out an iterative process on the first candidate configuration.

Selecting can select the first best candidate configuration or consider all of the candidate configurations and selecting the overall best configuration.

Selection of the candidate configuration may be carried out in the first and/or the second communication apparatus, and in the assignee and/or the assignor of the spectrum.

The selection can be based on the expected change in bandwidth for the assignee as well as the interference expected to be suffered by the assignee and or inflicted by the assignee. In a practical realisation of this preferred embodiment, the interference expected to be suffered and inflicted is with respect to the assignor.

Further, the selection can additionally or alternatively be based on the effective change in bandwidth for the assignor and/or the interference expected to be suffered and/or inflicted by the assignor. Again these measures can be implemented practically speaking with respect to the assignee.

Advantageously, the re-assignments are initially prospective assignments and the control includes considering these re-assignments and deciding whether or not they should be approved. For example, for each prospective re-assignment the method can comprise selecting a spectrum configuration to be adopted and deciding whether or not to adopt it. This is likely to be in dependence upon the at least one said indicator and/or by determining whether the selected configuration meets a predetermined requirement.

This decision can be carried out in the assignee of spectrum or in the assignor of spectrum for that re-assignment. This approval decision can be based on the same decision factors for those listed for the candidate configuration selection, but it may be that they are rated differently if the approval decision is on behalf of a different apparatus than the apparatus carrying out candidate configuration selection.

As mentioned above, the spectrum assignment can be at appropriate, fixed or predetermined time intervals or occur as required. In preferred embodiments, the spectrum assignment is carried out in response to a trigger, for example to a request for spectrum from one of the communication apparatuses or an offer of spectrum. In other cases the trigger may be an overload in data or an excessive interference level.

The interference indicator mentioned previously may be obtained by carrying out a measurement or an estimation between the first and second communication apparatuses or by any other suitable means. The indicator may be obtained during a configuration phase or during an operation phase. Where candidate spectrum configurations are considered, the method can comprise obtaining the indicators in respect of each said candidate spectrum configuration. In this case, one interference indicator might be obtained by measurement and the others by estimation based on the initial measurement.

In a second aspect of the present invention there is provided a wireless communication system, comprising: at least first and second communication apparatuses each operable to have a portion of communication spectrum pre-assigned to it for communication; and control means operable, on a dynamic basis, to control re-assignments of said spectrum between the first and second communication apparatuses in dependence upon spectrum requirements of those apparatuses and at least one indicator indicative of interference expected to result from such re-assignments, so as to tend to improve spectrum utilization between those apparatuses.

In a third aspect of the present invention there is provided a communication apparatus for use as a first communication apparatus in a wireless communication system further comprising at least a second such communication apparatus, the communication apparatuses each being operable to have a portion of communication spectrum pre-assigned to it for communication, the claimed first communication apparatus comprising: control means operable, on a dynamic basis and optionally in conjunction with the second communication apparatus, to control re-assignments of said spectrum between the first and second communication apparatuses in dependence upon spectrum requirements of those apparatuses and at least one indicator indicative of interference expected to result from such re-assignments, so as to tend to improve spectrum utilization between those apparatuses.

The control means may be configured as control circuitry in either of these aspects. Such circuitry can include one or more processors, memories and bus lines.

The system and apparatus of the second and third aspects respectively may comprise equivalents of any of the method features of the first aspect.

In a fourth aspect of the present invention there is provided a spectrum-assignment method for use in a first communication apparatus of a wireless communication system further comprising at least a second such communication apparatus, the communication apparatuses each being operable to have a portion of communication spectrum pre-assigned to it for communication, the method comprising: on a dynamic basis and optionally in conjunction with the second communication apparatus, controlling re-assignments of said spectrum between the first and second communication apparatuses in dependence upon spectrum requirements of those apparatuses and at least one indicator indicative of interference expected to result from such re-assignments, so as to tend to improve spectrum utilization between those apparatuses.

The method of this aspect may comprise any of the features of the method of the first aspect where relevant to the first communication apparatus.

In a further aspect, there is provided a computer program which, when run on a computer, causes the computer to perform the method of any one or more of the method aspects.

In a still further aspect, there is provided a computer program which, when loaded into a computer, causes the computer to become the apparatus of any one or more of the system or apparatus aspects.

In a still further aspect, there is provided a computer program of a computer program aspect, carried by a carrier medium.

Preferred features of the present invention will now be described, purely by way of example, with reference to the accompanying drawings, in which:—

Figure 8:
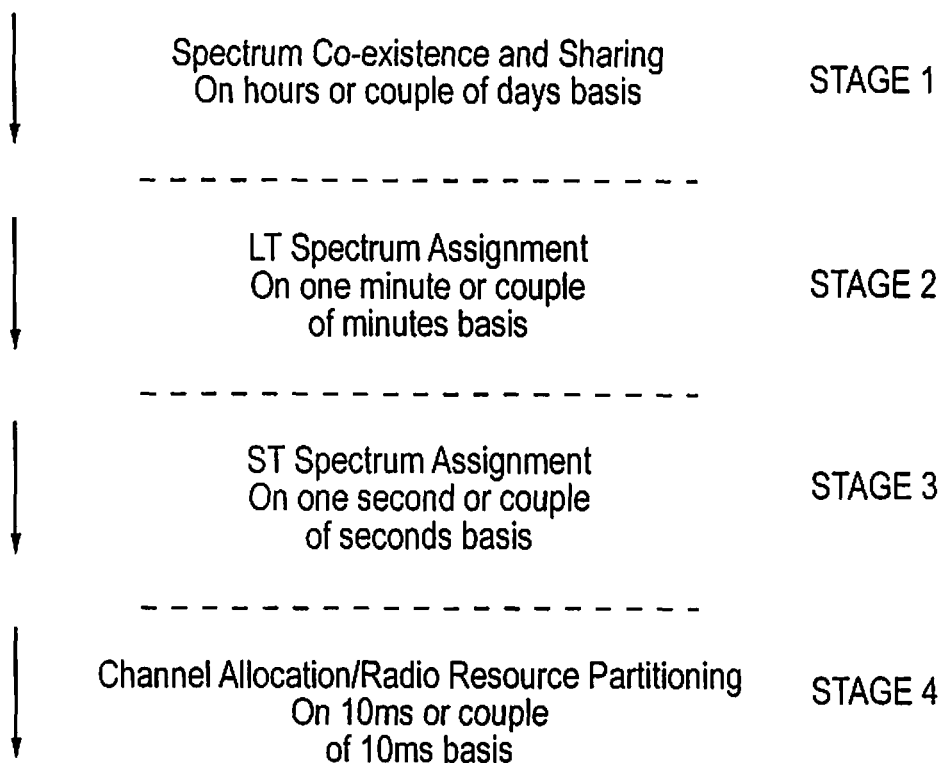
Figure 9:
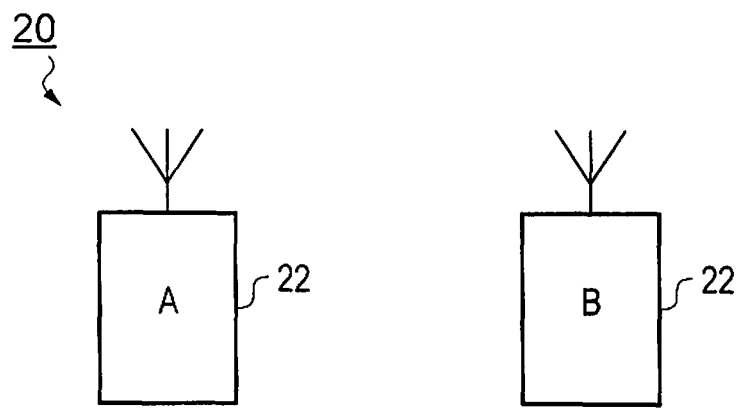
Figure 9:
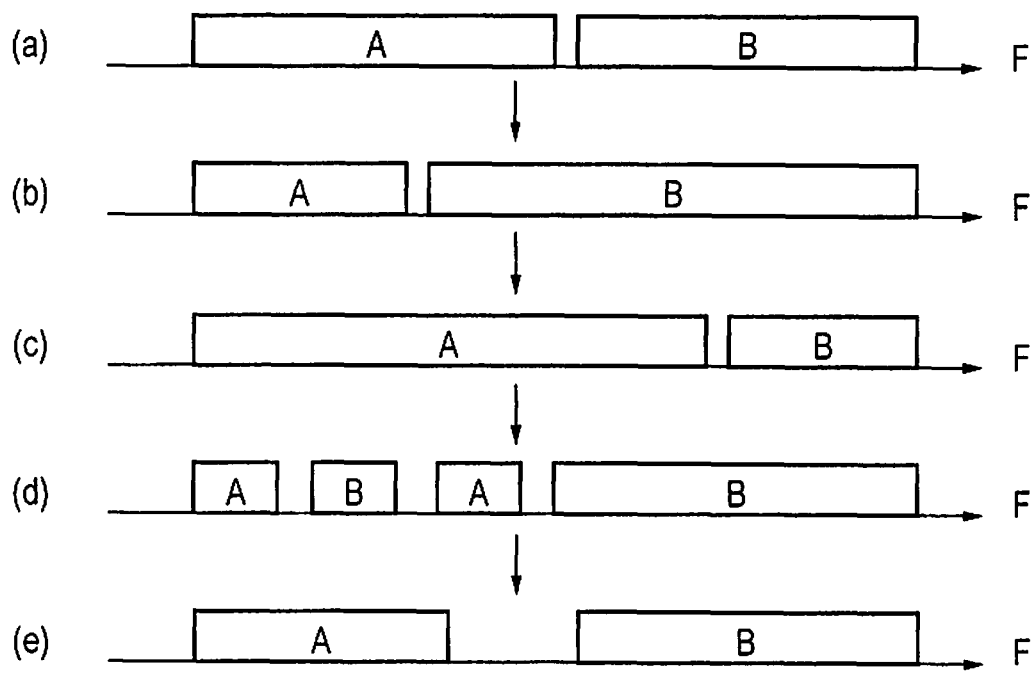
Figure 10:
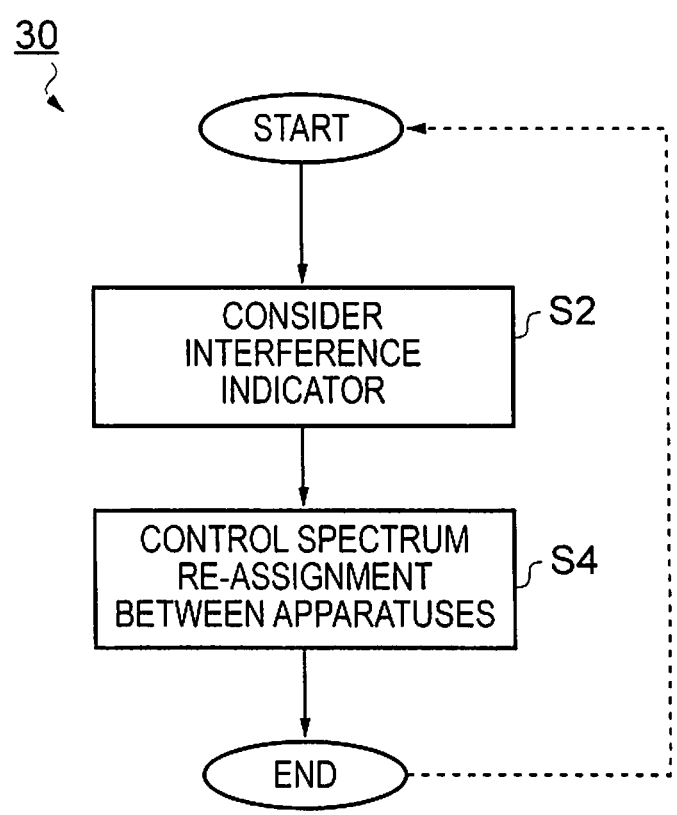
Figure 11:
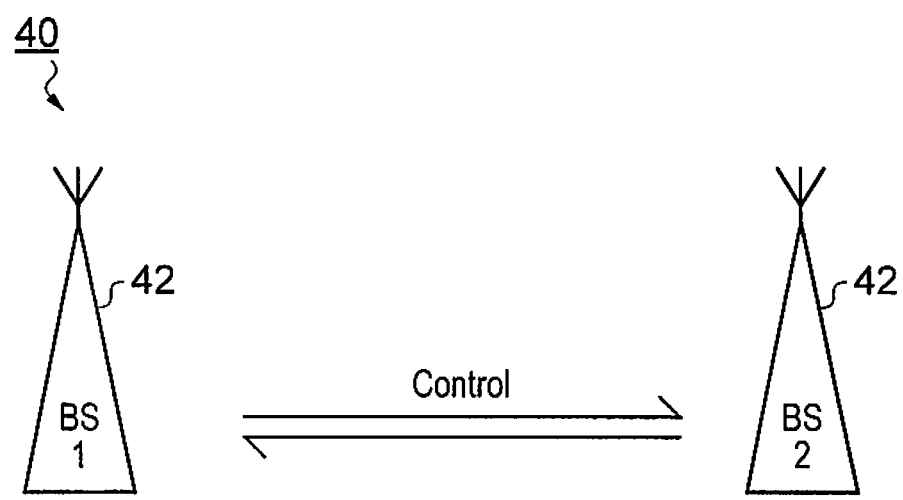
Figure 12A:
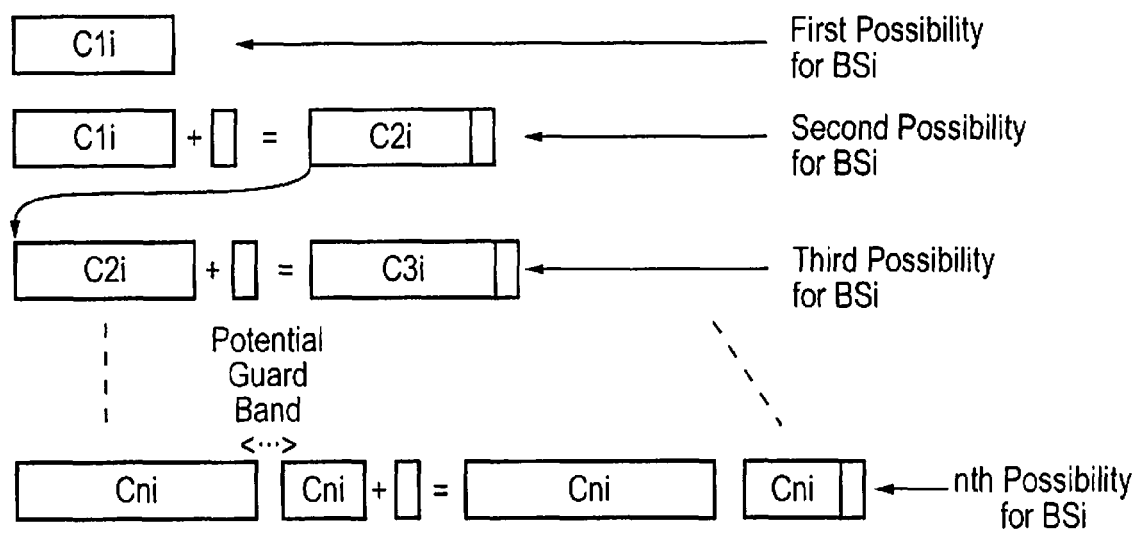
Figure 12B:
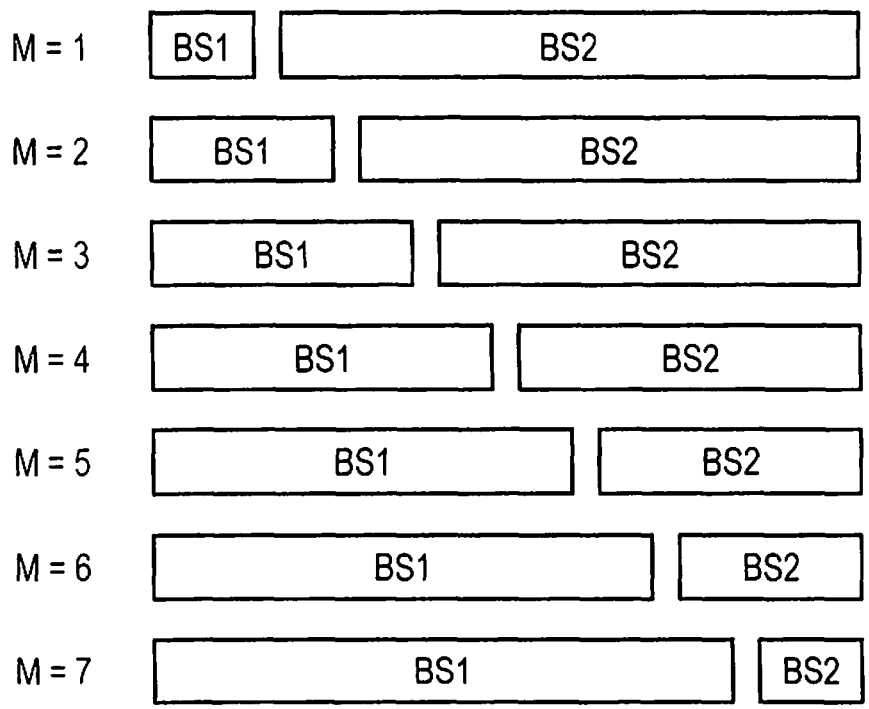
Figure 12C:
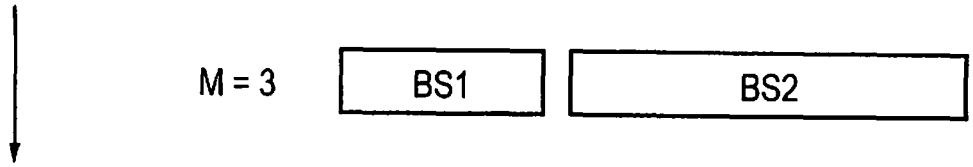
Figure 12C:
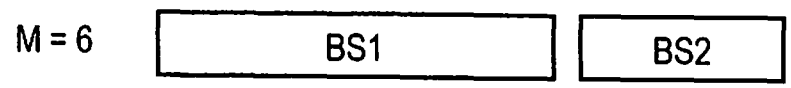
Figure 12D:
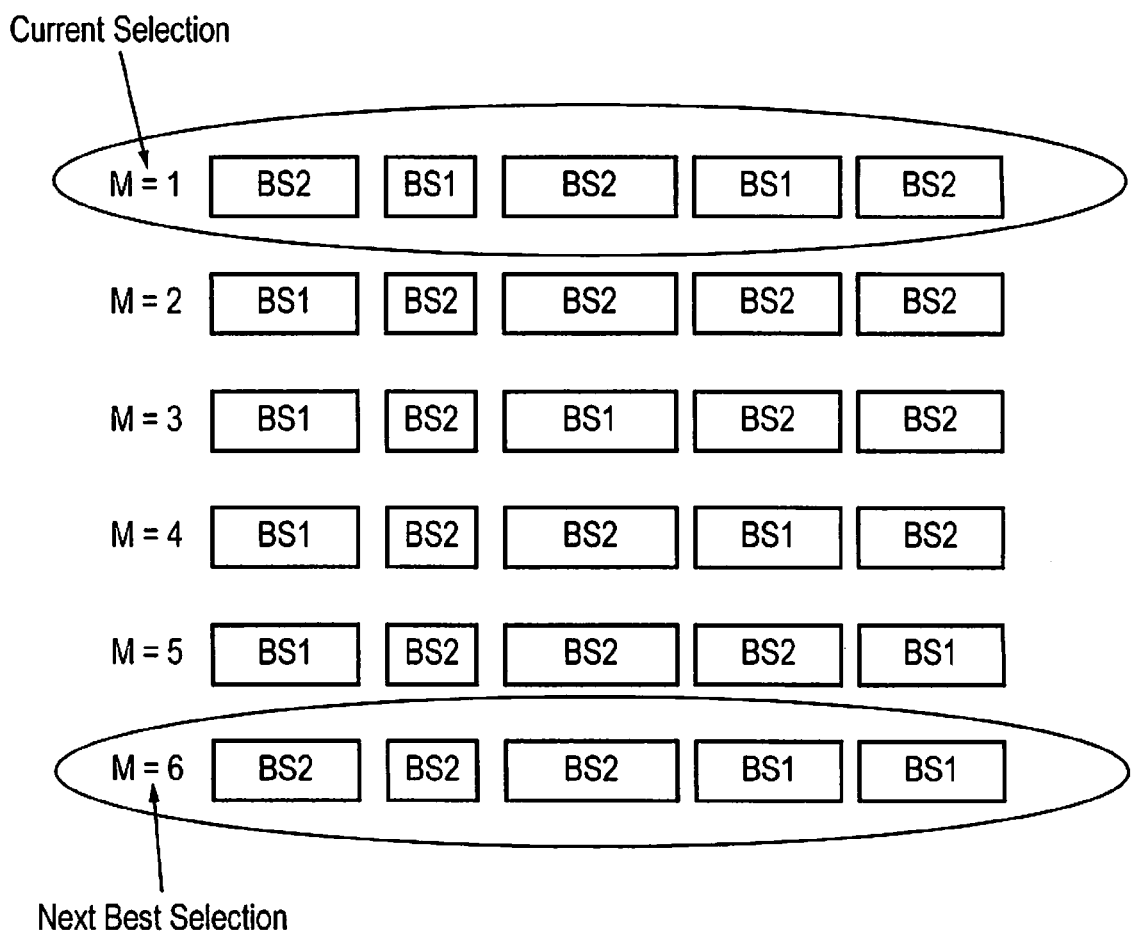
Figure 12E:
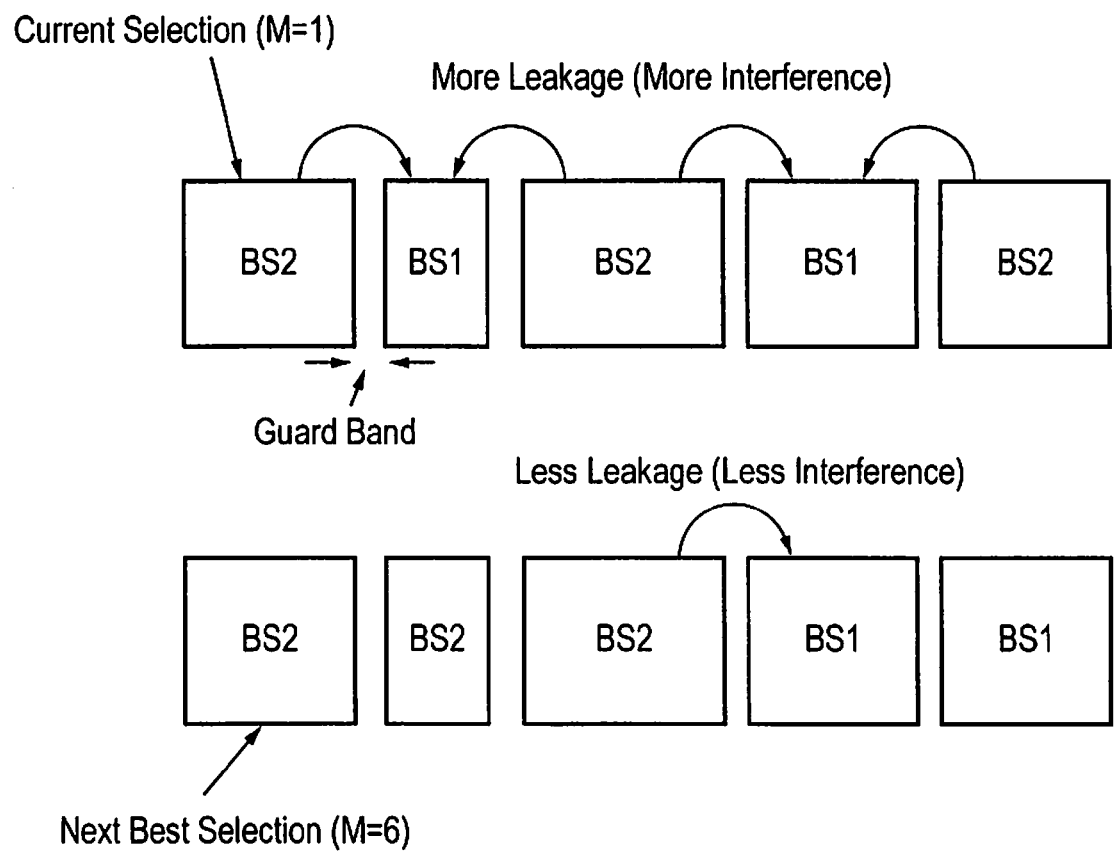
Figure 12F:
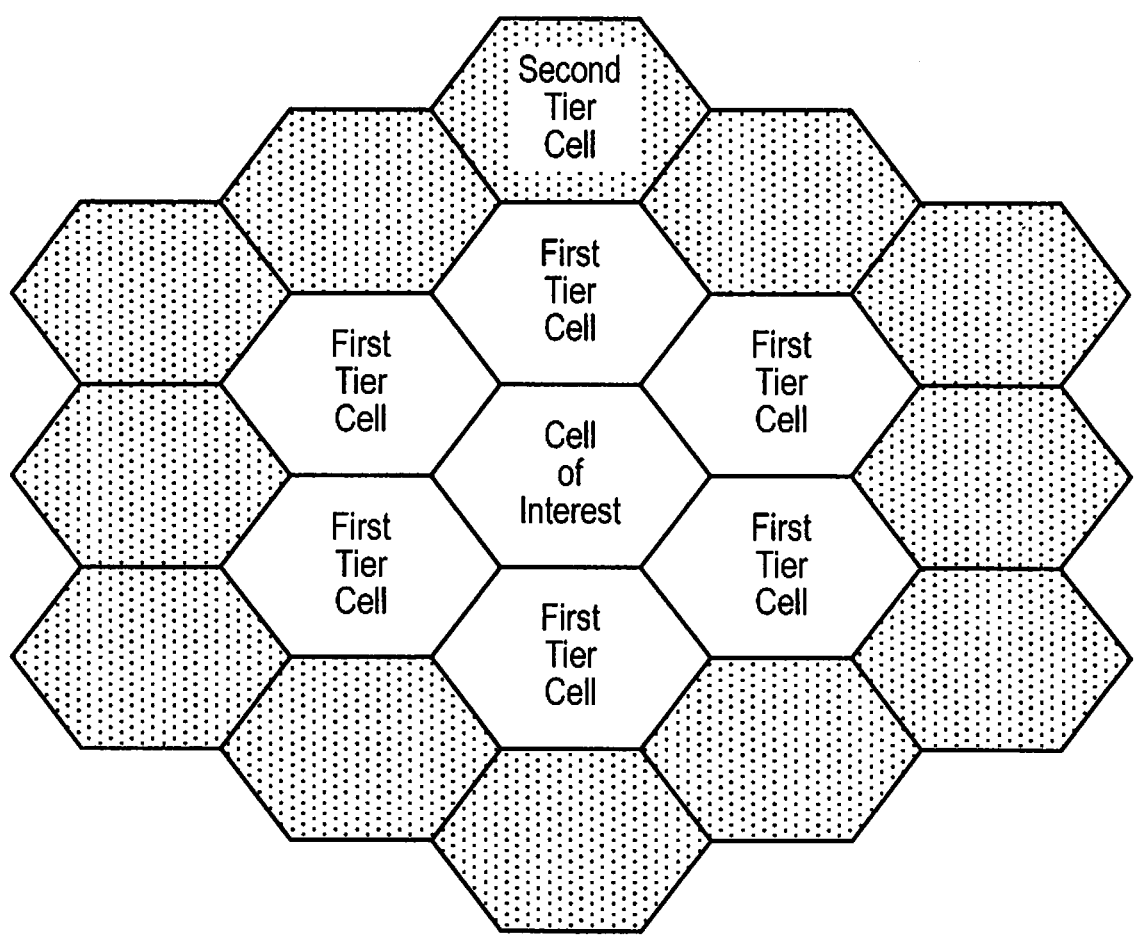
Figure 13:
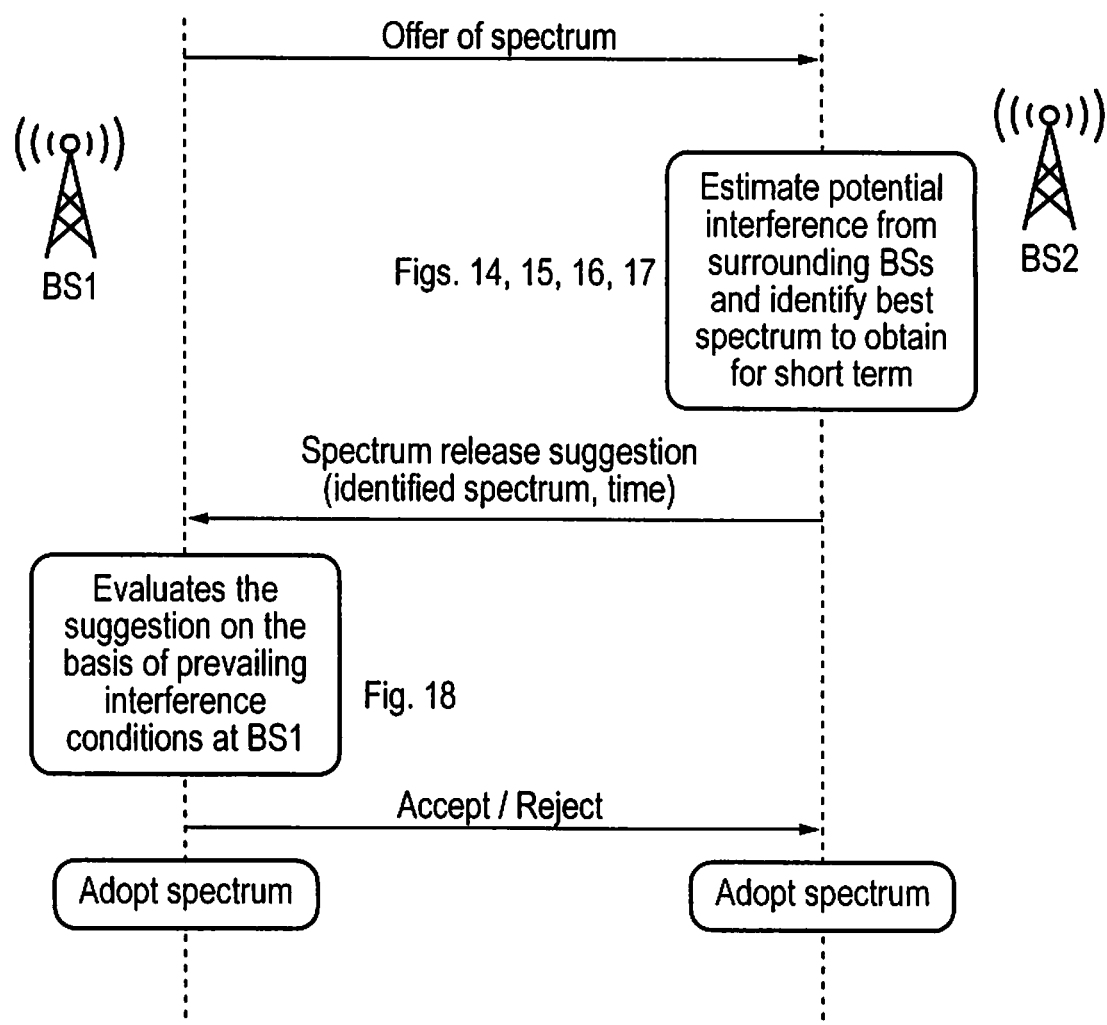
Figure 14:
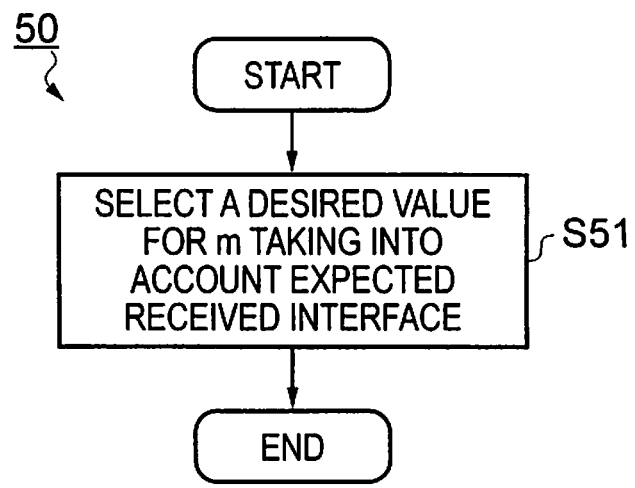
Figure 15:
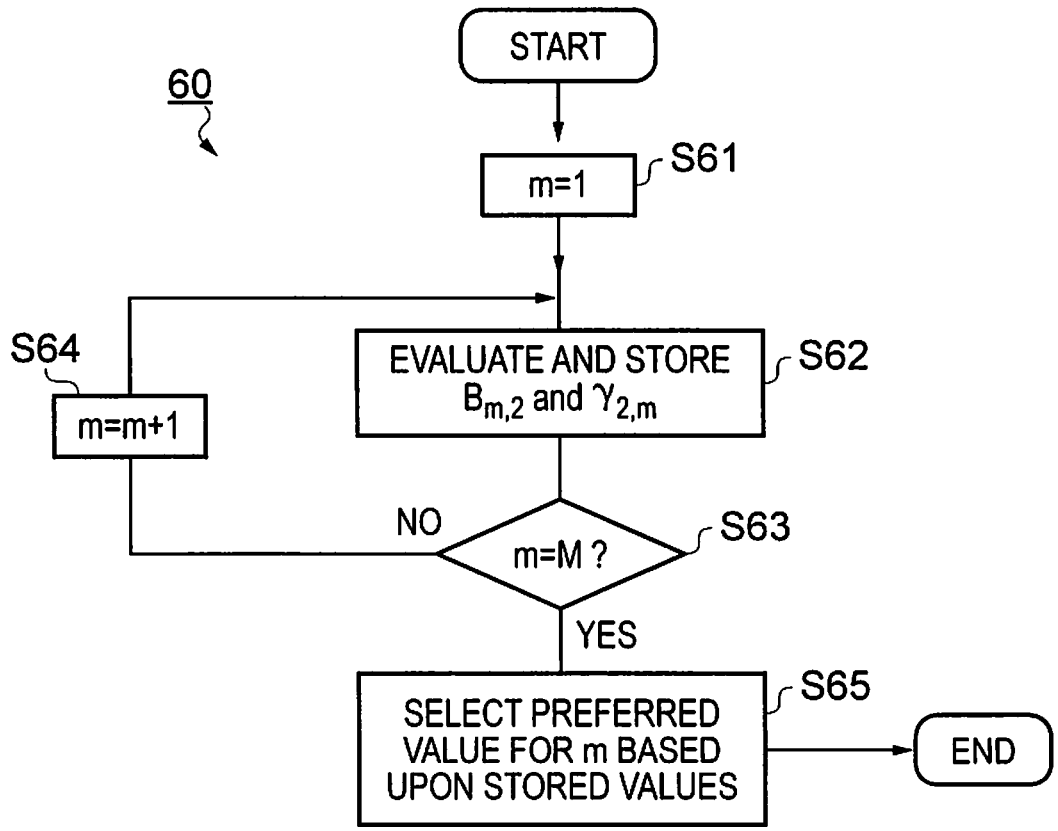
Figure 16:
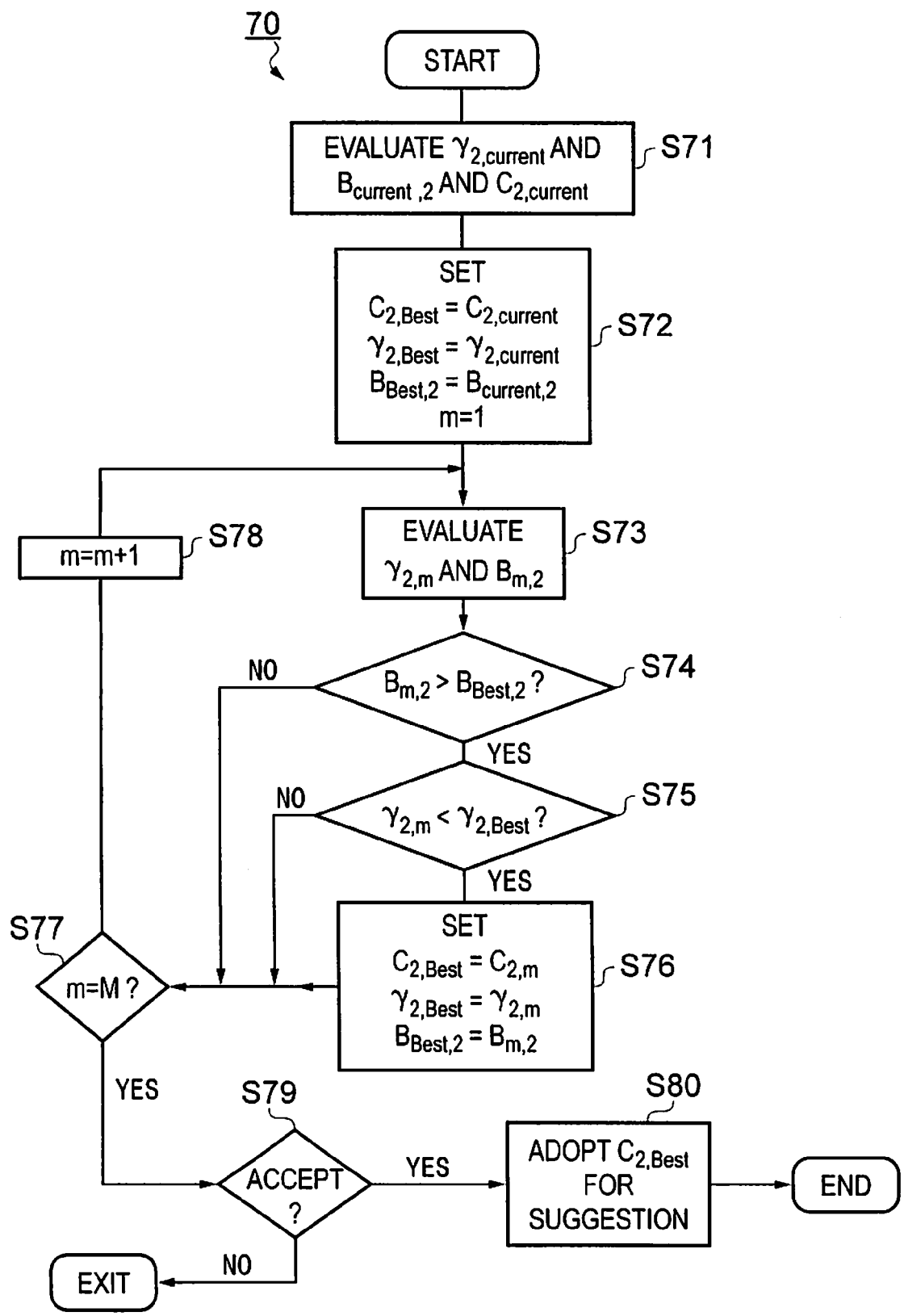
Figure 17:
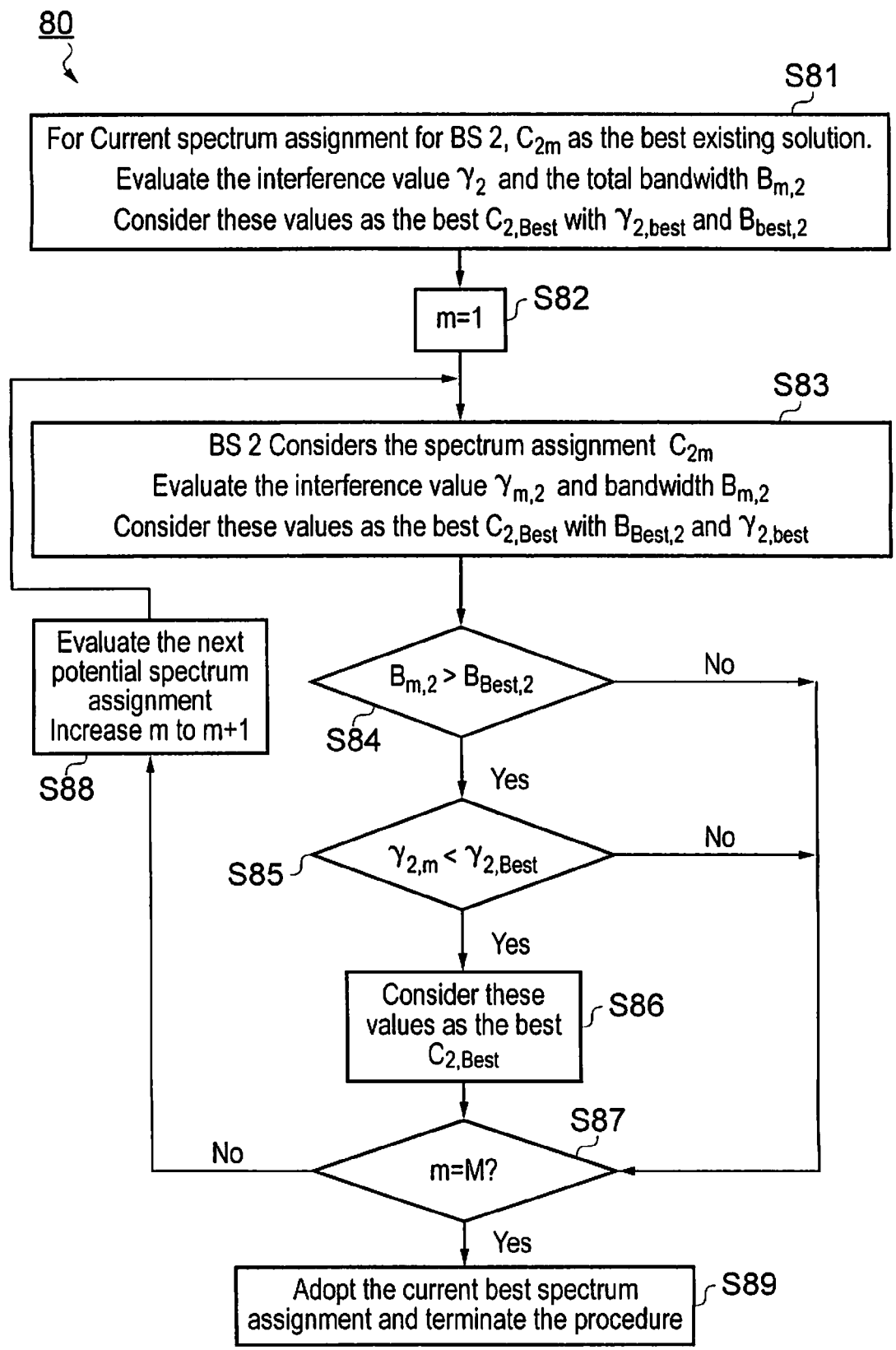
Figure 18:
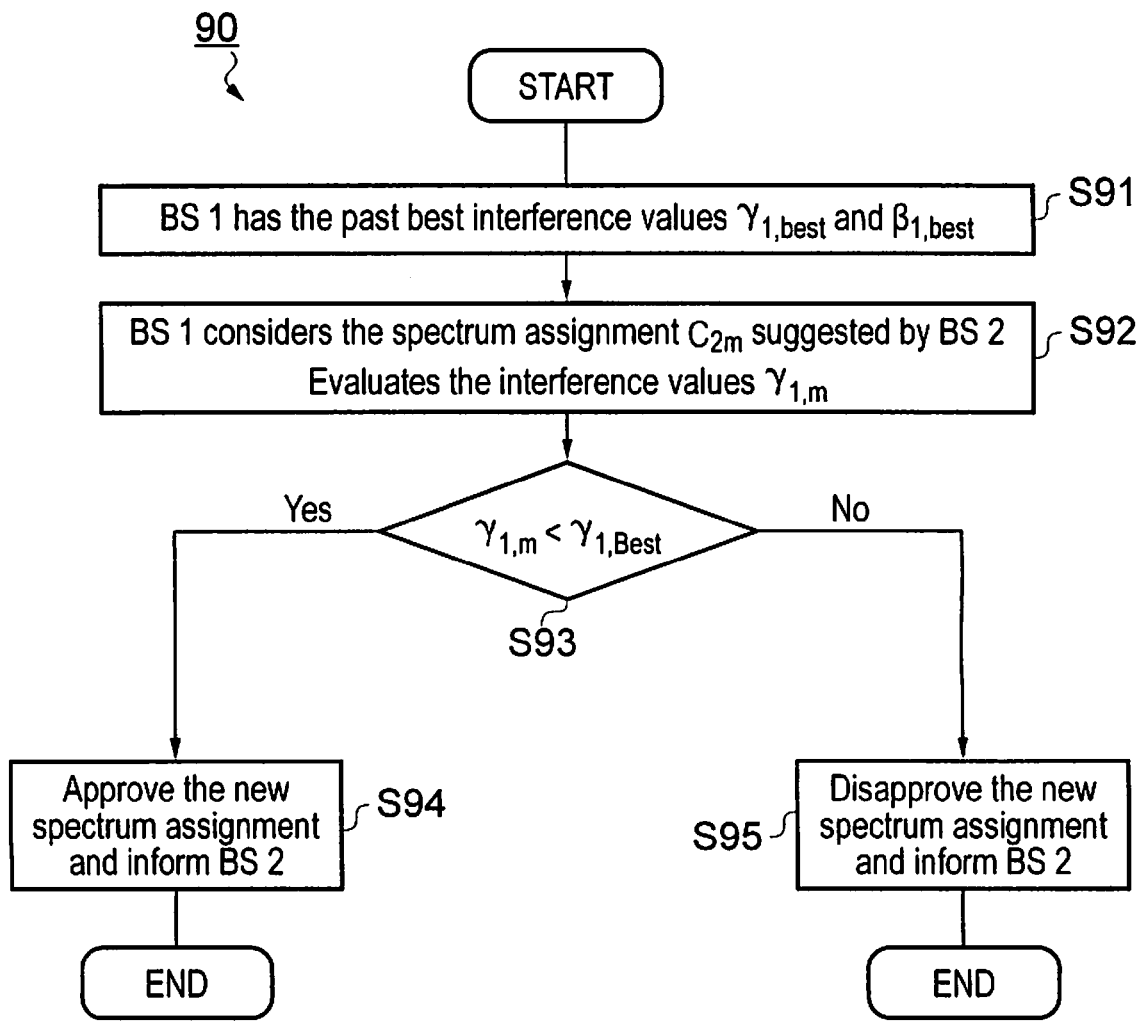
Figure 19:
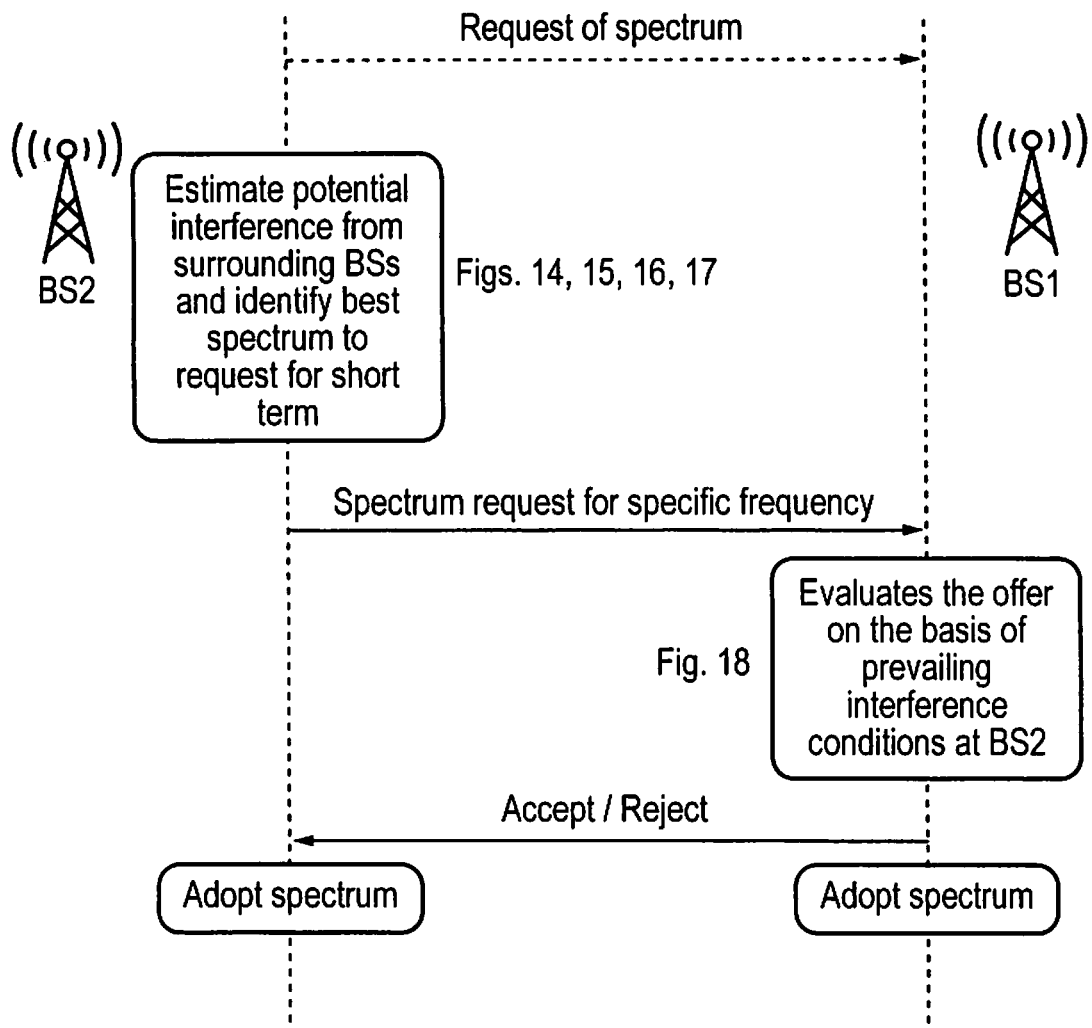
Figure 20:
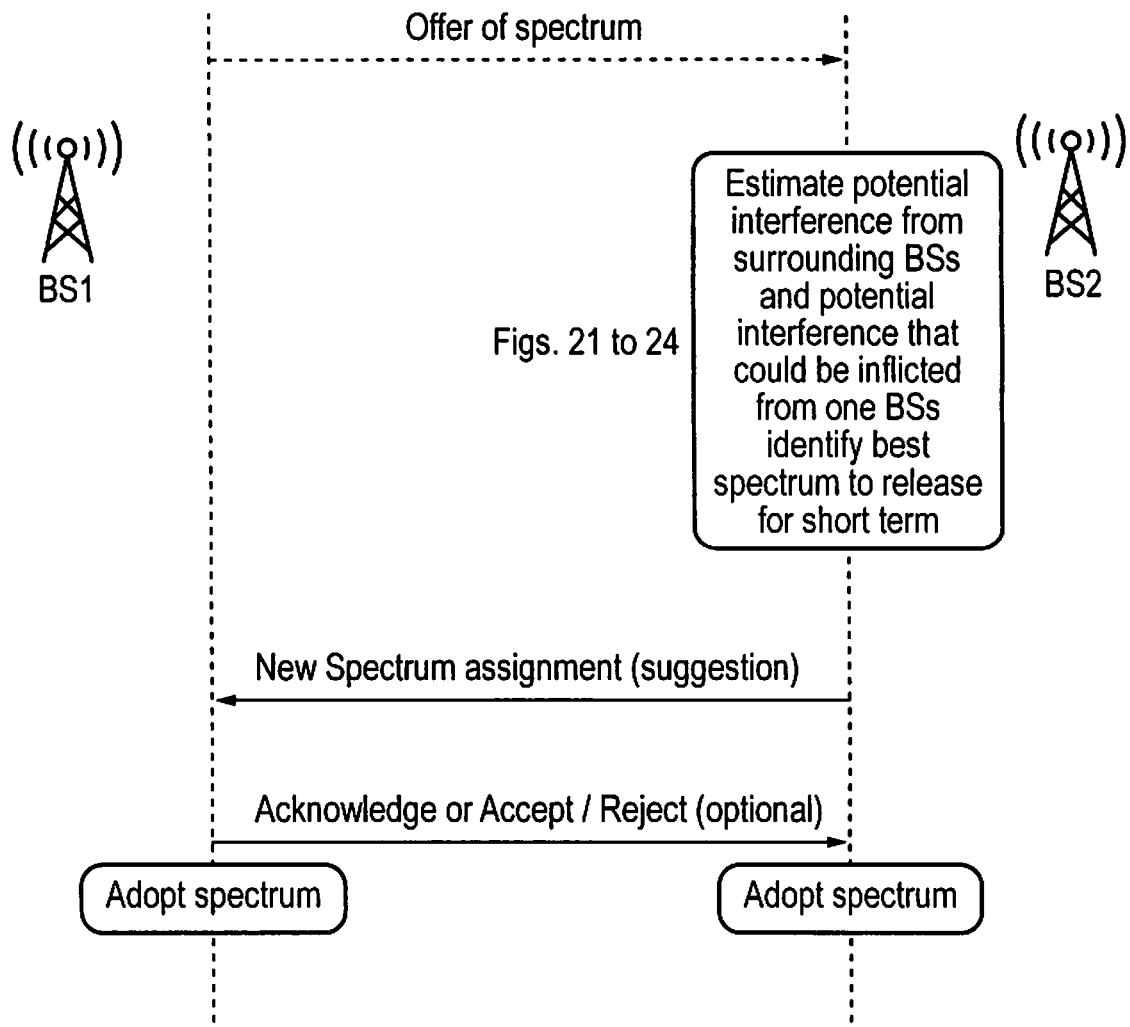
Figure 21:
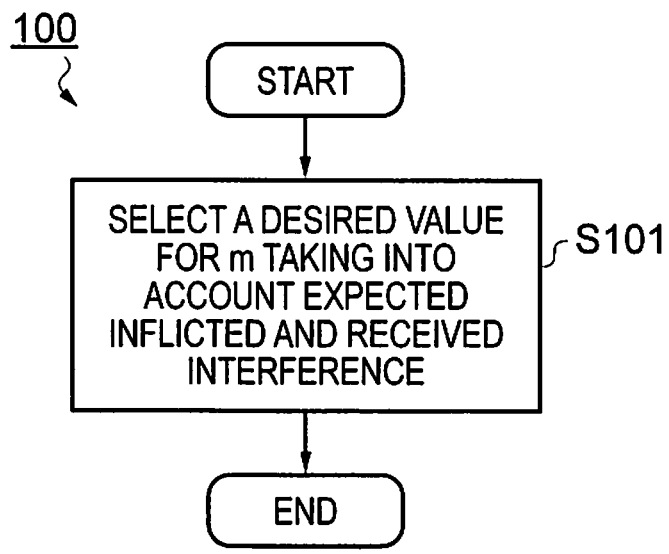
Figure 22:
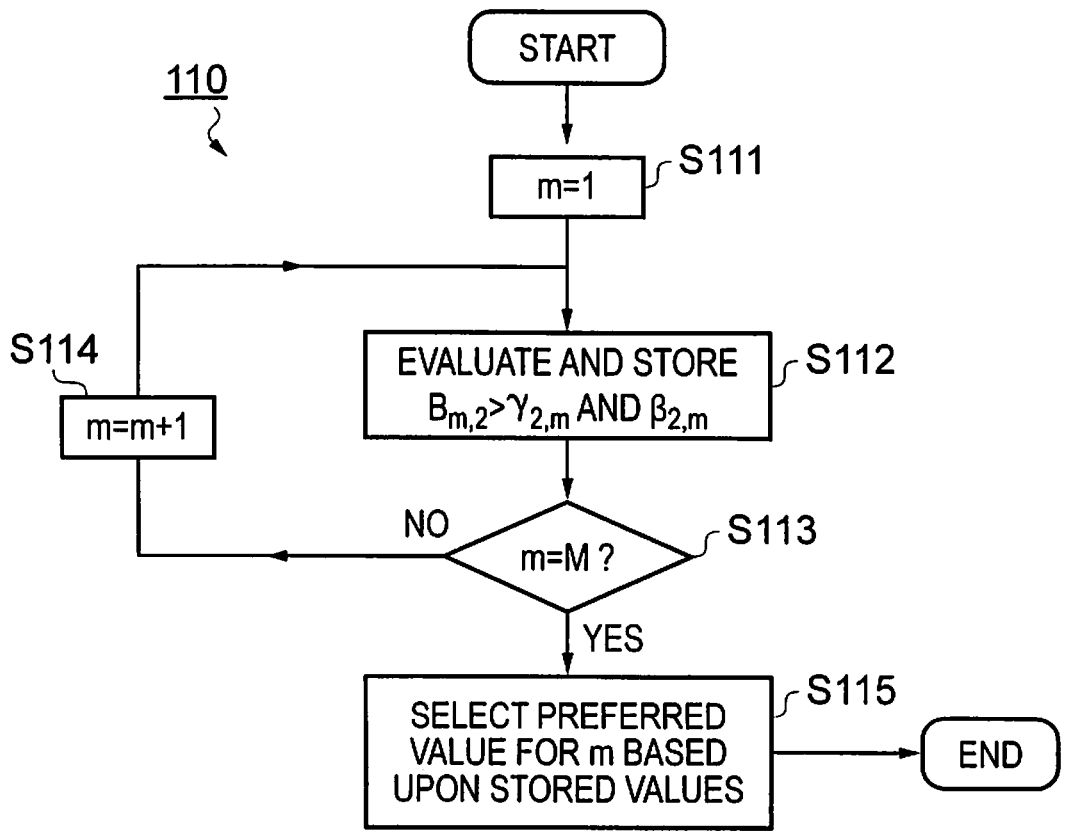
Figure 23:
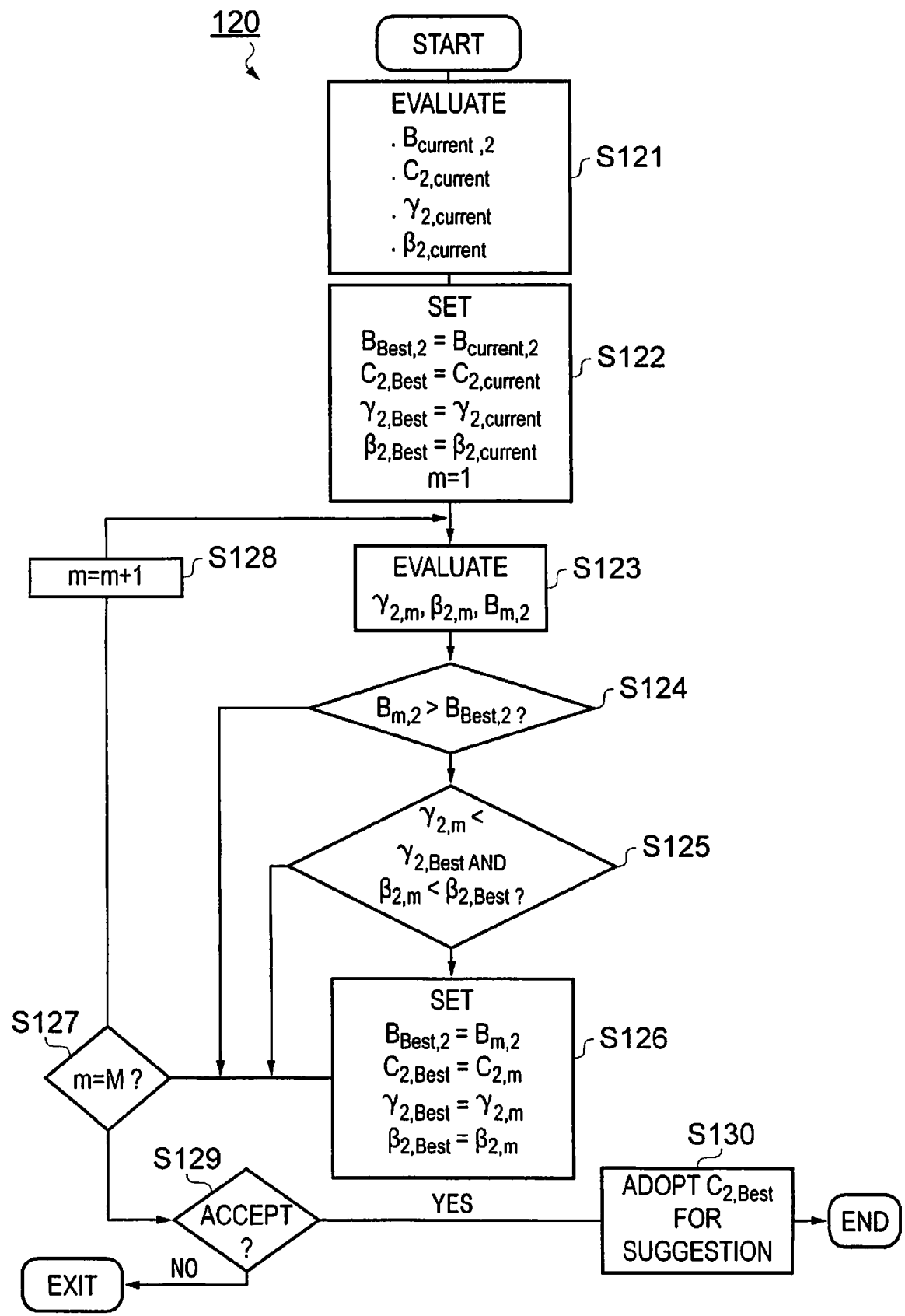
Figure 24:
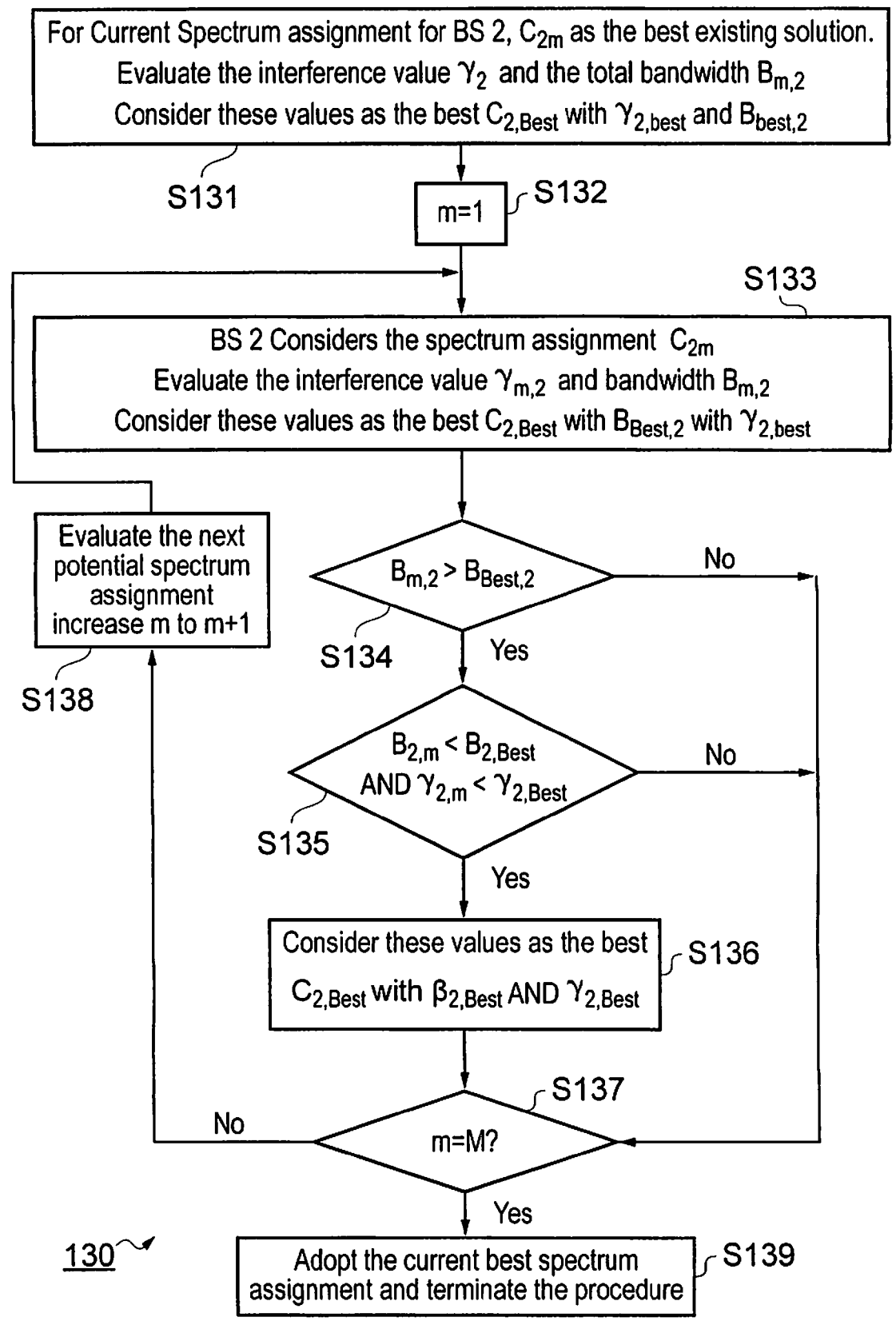
Figure 25:
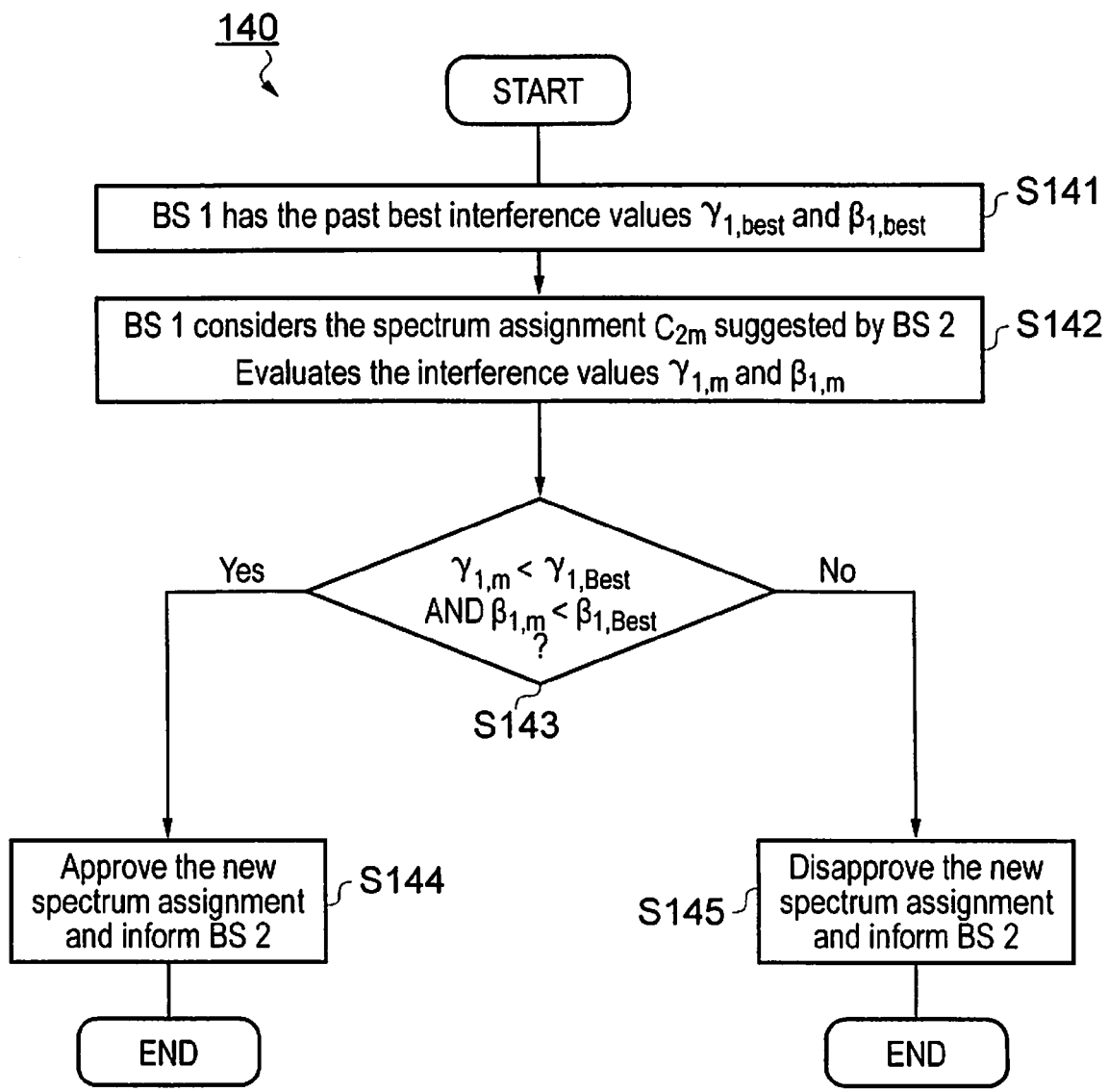
Figure 26:
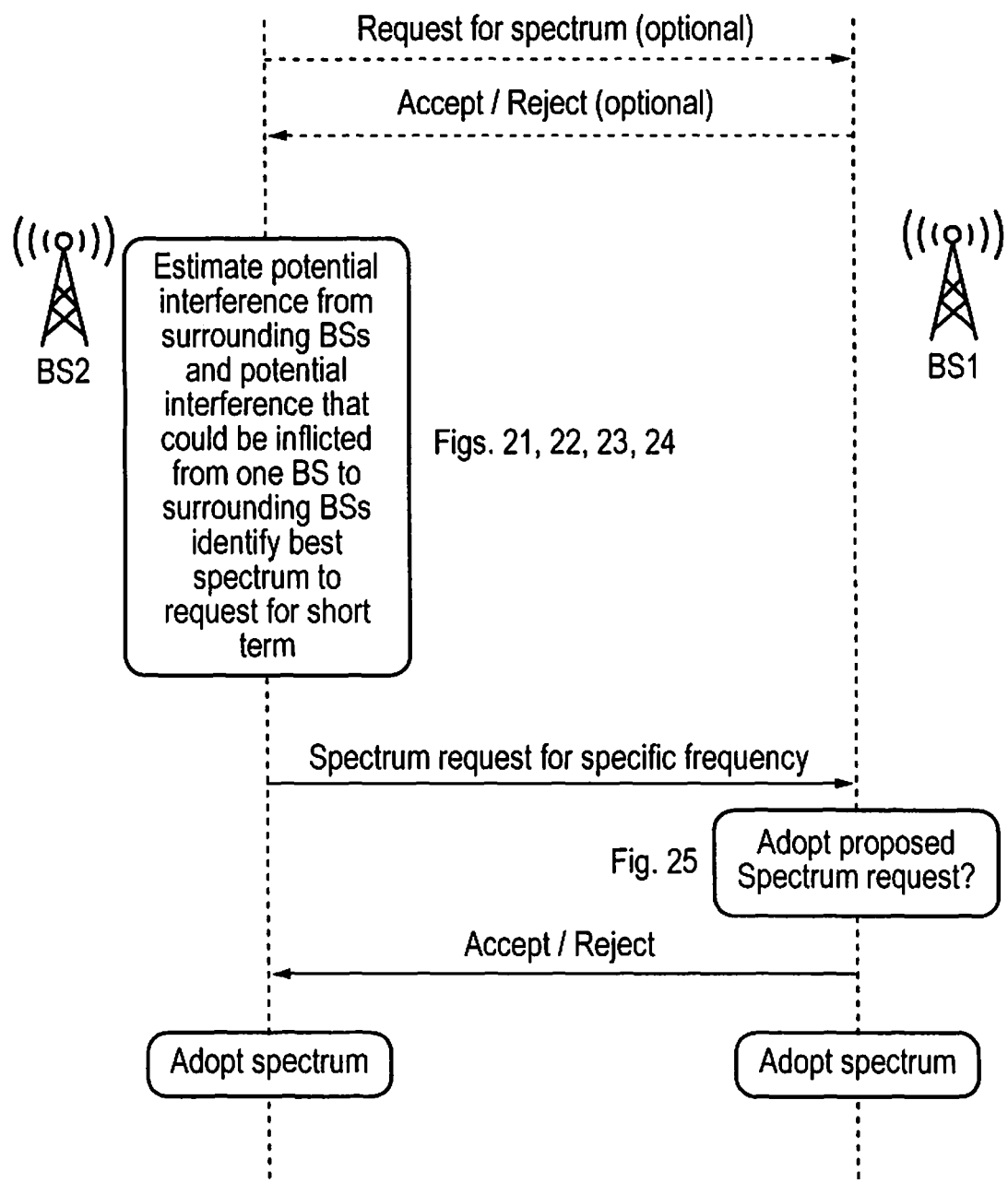
Figure 27:
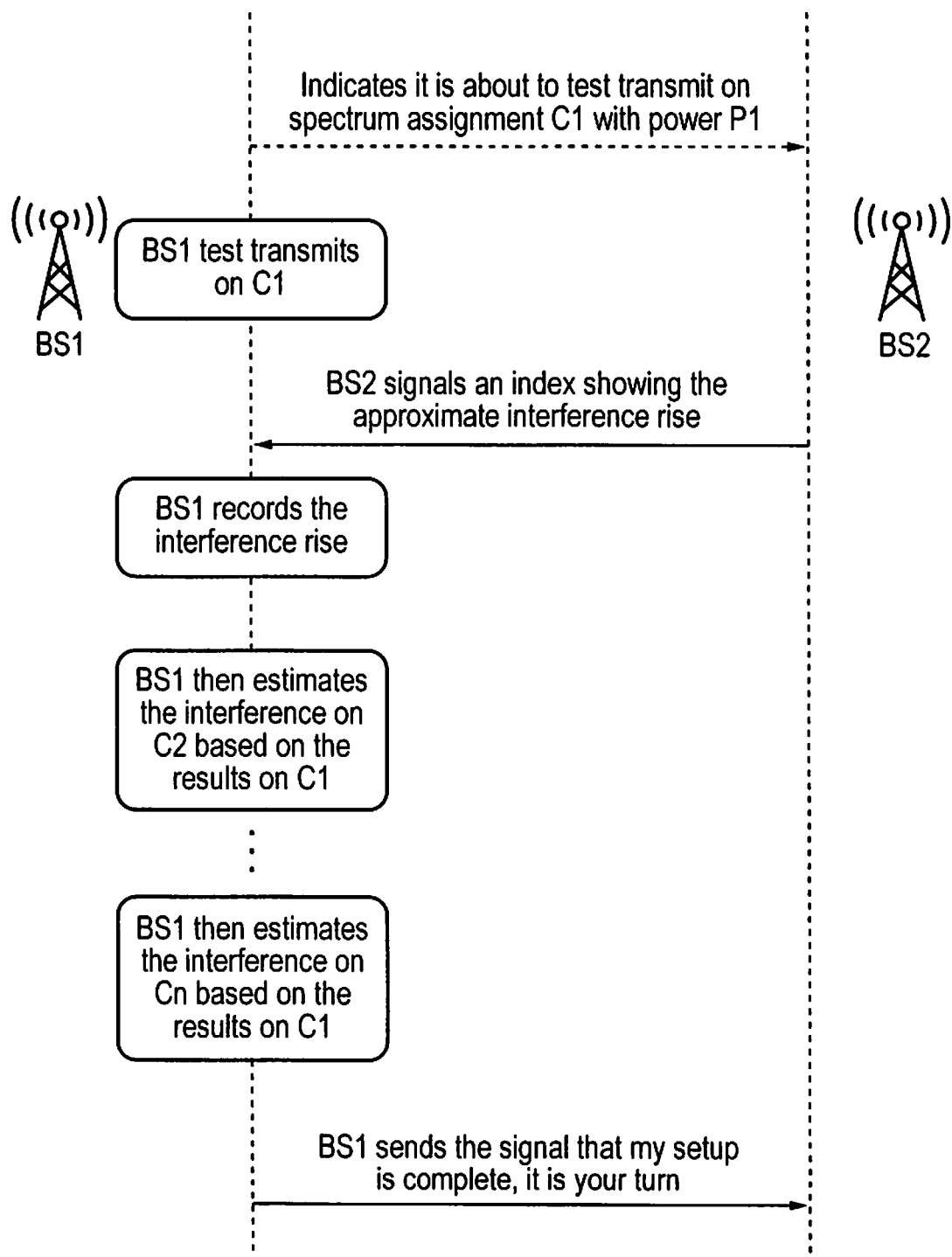
Figure 28:
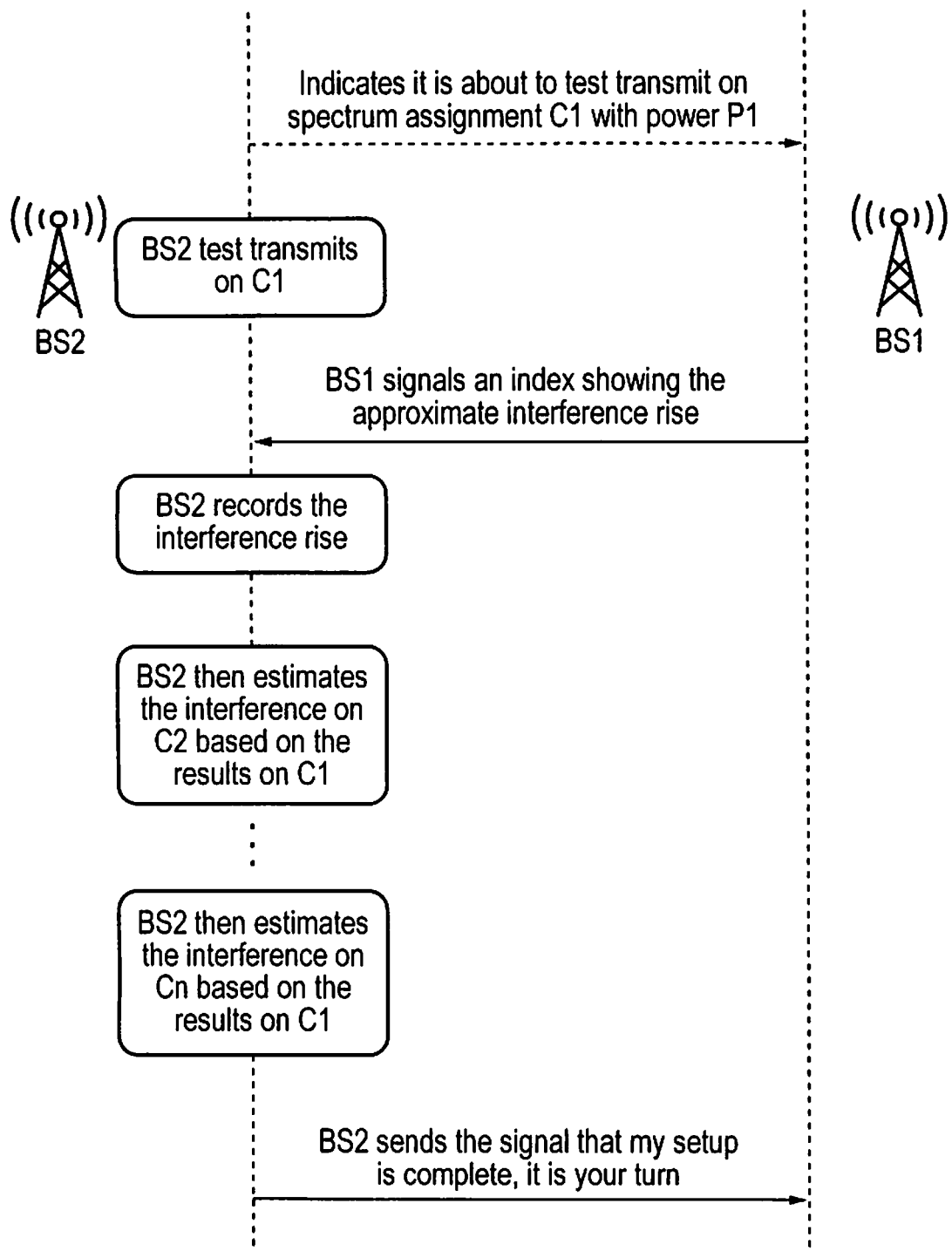
Figure 29:
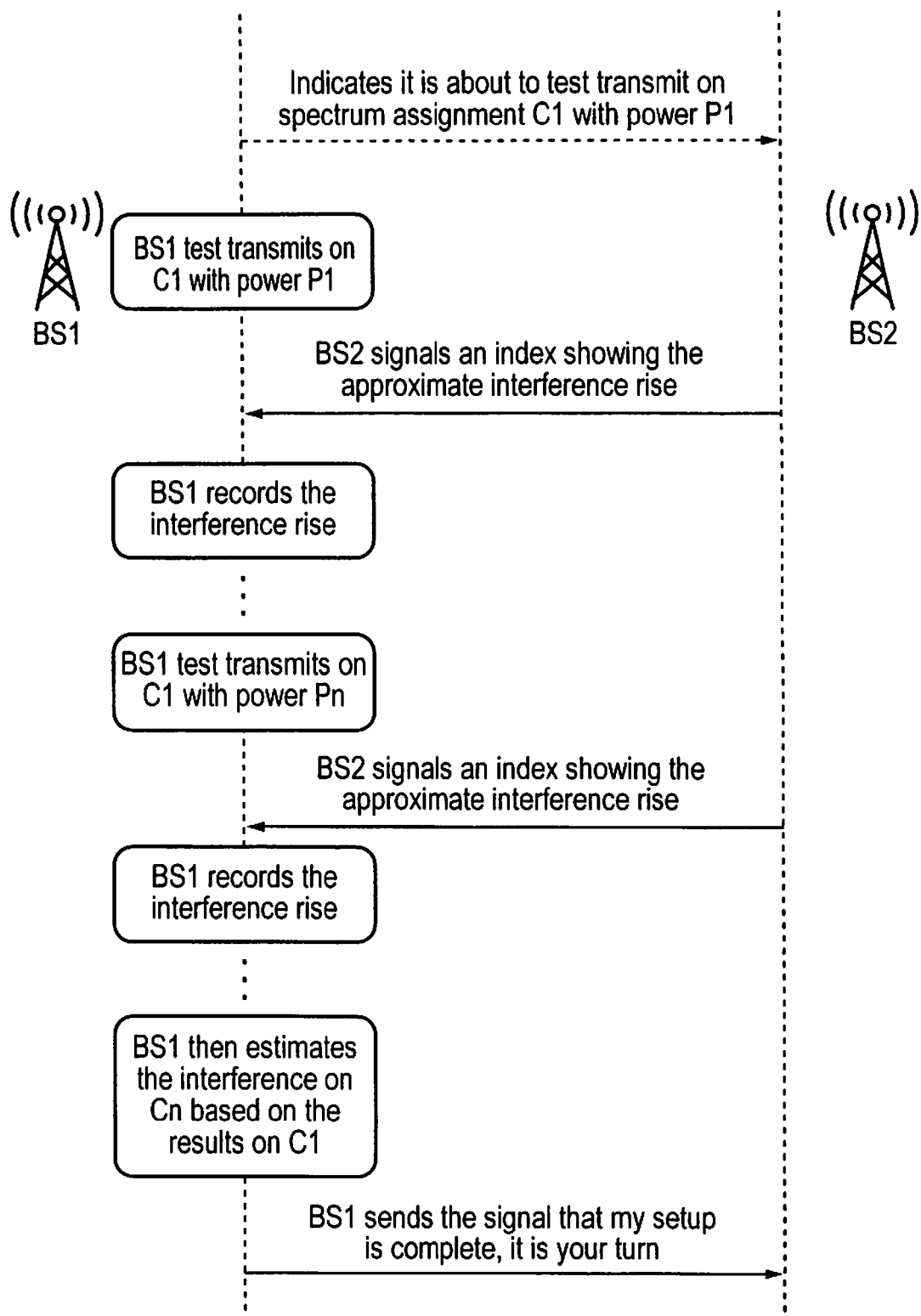
Figure 30:
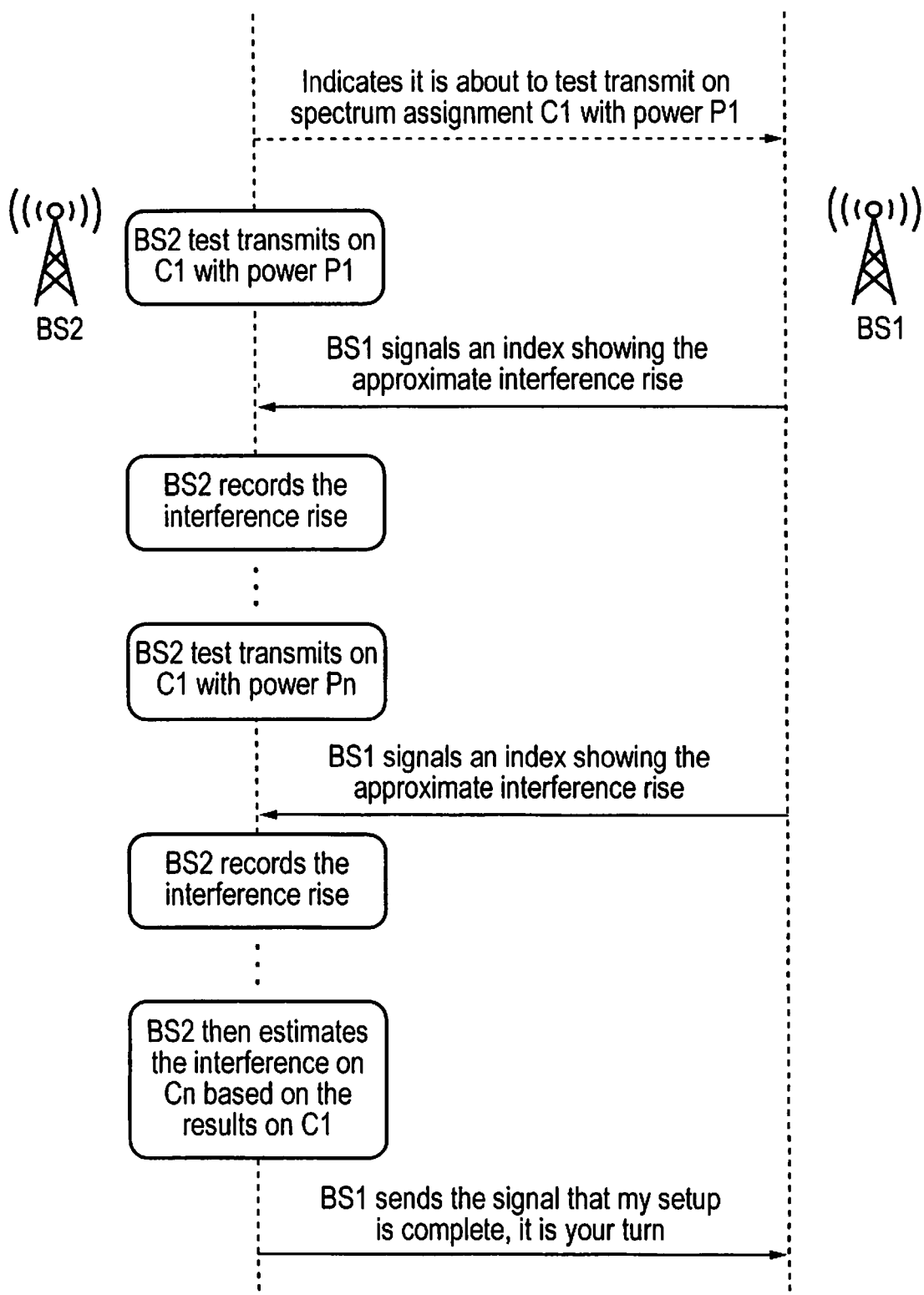
Figure 31:
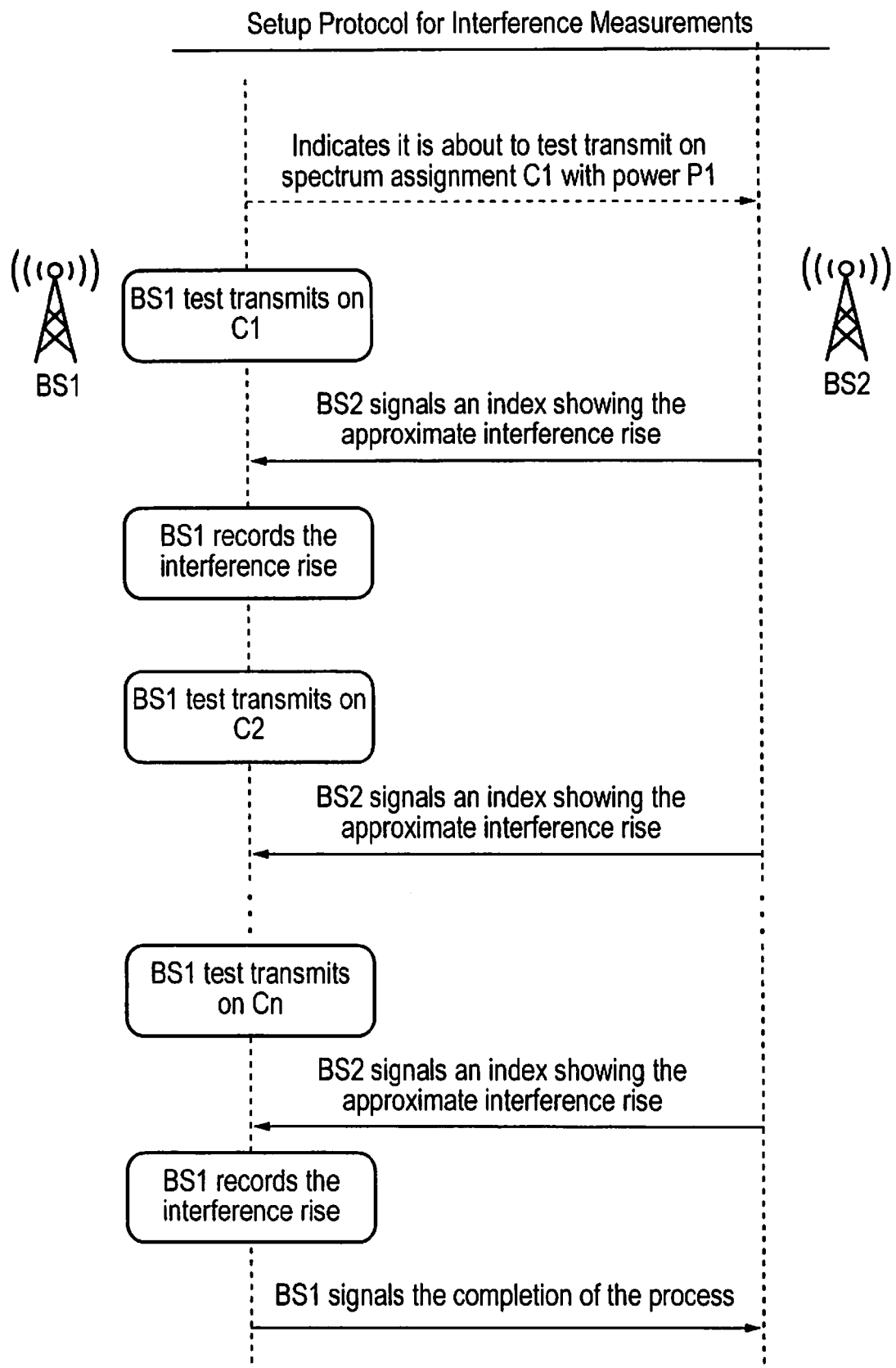
Figure 32:
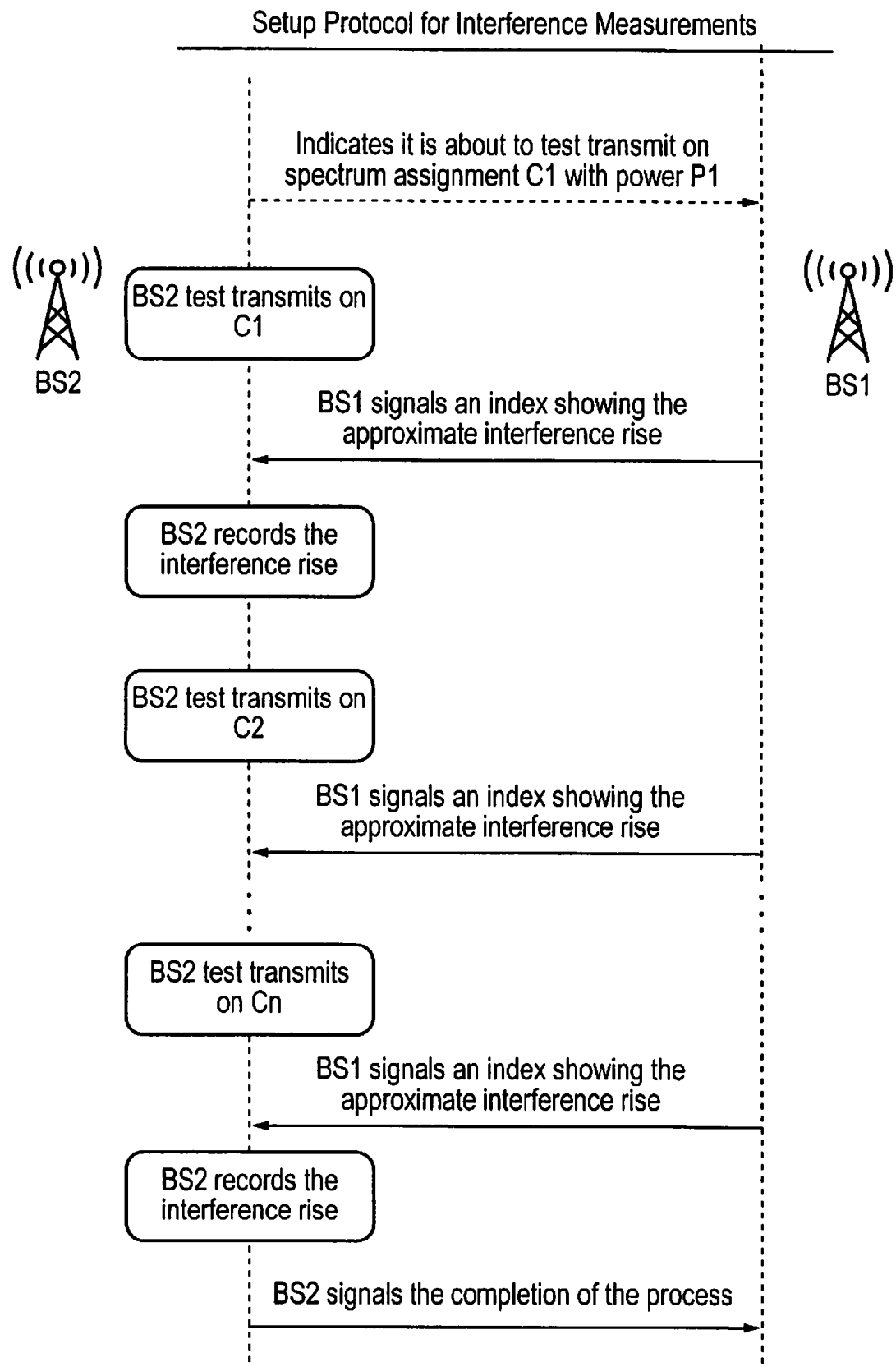
Figure 33:
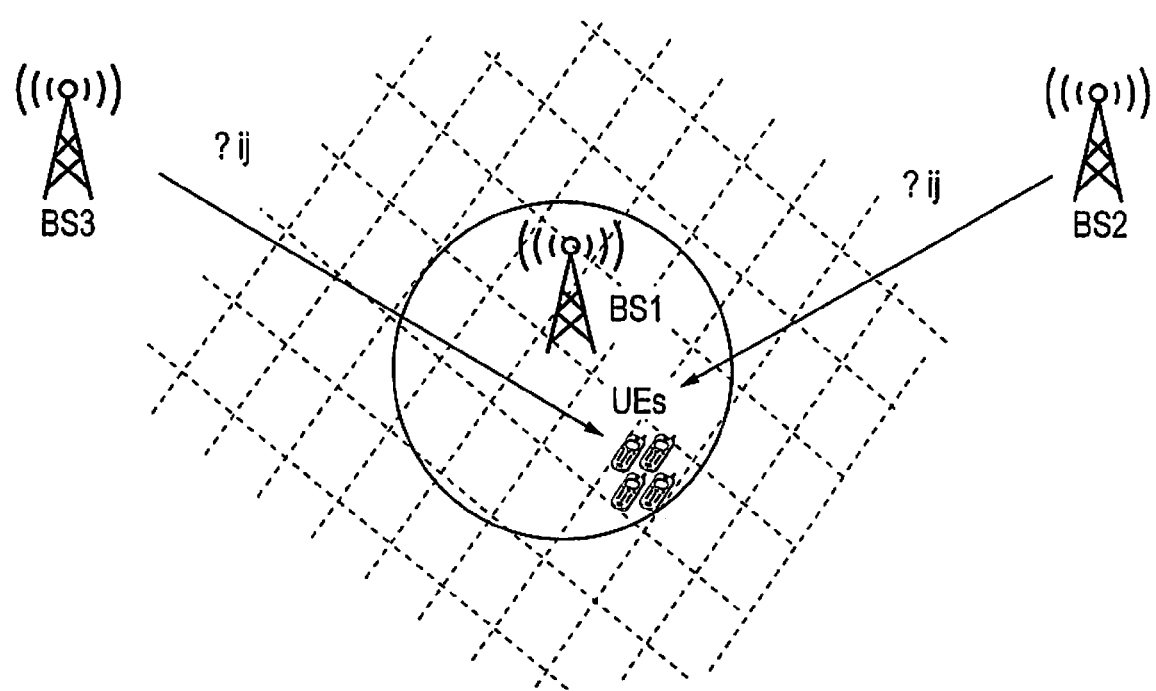
Figure 34:
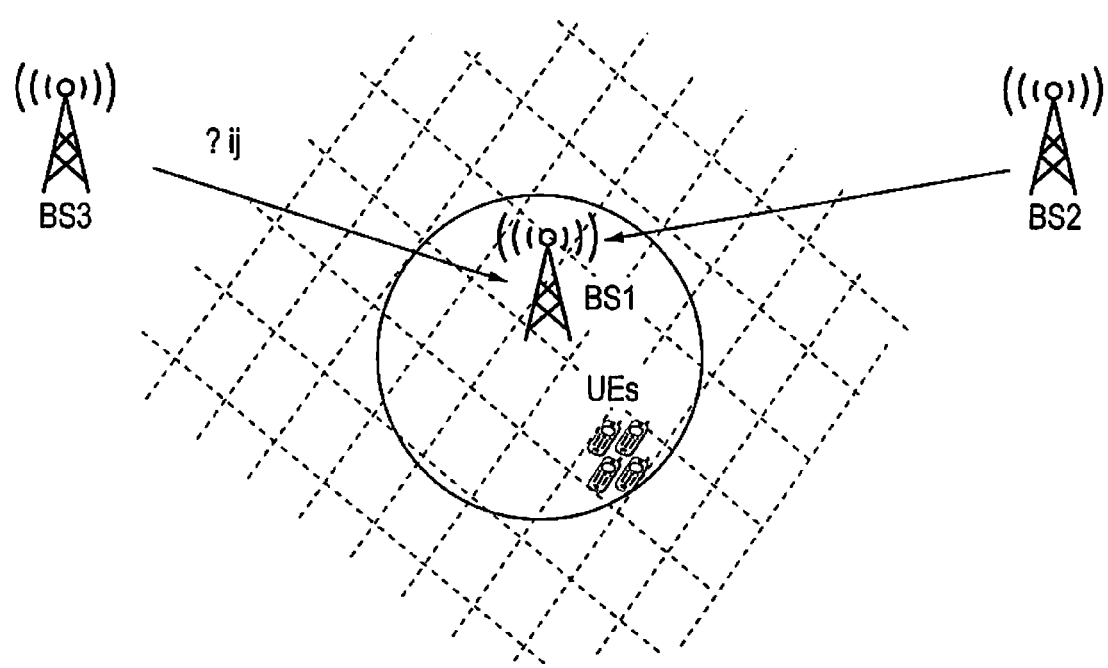
Figure 35:
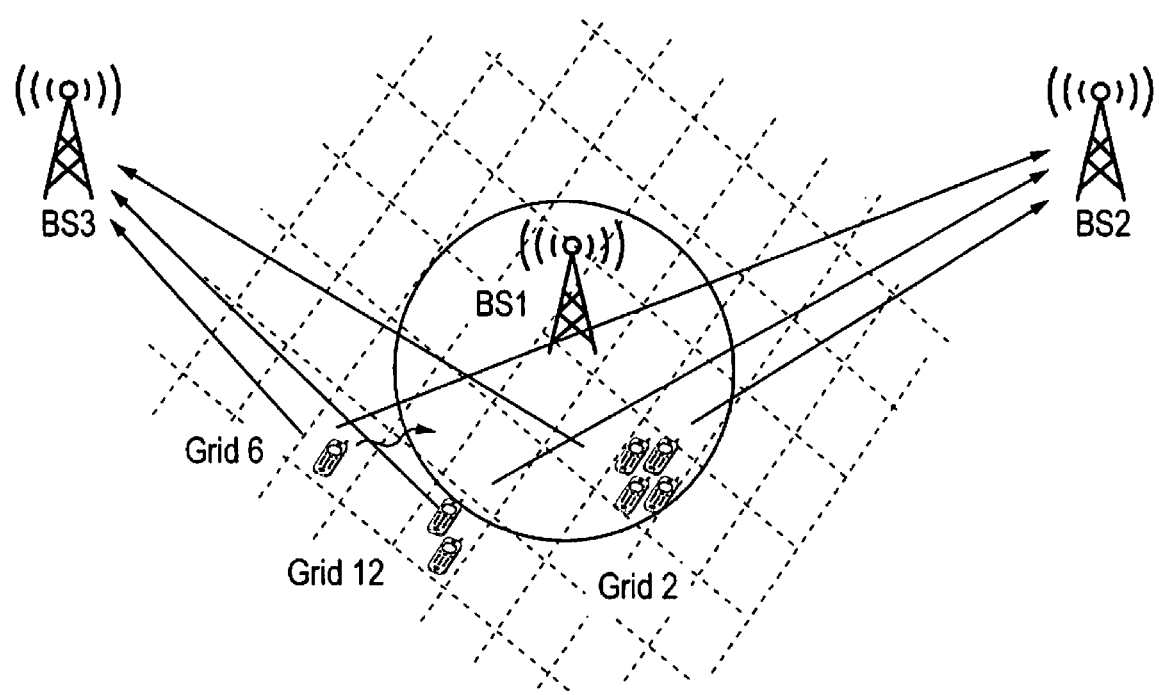
Figure 36:
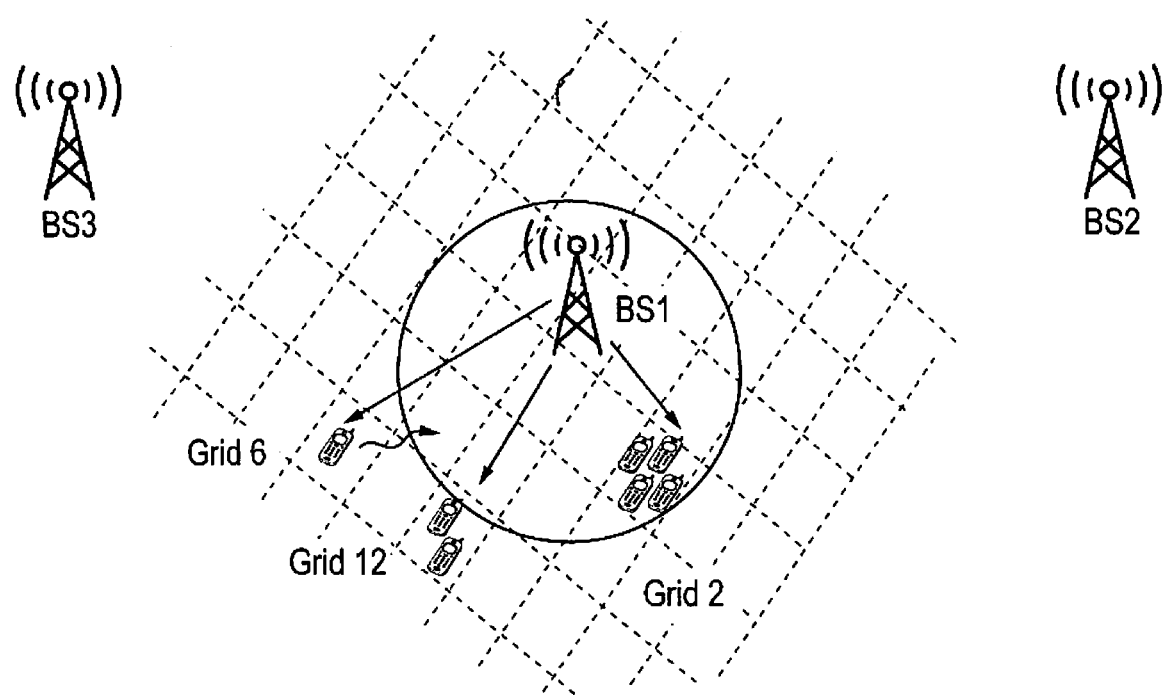
Figure 37:
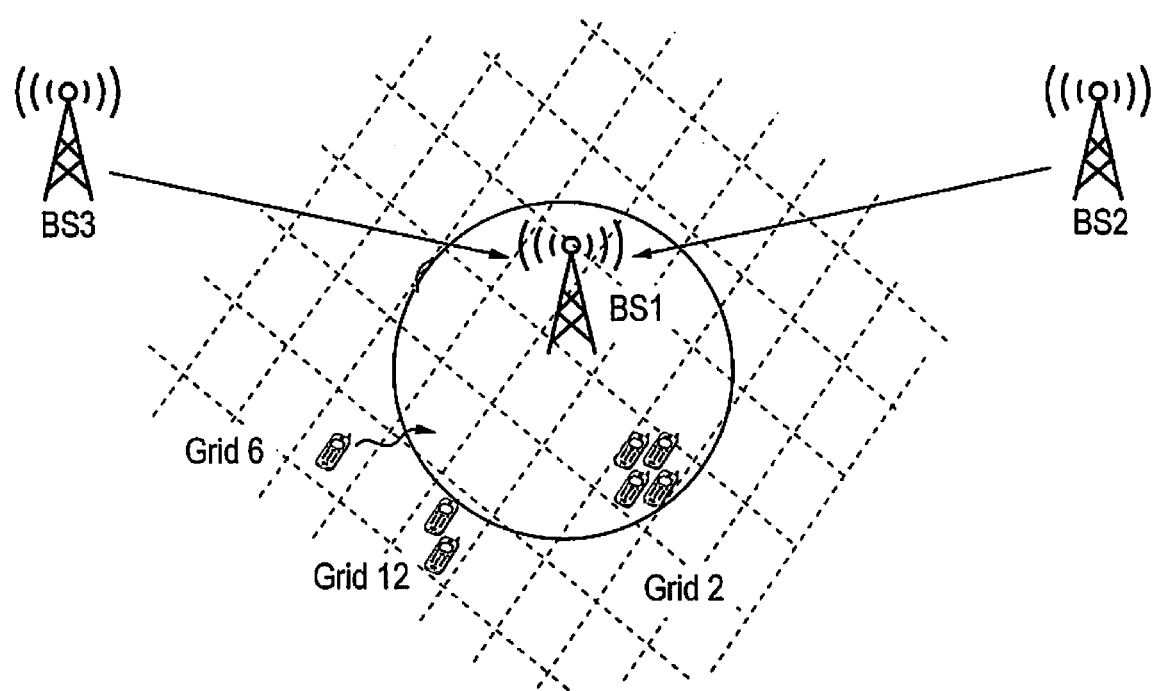
Figure 38:
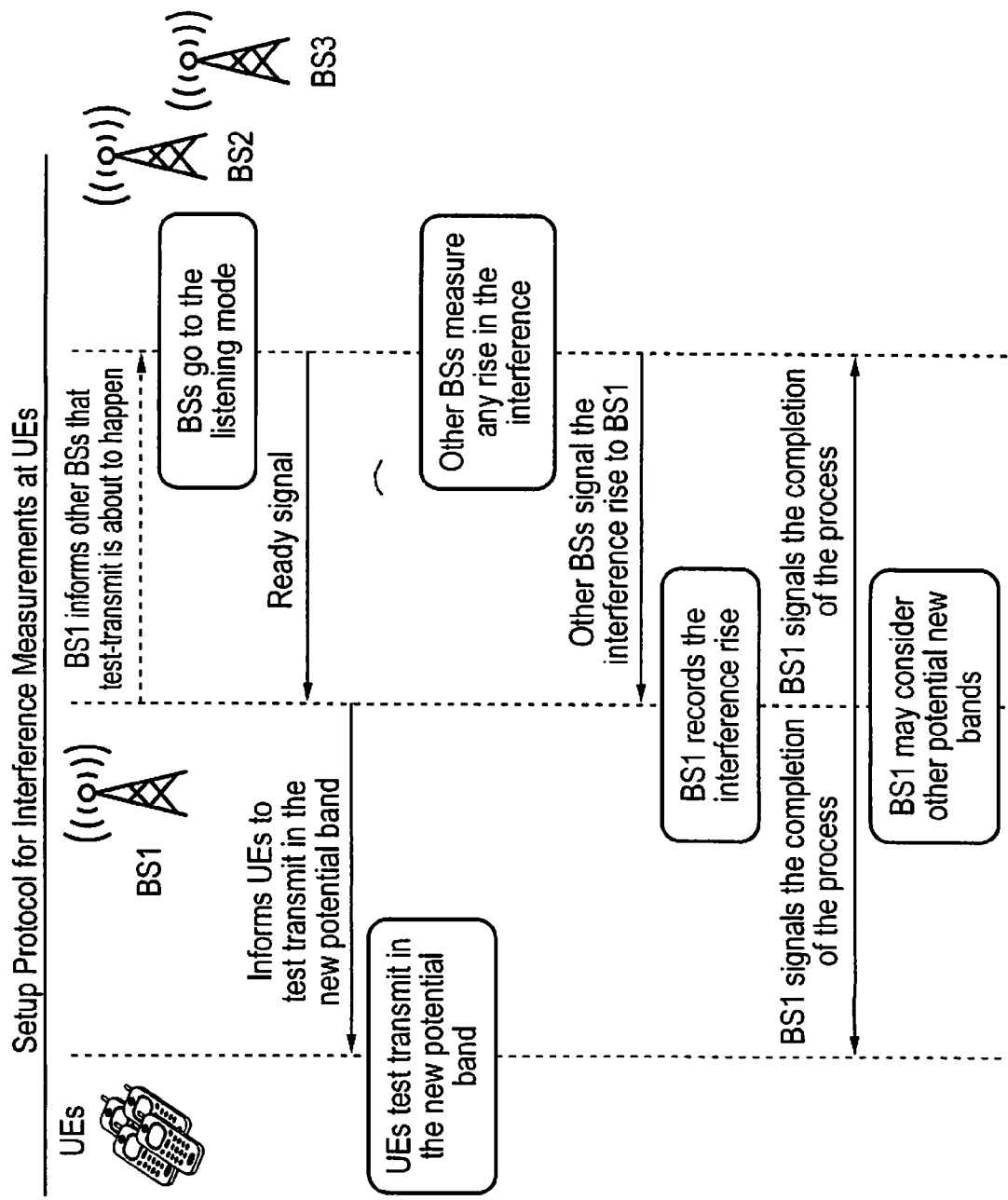
Figure 39:
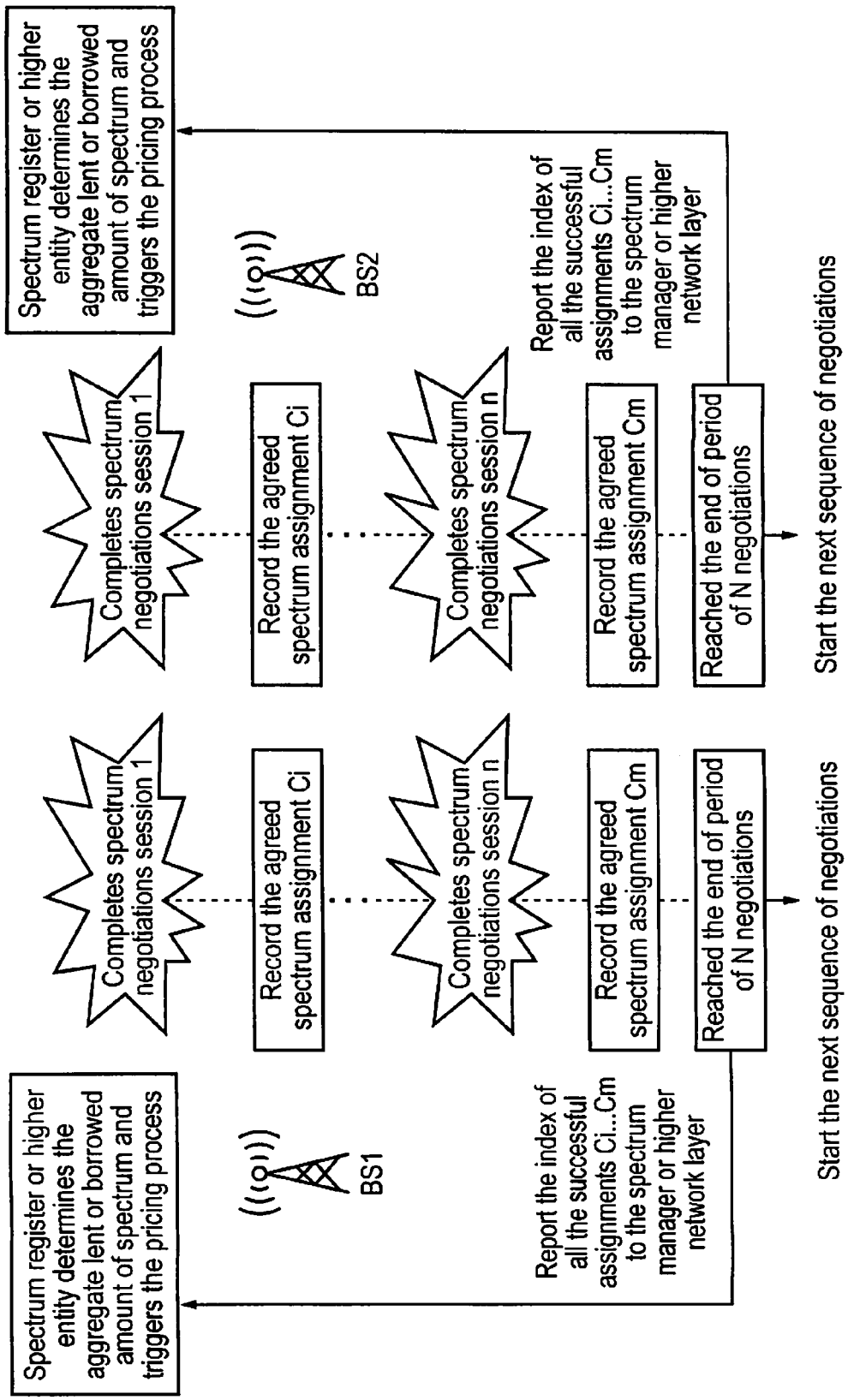
Figure 40A:
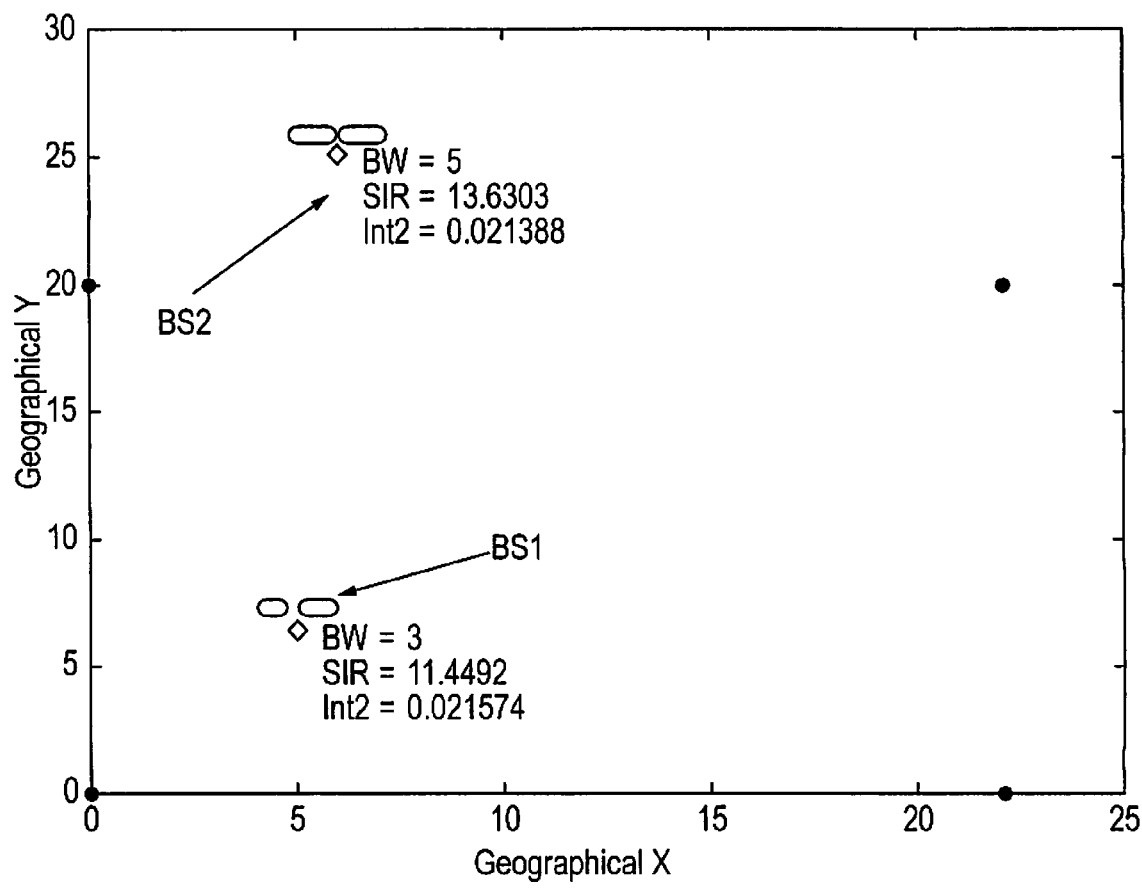
Figure 40B:
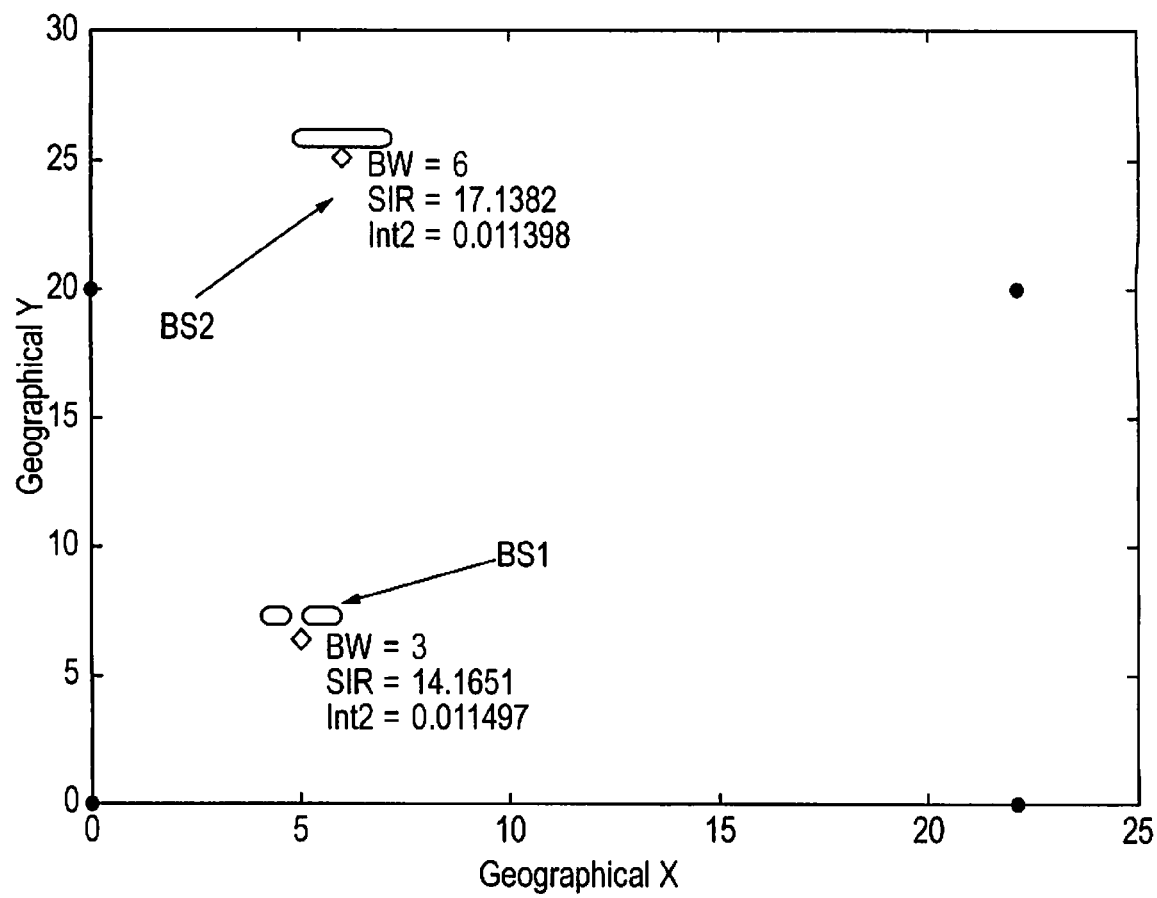
Figure 41A:
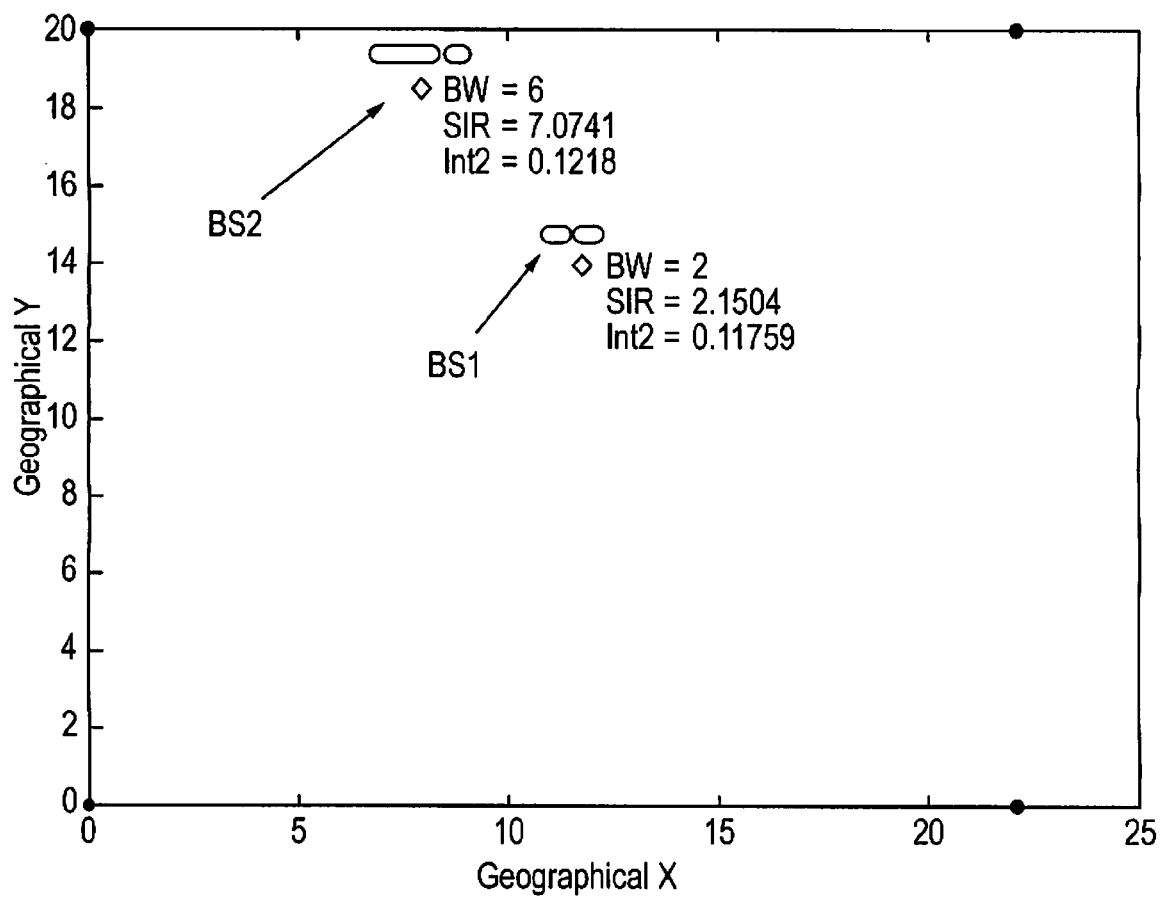
Figure 41B:
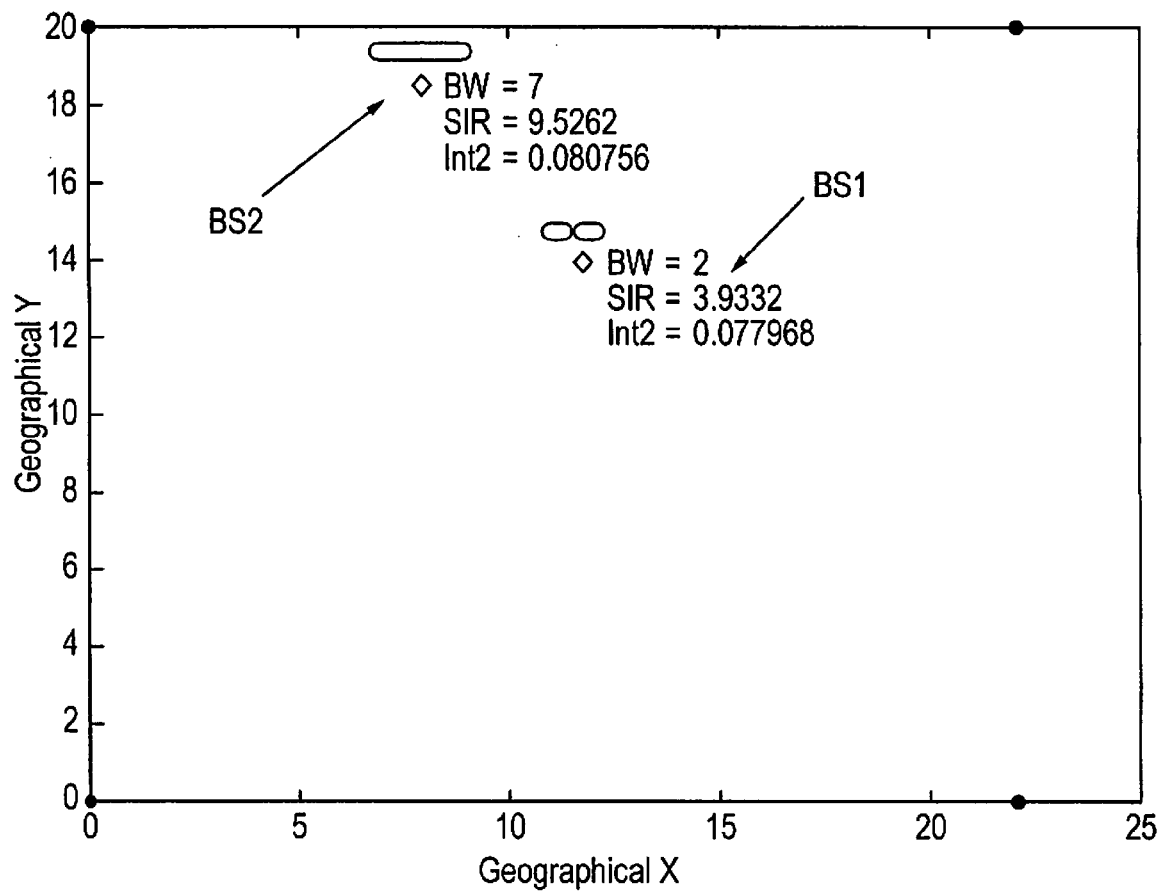
Figure 42A:
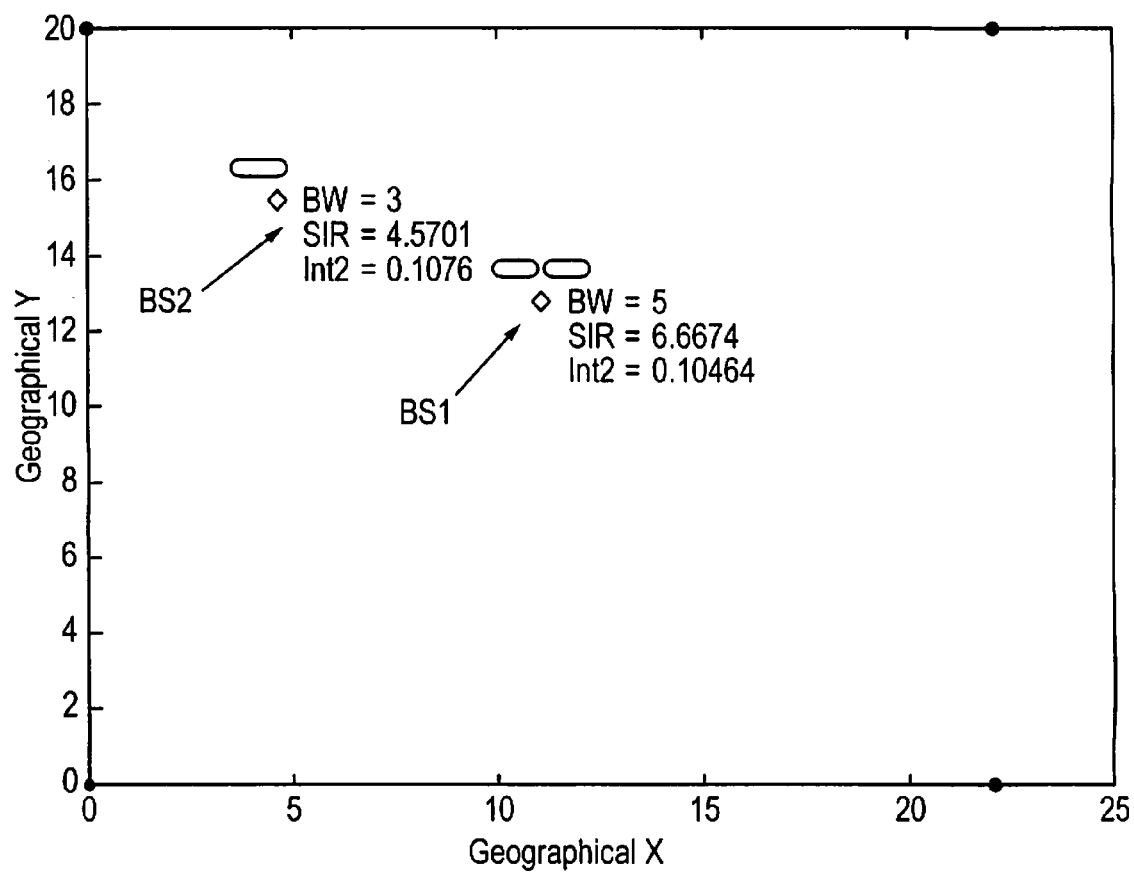
Figure 42B:
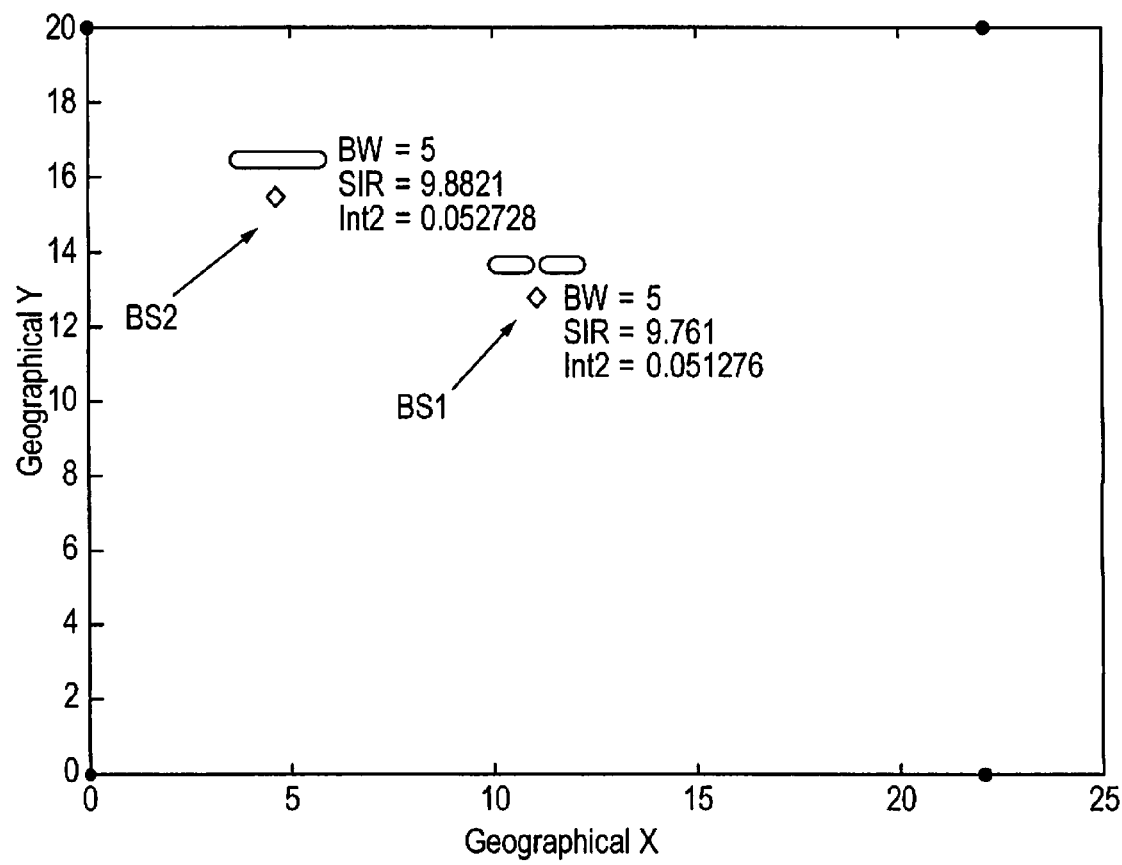
Figure 43A:
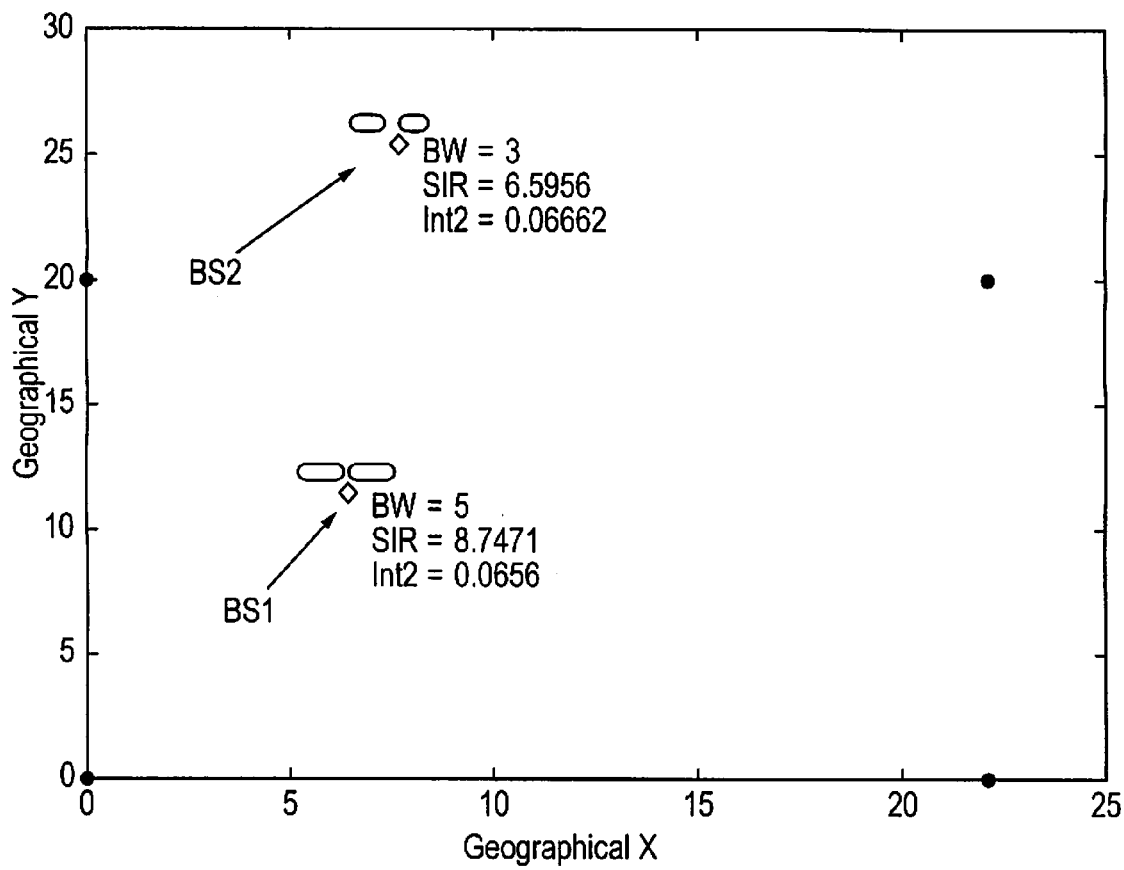
Figure 43B:
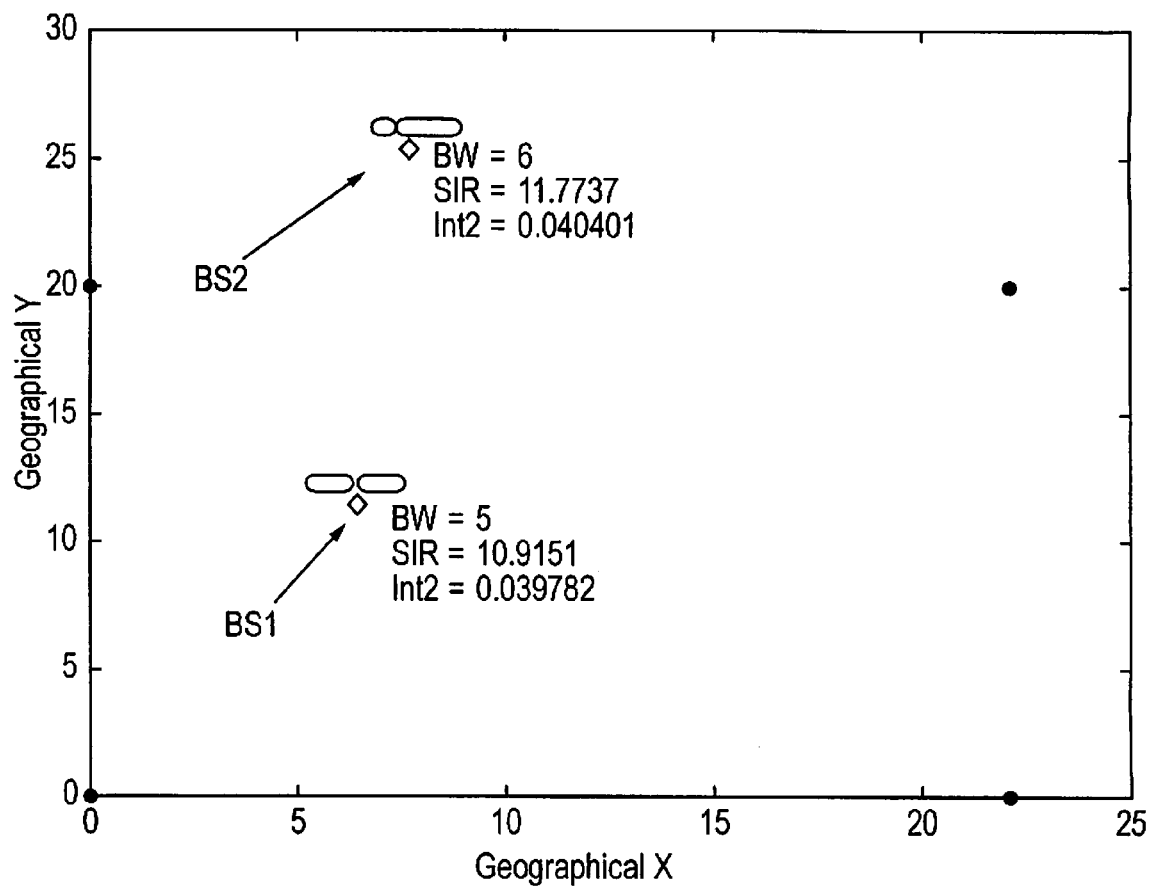

FIG. 8 summarizes the four stages of spectrum assignment, in terms of their hierarchical interrelationship;

FIG. 9 is a schematic diagram of a communication system embodying the present invention, together with bandwidth-assignment diagrams;

FIG. 10 is a schematic diagram of a method embodying the present invention;

FIG. 11 is a schematic diagram of a wireless communication system embodying the present invention;

FIG. 12A is a schematic diagram useful for understanding one possible way of determining the possible spectrum configurations for BSi;

FIG. 12B is a schematic diagram representing spectrum configurations;

FIG. 12C shows a simple example of re-assignment;

FIG. 12D is a schematic diagram showing alternative spectrum configurations for BS1 and BS2;

FIG. 12E is a schematic diagram of spectrum assignment illustrating interference;

FIG. 12F shows a cell of interest surrounded by directly neighbouring cells (first tier cells) and cells spaced by one cell from the cell of interest (second tier cells);

FIG. 13 is a schematic diagram representing Method A, which embodies the present invention;

FIG. 14 is a flow diagram of an exemplary spectrum-selection method;

FIG. 15 is a flow diagram of another exemplary spectrum-selection method;

FIG. 16 is a flow diagram of yet another exemplary spectrum-selection method;

FIG. 17 is a flow diagram of a still further exemplary spectrum-selection method;

FIG. 18 is a flow diagram of an exemplary spectrum-evaluation operation;

FIG. 19 is a schematic diagram representing Method B, which embodies the present invention;

FIG. 20 is a schematic diagram representing Method C, which embodies the present invention;

FIG. 21 shows examples of spectrum-selection operations suitable for Method C;

FIG. 22 shows examples of spectrum-selection operations suitable for Method C;

FIG. 23 shows examples of spectrum-selection operations suitable for Method C;

FIG. 24 shows examples of spectrum-selection operations suitable for Method C;

FIG. 25 shows an example of a spectrum-evaluation operation suitable for Method C;

FIG. 26 is a schematic diagram representing Method D, which embodies the present invention;

FIG. 27 is a schematic diagram showing communications in a set up protocol for interference measurements (third approach);

FIG. 28 is a schematic diagram showing communications in another set up protocol for interference measurements (third approach);

FIG. 29 is a schematic diagram showing communications in a further set up protocol for interference measurements (fourth approach);

FIG. 30 is a schematic diagram showing communications in a still further set up protocol for interference measurements (fourth approach);

FIG. 31 is a schematic diagram showing communications in yet another set up protocol for interference measurements (fifth approach);

FIG. 32 is a schematic diagram showing communications in a further set up protocol for interference measurements (fifth approach);

FIG. 33 is a schematic diagram showing a geographical layout with wireless communications implementing an approach for obtaining interference measurements (sixth approach);

FIG. 34 is a schematic diagram showing a geographical layout with wireless communications implementing an approach for obtaining interference measurements (sixth approach);

FIG. 35 is an example of a possible scenario showing a geographical layout with wireless communications implementing an approach for obtaining interference measurements (sixth approach);

FIG. 36 is a schematic diagram showing a geographical layout with wireless communications implementing an approach for obtaining interference measurements (seventh approach);

FIG. 37 is a schematic diagram showing a geographical layout with wireless communications implementing an approach for obtaining interference measurements (seventh approach);

FIG. 38 is a schematic diagram useful for summarising the possible communications between BSs and actions at the different BSs (seventh approach);

FIG. 39 is a schematic diagram representing one possible accounting process that may be employed by embodiments of the present invention;

FIG. 40A is a schematic diagram showing simulation results before reassignment;

FIG. 40B is a schematic diagram showing simulation results of the FIG. 40A example after re-assignment;

FIG. 41A is a schematic diagram showing simulation results before re-assignment;

FIG. 41B is a schematic diagram showing simulation results of the FIG. 40A example after re-assignment;

FIG. 42A is a schematic diagram showing simulation results before re-assignment;

FIG. 42B is a schematic diagram showing simulation results of the FIG. 42A example after re-assignment;

FIG. 43A is a schematic diagram showing simulation results before re-assignment;

FIG. 43B is a schematic diagram showing simulation results of the FIG. 43A example after re-assignment; and FIGS. 44 and 45 are schematic diagrams useful for understanding a few ways that BSs communicate.

A system for spectrum sharing and coexistence of system apparatuses, including the possibility of spectrum exchange between two or more RANs has been considered, for the purposes of attaining better utilisation of spectrum for wireless mobile networks.

Figure 1:
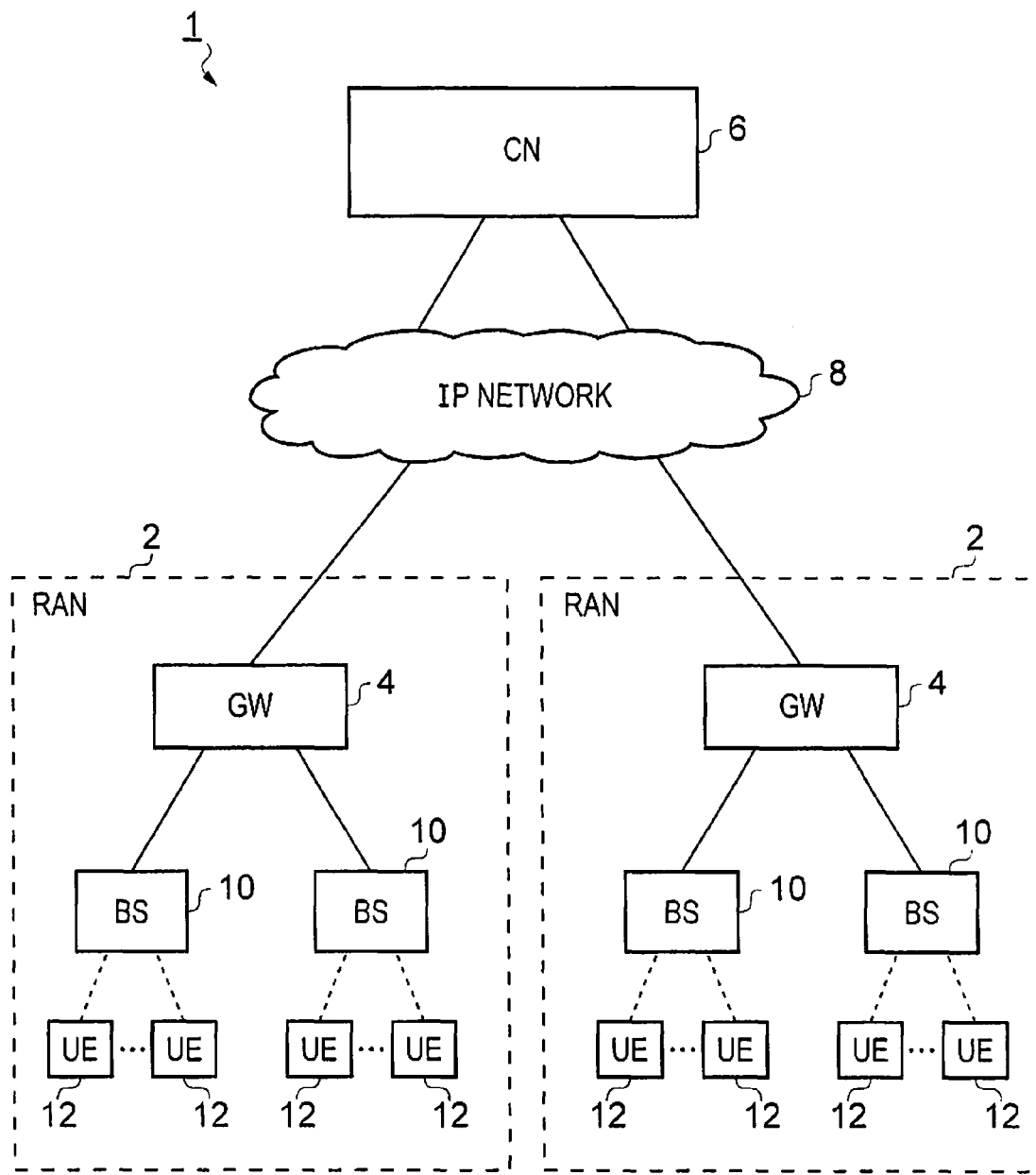
FIG. 1 is a schematic diagram of an example mobile communication system or mobile communication network.
Figure 2:
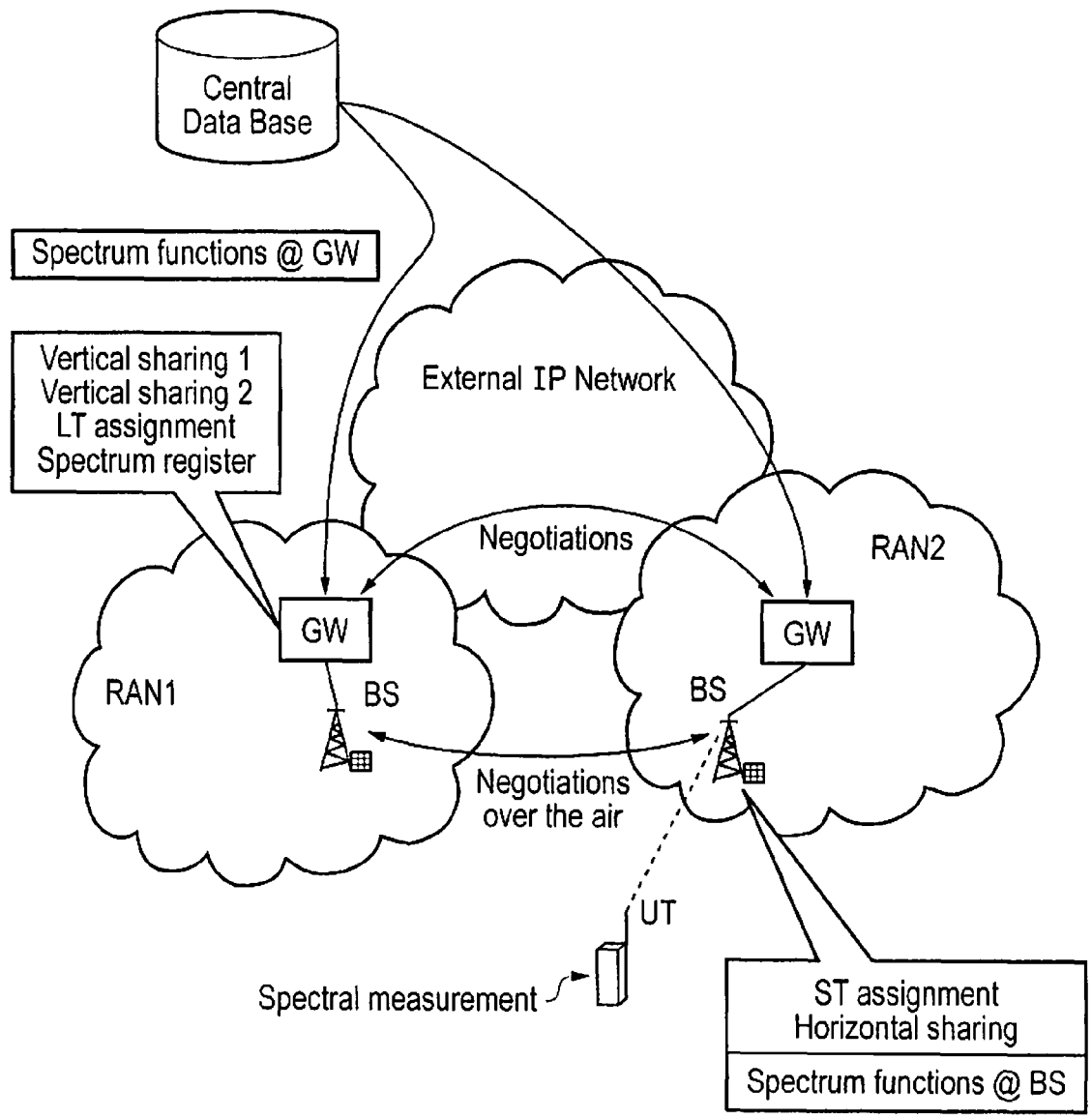
FIG. 2 is a schematic diagram of a simplistic network architecture useful for understanding the concept of spectrum sharing.

FIG. 2 is a schematic diagram of simplistic network architecture useful for understanding the concept of spectrum sharing. The network of FIG. 2 may to some extent be compared to the schematic diagram of FIG. 1. The basic idea is to enable independent RANs (Radio Access Networks) to use each other's spectrum when it is not needed. Negotiations between different RANs may be carried out by communications between the gateways of those RANs.

In FIG. 2, two RANs are shown, namely RAN 1 and RAN 2, each having a GW and a BS. Communications are possible between the two GWs, either directly or indirectly. Both of the GWs have access to a central database, which may for example have a controlling functionality. As indicated in FIG. 2, spectrum sharing is envisaged at the gateway level and/or at the base-station level. Depending on rules governing the sharing of different frequency bands, different approaches to spectrum sharing are envisaged. One such approach is referred to as horizontal sharing. So-called horizontal sharing may be carried out between systems or communication apparatuses of equal status, i.e. where no system has priority over the other system(s). Such horizontal sharing could be performed with or without coordination. Coordination may require capabilities for signalling or at least detection of other systems, and may involve coordination based on a predefined set of rules or "spectrum etiquette".

Another approach to spectrum sharing is referred to as "vertical sharing". So-called vertical sharing may be carried out between systems or communication apparatuses in which there are clearly established priorities. For example, there may be primary systems that have preference in accessing the spectrum and secondary systems that may only use the spectrum providing they do not cause harmful interference towards the primary system(s). It is envisaged that spectrum-sharing enabled systems could be either primary or secondary systems as compared to legacy (non-spectrum-sharing enabled) systems. This leads to two types of vertical sharing, the first type ("Vertical Sharing 1" in FIG. 2) having the spectrum-sharing enabled system as the primary system, and the second type ("Vertical Sharing 2" in FIG. 2) having the legacy system as the primary system.

Also indicated in FIG. 2, is the possibility of storing a spectrum register at gateway level. In this way, a record can be kept of the sharing of spectrum between systems, for example between RANs or BSs. User Terminals (UTs) may also be used to make spectral measurements to assist the spectrum-sharing process.

FIG. 2 indicates that both long-term spectrum assignment (LT assignment) and short-term spectrum assignment (ST assignment) may be carried out. These different functionalities may be understood as follows. Spectrum sharing may be used to periodically reassign a portion of the available spectral resources between different RANs. In contrast to fixed-spectrum assignment, spectrum sharing can enable dynamic balancing of spectral resources between networks. As a result, the spectral scalability of systems can be increased, and spectral resources available for a network can be adjusted according to changes in requirements. Such requirements may be financial/commercial requirements, for example relating to a network operator's customer base or market share. Such requirements may also be operational requirements, for example relating to loads on the respective networks. It will be appreciated that spectrum sharing may facilitate focused operation of communication networks resulting in limiting overall need for spectral resources. In addition, spectral resources may be re-assigned according to variations in the aggregate loads on respective networks, thereby enhancing the overall use of spectrum over a number of networks.

It is desirable that a spectrum-sharing functionality provides a communication system with stable, predictable and reliable access to the spectrum, whilst also reacting quickly to changing spectrum requirements between different networks of the system. By dividing spectrum sharing into LT spectrum assignment (providing slowly varying, stable spectrum assignments for large geographical areas) and ST spectrum assignment (providing short-term variations to the large-scale solution), the stability and predictability required can be achieved with reasonable complexity.

Figure 3:
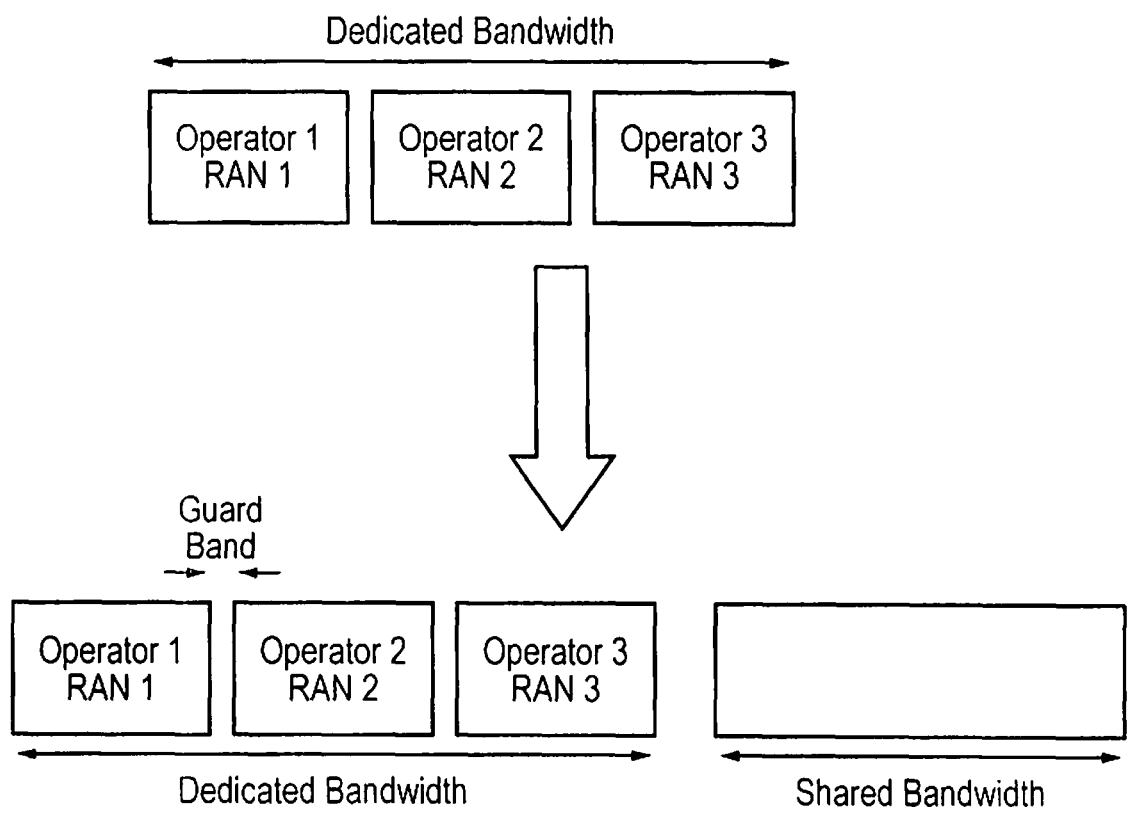
FIG. 3 is a schematic diagram showing a spectrum-sharing scenario.

Based on the above, four stages for spectrum negotiations and management have been proposed. The first stage may be referred to as "spectrum co-existence and sharing". In this first stage, under a spectrum co-existence and sharing scenario, RANs (for example belonging to different operators) may decide upon an amount of shared spectrum that is to be made available to one of those RANs beyond its existing dedicated spectrum band. A typical scenario is shown in FIG. 3. Three operators (Operator 1, Operator 2, and Operator 3) each have their own RAN (RAN 1, RAN 2, and RAN 3 respectively). Each such RAN has its own dedicated spectrum band separated from adjacent bands by means of a guard band. In addition, a shared spectrum band also exists, which can be made available to any of the RANs in addition to its dedicated spectrum band.

The decision regarding the precise final boundaries of spectrum may be location dependent, depending for example on the nature of the area (e.g. metropolitan area, or local area) and on the coordinates of the area. A trade-off between spatial separation and frequency separation may also affect the precise final boundaries of assigned spectrum.

Figure 4:
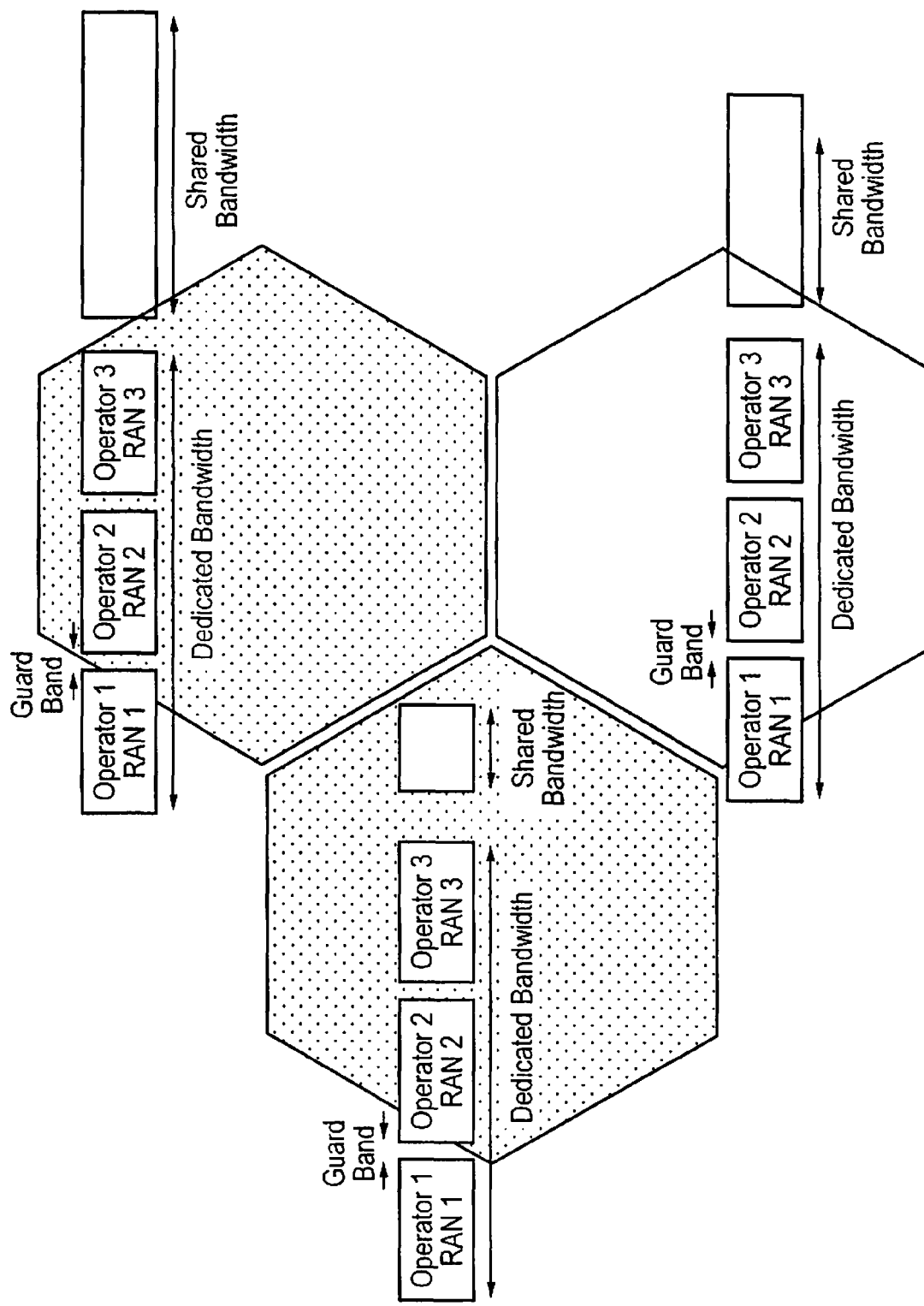
FIG. 4 is a schematic diagram of geographical areas of RAN coverage, known as cells.

This location dependency can be appreciated by reference to FIG. 4. In FIG. 4, three geographical areas of coverage, known as cells, are shown. The three RANs of the three operators have a presence in each of the cells, however there are differences between the dedicated and shared spectrum allocations for the three RANs that move from cell to cell. That is, the initial boundaries of available spectrum (assuming that some spectrum sharing or re-assignment will take place) are different from cell to cell.

The second stage may be referred to as long-term (LT) spectrum assignment. After making decisions about spectrum boundaries in stage 1, negotiations can occur between the GWs of different RANs (for example, belonging to different operators) on a regular or semi-regular basis, for example every couple of minutes. Such negotiations can serve to rearrange (re-allocate, or re-assign) the available spectrum to ideally maximize spectrum utilization between the different RANs, for example between a primary and secondary RAN. In this way, one mobile operator can trade in unused spectrum to maximize revenue from its own unused spectrum and improve QoS (Quality of Service) by obtaining unused spectrum from other operators. It will of course be appreciated though that such spectrum sharing need not be influenced by financial factors, and may instead only be influenced by technical factors, for example by a desire to maximize spectrum utilization across several RANs.

Figure 5:
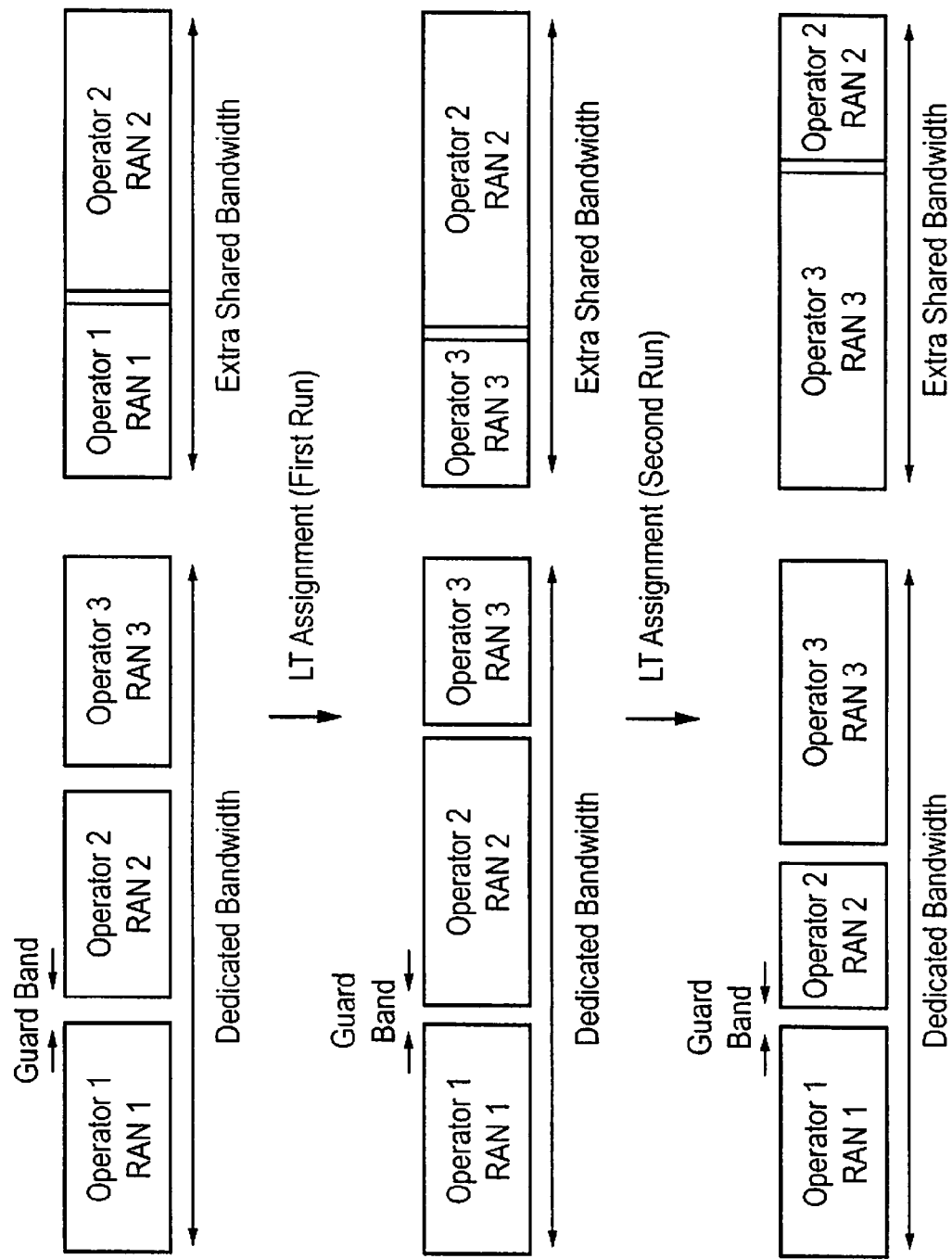
FIG. 5 is a schematic diagram of long-term spectrum assignment.

By way of example, FIG. 5 indicates how spectrum may be transferred/re-assigned/re-allocated as part of the second stage. In FIG. 5, this second stage is performed twice by way of a first run and a second run. Before the first run, it can be seen that RANs 1 to 3 have a substantially equal dedicated bandwidth, and that RANs 1 and 2 share the extra shared bandwidth, albeit with RAN 2 having the larger such share. Following the first run, it can be seen that RAN 2 has increased the size (or frequency range) of its dedicated spectrum allocation by obtaining spectrum from RAN 3. Also, following the first run, RANs 3 and 2 share the extra shared bandwidth (RAN 1 no longer occupying any of the extra shared bandwidth). Following the second run, RAN 3 has increased the size of its dedicated spectrum allocation by obtaining spectrum from RAN 2. Also, following the second run, RANs 3 and 2 still share the extra shared bandwidth, but with RAN 3 (rather than RAN 2) having the larger such share. Accordingly, it can be appreciated from FIG. 5 that both dedicated and additional spectrum assignments may be changed from one run to the next.

The third stage may be referred to as short-term (ST) spectrum assignment. After making decisions about spectrum-allocation boundaries in stage 2, negotiations can occur locally between BSs on a short-term regular or semi-regular basis, for example every few seconds. It will be appreciated that the purpose of such short-term assignment in stage 3 is to augment the scheduled long-term assignment of stage 2 by allowing for faster spectrum assignments and, thus, increasing overall flexibility. Such short-term assignment can operate with the spatial granularity of a cell, and can be triggered in various ways as will become apparent.

Figure 6:
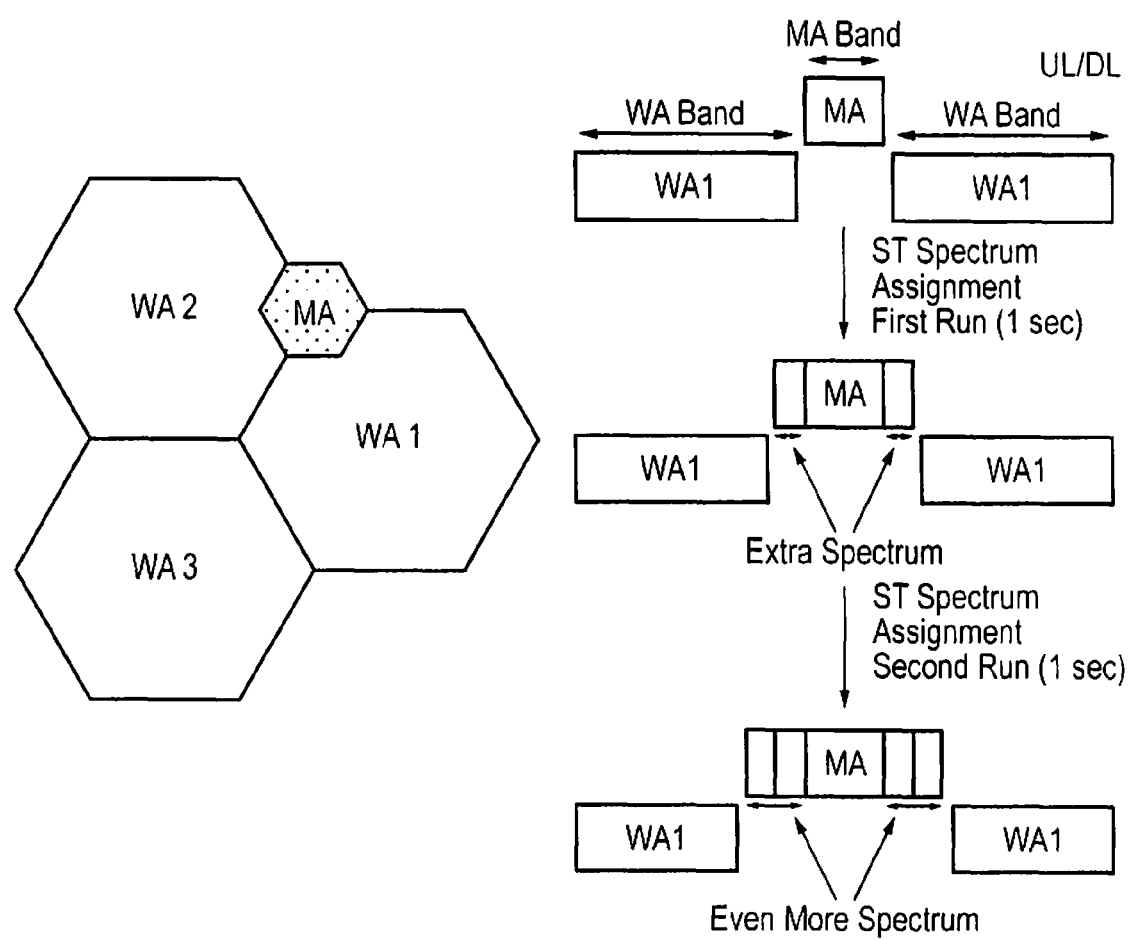
FIG. 6 shows a geographical arrangement of three wide-area deployments or cells (WA 1, WA 2 and WA 3) and a metropolitan area deployment or cell (MA)

A possible scenario for the third stage is shown in FIG. 6. The left hand part of FIG. 6 shows a geographical arrangement of three wide-area deployments or cells (WA 1, WA 2 and WA 3) and a metropolitan area deployment or cell (MA). In the right hand part of FIG. 6, the effect of two runs of this third stage can be seen. Before the first run, the MA occupies a relatively small spectrum portion between portions of spectrum allocated or pre-assigned to WA 1. By means of the first and second runs, it can be seen that the MA progressively negotiates to obtain spectrum from WA 1.

The fourth stage may be referred to as channel allocation/radio-resource partitioning. At both the physical layer and the network layer, radio specifications can be changed in order to provide an acceptable performance level, for example an acceptable BER (bit error rate). At the network level, interference can be minimized by applying channel allocation/radio resource partitioning (i.e. by suitable selection of channel frequencies).

Figure 7A:
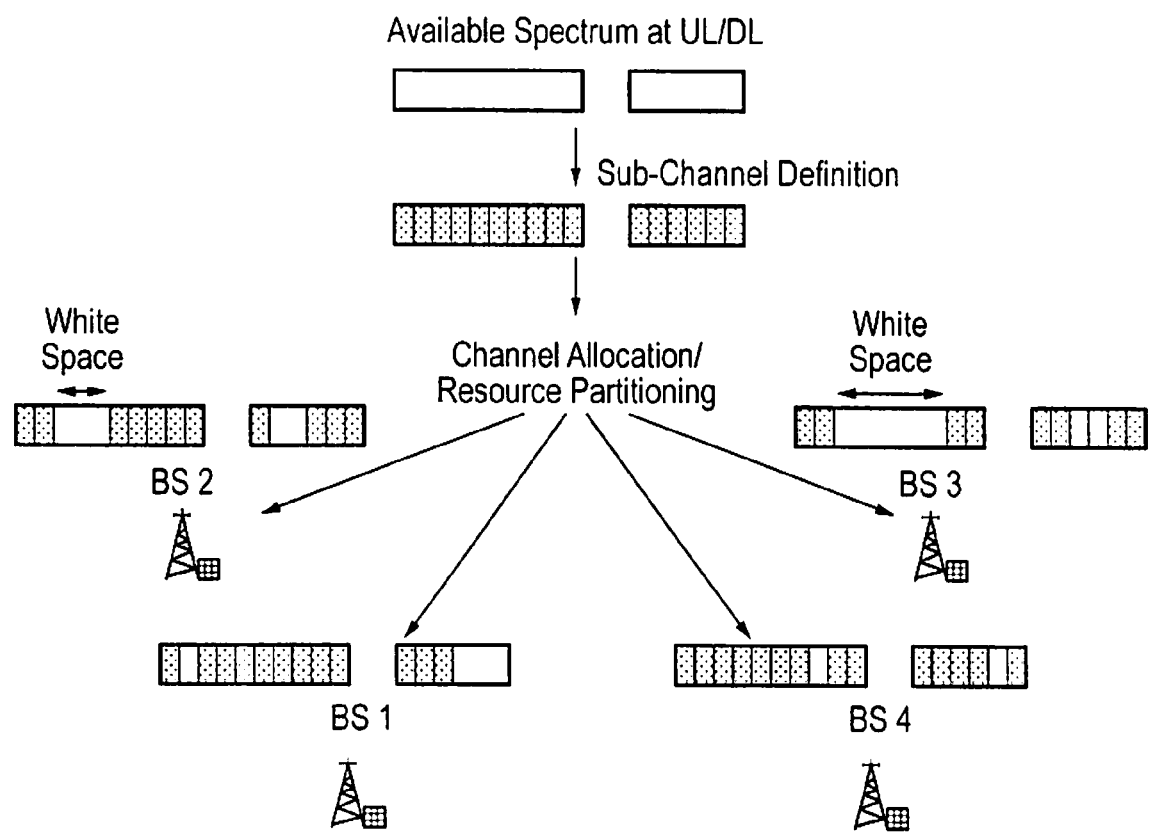
FIG. 7A is a schematic diagram representing spectrum allocation between BSs.
Figure 7B:
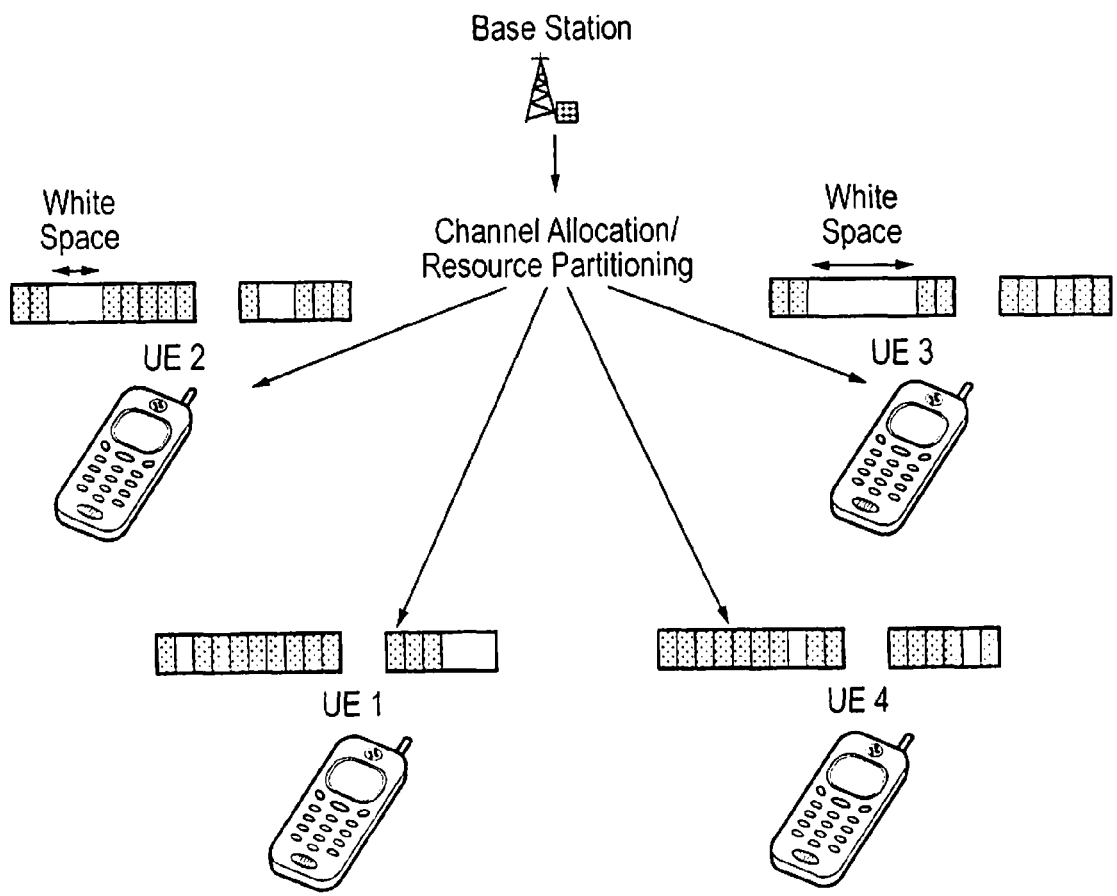
FIG. 7B is a schematic diagram representing spectrum allocation between UEs.

After a decision is reached in the third stage (i.e. on a short-term (ST) basis), decisions can be made to allocate suitable sub-channels to each cell or base station on an extremely short-term basis, for example every couple of tens of milliseconds. This is depicted in FIG. 7A for allocation amongst BSs, and in FIG. 7B for allocation amongst UEs (perhaps as part of another smaller sub-channel arrangement) served by a BS.

FIG. 8 summarizes the four stages mentioned above, in terms of their hierarchical interrelationship. Not all four stages need be performed, and any combination of those stages may be performed concurrently or in an ordered fashion.

FIG. 9 is a schematic diagram of a communication system 20 embodying the present invention, together with bandwidth-assignment diagrams useful for appreciating more clearly aims and benefits of the present invention.

Communication system 20 is a wireless communication system and comprises at least two communication apparatuses 22, labeled as communication apparatus A and communication apparatus B. As will become apparent, embodiments of the present invention focus on a pair of communication apparatuses, such as in FIG. 9, however it will of course be appreciated that the present invention may extend to any number of communication apparatuses.

One or both of the communication apparatuses 22 comprises control means operable to enable the system 20 to carry out a spectrum re-assignment method embodying the present invention. Such a method is considered below, in reference to FIG. 10. For simplicity, such control means are not explicitly shown in FIG. 9. Communication apparatuses 22 may, for example, be base stations (BSs) of a radio access network such as a mobile communication network.

The communication apparatuses 22 are both operable to communicate (with each other and/or with other communication apparatuses not shown in FIG. 9) wirelessly, for example using radio transmissions. For the purpose of such communications, communication apparatuses A and B are each pre-assigned a portion of available shared communication frequency spectrum. Such a pre-assignment is shown in bandwidth-assignment diagram (a) in FIG. 9.

It is possible that, from time to time, one or both of the communication apparatuses 22 may have a sub-optimal allocation of spectrum for one reason or another and wish to change its allocation through spectrum assignment. For example, one communication apparatus 22 may have a relatively high communication load (e.g. amount of data for transmission) at a certain time, and therefore require extra bandwidth or spectrum to support that load. In that situation, it may be beneficial for that communication apparatus 22 to acquire extra spectrum from another communication apparatus 22, if possible. Conversely, one communication apparatus 22 may have a relatively low load at a certain time, and have a portion of its spectrum unused or under-used at that time. In a similar way, it may be beneficial for that communication apparatus 22 to allow another communication apparatus 22 to make use of such under-used, or excess, spectrum. These possibilities can lead to an overall improved utilization of spectrum within the system 20. If the communication apparatuses 22 are operated by different operators (or owners), this can lead to an opportunity for such operators to trade in spectrum.

Bandwidth-assignment diagrams (a) to (e) in FIG. 9 are intended to provide examples of possible re-assignments of spectrum that could occur in the sequential progression shown (i.e. (a) to (e)), or in any order. As can be seen from diagrams (b) and (c), it is possible for either of the communication apparatuses A and B to extend its spectrum allocation into the frequency spectrum previously assigned to the other one of those apparatuses. As can been seen from diagram (d), it is not necessary for the allocations or assignments of spectrum for the communication apparatuses to be single continuous allocations. One of the communication apparatuses 22 may be re-assigned a portion of spectrum contained within a larger portion of spectrum previously assigned to the other communication apparatuses 22. In fact, the spectrum allocations of the two communication apparatuses may be significantly more complex than that shown in diagram (d), for example with the apparatuses having many different and separated (interspersed) portions each having their own power levels and modulation schemes. As can be seen from diagram (e), it is not necessary for all of the spectrum allocated or assigned to communication apparatuses A and B at one time to be allocated to them (in the same way, or in some other way) at another time. For example, if at one time neither of communication apparatuses A and B desires a certain portion of spectrum, it may be more efficient for neither of them to be assigned it. One advantage may be that lower interference is suffered at the other frequencies, and another possible advantage may be that another communication apparatus (e.g. a communication apparatus not shown in FIG. 9, such as a communication apparatus C) could utilize that portion of the spectrum thereby leading to possible increased revenue for operators of communication apparatuses A and B and an improved utilization of spectrum not only between communication apparatuses A and B, but over a communication system larger than that shown in FIG. 9 (e.g. comprising communication apparatuses A, B and C). Finally, although not shown in FIG. 9 for simplicity, it is possible for the spectrum allocations of apparatuses A and B to overlap in frequency and/or time with one another.

FIG. 10 is a flow diagram representing a method 30 embodying the present invention. Method 30 comprises steps S2 and S4, and may be carried out in system 20.

Taking system 20 as an example system, method 30 is carried out when system 20 is in use, i.e. on a dynamic basis. It will become apparent that method 30 may be initiated in a number of different ways, however for the present purposes it will be assumed that, following initiation, steps S2 and S4 are carried out and then the method is terminated. Of course, it is advantageous to carry out method 30 more than once, for example on a regular basis or based upon a trigger, as indicated by the dashed line in FIG. 10. By carrying out method 30 more than once, it is possible to control a plurality or series of re-assignments, thereby allowing the system 20 to effectively "track" changing states or requirements of the system 20 as a whole, or of one or more parts of such a system.

In step S2, an interference indicator indicative of interference expected to result from a reassignment of spectrum between the two communication apparatuses 22 is considered. In step S4, spectrum reassignment is then controlled in dependence upon the considered indicator.

For a better understanding of the present invention, a preferred embodiment will now be considered with reference to FIG. 11. FIG. 11 is a schematic diagram of a wireless communication system 40 embodying the present invention. Communication system 40 comprises two base stations 42, namely BS1 and BS2. Looking back to FIG. 1, BS1 and BS2 may be in the same RAN, or may be in different RANs. Furthermore, BS1 and BS2 of communication system 40 may be considered to be components of a mobile communication system such as communication network 1 of FIG. 1. That is, as well as BS1 and BS2, the communication system 40 may further comprise a number of GWs, a number of BSs, and a number of UEs. Communication system 40 may similarly further comprise an IP Network and a CN.

BS1 and BS2 are therefore capable of transmitting and receiving radio signals, for example to and from UEs, using allocated or assigned frequency spectrum. The present embodiment concerns BS-to-BS fast spectrum assignment and negotiation mechanisms. At the physical layer, it is assumed that power control can be employed to reduce interference, and that in this way it is possible to satisfy the Signal-to-Interference Ratio (SIR) targets for radio transceivers of the system (e.g. BSs and UEs).

Assignment Techniques

A number of different techniques for re-assigning spectrum between BS1 and BS2 will now be considered, such different techniques embodying the present invention. Those techniques involve efficient short-term negotiations between BSs (BS1 and BS2) in a wireless network, assuming that there are only two BSs involved on a localized basis, and assuming that it has been pre-agreed to have only one negotiation happening at any one time. Such negotiations are considered to be exclusive and one-to-one negotiations (i.e. between BS1 and BS2), and this decision-making process may be considered equivalent to steps S2 and S4 of method 30.

As shown in FIG. 11, it is assumed that BS1 and BS2 are able to communicate with one another in order to perform control functions for the re-assignment of spectrum. This communication may comprise wireless communications (e.g. Over The Air (OTA) communications) and/or wired communications (for example over a wired IP link). Although not shown in FIG. 1, such control communications may occur directly between the BSs (for example via a dedicated OTA channel such as a microwave link). Alternatively, or additionally, such control communications may be may be routed via a GW, via the IP network, or even via the CN, following links (wired or wireless) as shown in FIG. 1.

For the benefit of further explanation, it is assumed that system 40 is a radio network comprising N transmitter-receiver nodes (i.e. BSs). These BSs include BS1 and BS2 and are fixed in location and distributed uniformly in a square geographical region of dimension L×L. It also assumed for the following that the BSs have the capability to measure/predict/estimate the interference that they inflict on other BSs (and/or generally on the cells of those BSs) for each possible spectrum assignment, and are also capable of determining/measuring/estimating (or obtaining relevant information regarding) the interference received from other BSs (and/or from the cells of those BSs) for each such spectrum assignment.

It is assumed that each of the base stations (i.e. BS1 and BS2) has a number of different possible spectrum configurations (i.e. each defining an allocation of frequency bandwidth and optionally additionally the power levels/modulation and coding schemes to employ) that it may have assigned to it at any one time. By changing from one configuration to another, a BS's amount of assigned spectrum will change representative of an assignment of spectrum to or from another BS. Such possible configurations may be defined as a set:

$$C_i = [c_{1i} c_{2i} \ldots c_{M_i i}], i=1,2 \quad (1)$$

where $c_{ni}$ is the $n^{th}$ possible configuration of the spectrum for BS i (i.e. transmitter-receiver i), and $M_i$ is the total number of potential and possible such spectrum configurations for BS i. The variables m or p are used in place of the variable n in later description, however in each case the value of variable indicates which of the possible configurations is being referred to.

FIG. 12A is a schematic diagram useful for understanding one possible way of determining the possible spectrum configurations for BS i. It will be appreciated that the process shown in FIG. 12A is one simple and efficient way of determining a number of possible such configurations, however a number of possible configurations could of course be determined in another way. In particular, the process of FIG. 12A does not generate every possible configuration of spectrum assignable to BS i, but instead determines a reasonable number of different configurations with a reasonable spread with reasonable complexity. FIG. 12A may, of course, be adapted to generate every possible spectrum configuration that a BS may adopt, for example including complex assignments of spectrum in separated sub-chunks.

In FIG. 12A, the first possible configuration $c_{1i}$ is considered to be the minimum spectrum chunk for assignment, and the second and further possible configurations are generated in an iterative manner by adding one or two sub-chunks to the preceding possibility. In this way, n different possible configurations are generated, where n=M. Each such chunk and sub-chunk may be made up of a number of pre-defined sub-channels or channels.

FIG. 12B is equivalent to FIG. 12A, except that the spectrum for both two base stations (BS1 and BS2) is shown. The different configurations are different ways of dividing up the total spectrum available to BS1 and BS2 between those two BSs.

FIG. 12C shows a simple example re-assignment in which BS1 goes from configuration m=3 to configuration m=6. That is, BS1 has increased its amount of spectrum by negotiating the release of some spectrum from BS2.

A negotiation stage occurs, as shown during which BS1 will assess all of the different configurations (i.e. from m=1 to m=7) and pick the configuration that it desires. In this assessment, BS1 will therefore consider some configurations which give it a lower amount of bandwidth (i.e. those with m=1 and m=2) as well as the configurations which give it a higher amount of bandwidth (i.e. those with m=4 to m=7).

In a simple system, BS1 may assess the configurations with m=4 to m=7 to have a higher amount of bandwidth than it currently has, but also to have higher interference values (which increases with increasing bandwidth). However many parameters have an impact in interference, as set out in more detail below.

BS1 (after considering all of the possible configurations) selects m=6 as the desired configuration, then BS1 may suggest this as the best configuration to BS2. BS2 may then choose to accept or reject this suggestion. In the simple example re-assignment shown, BS2 accepts this suggestion, thereby giving the "after re-assignment" situation.

FIG. 12D shows a more realistic situation, in which the BSs are not well separated in the frequency domain as shown in FIGS. 12A and 12B. Here, m=1 is the current selection. In this case, m=6 is preferred for BS1 as it not only increases the bandwidth but also reduces the interference.

In real-life situations, interference does not necessarily increase with bandwidth. Many parameters have an impact on interference, depending on the system, its control and the demands on the system, amongst others. Relevant parameters include antenna orientation in the BS, the transmission scheme (say FDD or TDD) in the BS, the nature of sectorization within the cell, the power control scheme proposed, the handover scheme proposed in the cell, the nature of traffic being handled by BS at each point of time and the number of active subscribers assigned to each BS at each point of time. It also depends on the smart antenna scheme employed in the BS.

Perhaps the most important additional parameter to be taken into consideration is the transmission power (say for example BS2 transmits currently in each of its spectrum sub-chunks with different powers). Another important parameter is the interference leakage between two adjacent sub-bands as shown in FIG. 12E. In telecom systems one practical solution is to introduce a guard band to prevent leakage. As shown in the FIG. 12E, BS1 in its current spectrum configuration is sandwiched between two sub-chunks of BS2. By selecting m=6 not only do we get larger amount of spectrum, but we also have lower potential interference (less potential leakage). This is of course true particularly if the power profiles, the antenna orientation and sectorization and the outcome of the smart antenna solution are all in favour of a low interference for assignment m=6. Clearly, where m=6, overall separation distance between the two BSs is higher than where m=1.

However, it is worth noting that depending on the parameters mentioned above, it is also possible to envisage a potential scenario in which m=1 is actually preferred to m=6, especially if a smart antenna solution is used.

In FIG. 12A, it is also assumed that $B_i$ is the total bandwidth associated with each spectrum configuration for assignment, so that:

$$B_i = [B_{1i} \quad B_{2i} \quad \ldots \quad B_{M_i i}] \quad (2)$$
$$= [BW(c_{1i}) \quad BW(c_{2i}) \quad \ldots \quad BW(c_{M_i i})], i = 1, 2$$

where function BW(.) represents the allocated bandwidth of each such spectrum configuration.

The interference expected to be inflicted by BS i on BS j (BS j being a BS other than BS i) relating to particular spectrum configurations can be expressed as:

$$I_{ij} = \begin{cases} f(c_{ni}, c_{pj}, \eta_{ij}, p_i) & \text{if } c_{ni} \text{ and } c_{pj} \text{ Overlap} \\ 0 & \text{otherwise} \end{cases} \quad (3)$$

where $c_{ni}$ is the $n^{th}$ possible configuration of the spectrum for BS i, where $c_{pj}$ is the $p^{th}$ possible configuration of the spectrum for BS j, where pi is the transmission power associated with BS i (i.e. transmitter-receiver i), and where $\eta_{ij}$ is the overall transmission gain associated with the wireless communication link between BS i and BS j. Essentially, the greater the overlap (or interspersal) between two possible spectrum configurations, the greater the amount of interference expected.

In a similar way, the interference expected to be inflicted on BS i associated with BS j relating to particular spectrum configurations can be expressed as:

$$I_{ji} = \begin{cases} f(c_{pj}, c_{ni}, \eta_{ji}, p_j) & \text{if } c_{ni} \text{ and } c_{pj} \text{ Overlap} \\ 0 & \text{otherwise} \end{cases} \quad (4)$$

The overall interference $\gamma_i$ expected to be received at BS i (or say cell i) from all the other base stations relating to particular spectrum configurations can therefore be determined as $$\gamma_i = \sum_{j=1, j \neq i}^{N} I_{ji} \quad (5)$$

The overall interference $\beta_i$ expected to be inflicted by BS i on the other base stations relating to particular spectrum configurations can therefore be determined as $$\beta_i = \sum_{j=1, i \neq j}^{N} I_{ij} \quad (6)$$

In order to have a fair comparison on received SIR in each base station, it is assumed that the received signal power in each BS i is expected to be $S_i$, so that:

$$S_1, i = 1, 2 \quad (7)$$
and
$$SIR_i = \frac{S_i}{\gamma_i} \quad (8)$$

Following on from the above, there are different possible considerations that may be made with respect to possible re-assignments of spectrum. For example, the two involved BSs (BS1 and BS2) may belong to a so-called "hot spot" where data traffic load is particularly high. In that case, those BSs may not consider the impact of their short-term spectrum assignment strategy on surrounding BSs, presuming either that those other BSs are located sufficiently far away from them or that those other BSs are of low importance. It is possible that an arrangement of directional antennas for the BSs in such a hot spot could be such that their specific cells have maximum impact on each other with negligible impact on, or from, other cells. Essentially, those BSs (BS1 and BS2) may in one embodiment only consider their impact and interference on each other. As a second example, the two involved BSs (BS1 and BS2) may only consider the impact of interference inflicted on first tier cell. FIG. 12F shows a cell of interest surrounded by directly neighbouring cells (first tier cells) and cells spaced by one cell from the cell of interest (second tier cells). As a third example, the two involved BSs (BS1 and BS2) may only consider the impact of interference inflicted on first tier cell and interference received from first tier cell.

Four possible methods (Methods A, B, C and D) for conducting spectrum sharing, or spectrum exchange (re-assignment) between the two involved BSs (BS1 and BS2) will now be described as examples of how the present invention may be put into effect. These methods relate to short-term spectrum re-assignment between the two involved base stations, but could of course be used on any timescale. In each of Methods A to D, it is assumed that BS1 is a potential assignor of spectrum to BS2, with BS2 therefore being a potential assignee of such spectrum.

In each of Methods A to D, the involved BSs essentially change their assigned spectrum configurations, which therefore may be considered to be equivalent to a transfer of spectrum between the BSs (in the present case from BS1 to BS2). For BS2 to be an assignee of spectrum, it will be appreciated that its change in spectrum configuration will involve an increase in bandwidth.

FIG. 13 is a schematic diagram representing Method A, which embodies the present invention. FIG. 13 indicates the communications between BS1 and BS2, and the actions performed at those BSs during operation of Method A.

Method A (Selfish Approach)

In Method A, BS1 informs BS2 that it has a portion of spectrum that is available for re-assignment. For example, BS1 may not have enough traffic load at that time, or may not be expecting enough traffic load at the time of the proposed re-assignment, to justify retaining all of its currently-assigned spectrum. Effectively, BS1 may temporarily have, or be expecting to have, available redundant spectrum.

In response, BS2 performs a spectrum-selection operation to identify a spectrum configuration that it would like to adopt following the prospective re-assignment. Examples of such an operation will be described later with reference to FIGS. 14 to 17. As a result of the spectrum-selection operation, BS2 then informs BS1 of its suggestion of its desired spectrum configuration.

BS1 then performs a spectrum-evaluation operation to evaluate the suggested spectrum configuration and decide whether or not to approve the re-assignment. Such an operation will be described later with reference to FIG. 18. Following the spectrum-evaluation operation, BS1 then informs BS2 of whether or not it has approved the suggested spectrum re-assignment.

If BS1 approves the suggested re-assignment, that re-assignment occurs and BS1 and BS2 adopt their respective spectra taking account of the re-assignment. That is, if BS1 approves the suggested re-assignment, then BS2 will adopt its suggested spectrum configuration and BS1 will adopt a corresponding configuration that takes account of spectrum (in this case) transferred to BS2.

Such re-assignment may occur at a pre-determined time negotiated between BS1 and BS2. Alternatively, it may be that BS1 and BS2 are configured to carry out re-assignments on a regular or semi-regular basis, in which case the approved re-assignment may take effect at the next planned re-assignment time. Such re-assignments may take effect for a predetermined amount of time, or for an amount of time negotiated between the two BSs. An external apparatus may control the timings of such re-assignments and/or the amount of time for which such re-assignments have effect. A trigger may control the timings of the re-assignments. If BS1 does not approve the suggested re-assignment, that re-assignment does not occur and BS1 and BS2 adopt their existing respective spectra.

FIG. 14 is a flow diagram of a method 50, being an example of a spectrum-selection operation as mentioned above. Method 50 comprises step S51, in which BS2 selects a desired value of m taking into account expected received interference. As described above with reference to FIG. 12, each value of m represents a different available spectrum configuration, and therefore the selecting of a value of m is equivalent to the selecting of a spectrum configuration desired for re-assignment. Each different configuration will likely lead to a different amount of expected received interference for BS2. Therefore, by taking into account such expected received interference, BS2 can select a desired portion of spectrum for suggestion to BS1 as in FIG. 13.

One way for BS2 to select a desired portion of spectrum is to assess the full range of values of m, i.e. from 1 to M, and then pick the value of m that provides, for example, the least expected received interference. This could be considered to be a way of picking the "best" value of m. Alternatively, BS2 could assess values of m in an order, and pick the first value of m that provides, for example, an expected received interference value below a threshold. This could be considered to be a way of picking the "first acceptable" value of m. It will be appreciated that a desired value of m could be chosen in many other ways, for example taking into account a history of previously selected such values.

FIG. 15 is a flow diagram of a method 60, being another example of a spectrum-selection operation. Method 60 is one way of picking the "best" value of m, and comprises steps S61 to S65. As well as considering expected received interference, this method also considers bandwidth associated with the different configurations m. As can be seen from FIG. 15, this method sets m=1 in step S61, and then evaluates and stores in step S62 values of $B_{m,2}$ (bandwidth) and $\gamma_{2,m}$ (expected received interference) for each value of m, based upon steps S63 and S64. Then, the preferred value for m is chosen in step S65 based on the stored values. In this way, it is possible to choose the so-called "best" value of m, which may be the one giving the lowest expected received interference or the highest bandwidth, or the one best meeting some other requirement.

FIG. 16 is a flow diagram of a method 70, being yet another example of a spectrum-selection operation. Method 70 comprises steps S71 to S80.

Method 70 takes account of the current state of BS2, in order to try to improve that state by means of the proposed spectrum re-assignment. In step S71, the current values of received interference, bandwidth and spectrum configuration are therefore evaluated. In step S72, those evaluated values are stored as "best" values, so that any other values can be compared against those "best" values to check that an improvement in conditions is likely to occur. Also, in step S72, a variable m is preset to m=1.

In step S73, the expected received interference and bandwidth are evaluated for the current value of m, i.e. for the spectrum configuration with that value of m. In step S74, the bandwidth evaluated in step S73 is compared against the corresponding "best" value. If the evaluated bandwidth is not greater than the corresponding "best" value, the method proceeds to step S77. If the evaluated bandwidth is greater than the corresponding "best" value, the method proceeds to step S75 in which the expected interference evaluated in step S73 is compared against the corresponding "best" value. Similarly, if the evaluated expected interference is not less than the corresponding "best" value, the method proceeds to step S77. If, however, the evaluated expected interference is less than the corresponding "best" value, the method proceeds to step S76.

In step S76, it is considered that the values evaluated in step S73 are better than the "best" values stored in step S72. Therefore, the values evaluated in step S73 are set as the new "best" values. The method then proceeds to step S77.

In step S77 it is determined whether the current value of the variable m is the maximum value M. If this is not the case, the value of m is incremented in step S78 and then the method returns to step S73. In this way, all values of m are considered.

If, in step S77, it is determined that the current value of the variable m is the maximum value M, the method proceeds to step S79. In step S79 a decision is made as to whether to accept the result of carrying out method 70. For example, it is possible that while method 70 is being carried out, communication conditions have changed substantially, such that it may be necessary to either abandon re-assignment entirely or "re-think" what spectrum change is required. For example, it may be that at the point of carrying out step S79 BS2 is no longer a prospective assignee of spectrum but instead a prospective assignor. If in step S79 it is decided that the result of carrying out method 70 should not be accepted, the method is exited. Following such exit, method 70 may be re-started or some other method may be carried out. If in step S79 it is decided that the result of carrying out method 70 should be accepted, the method proceeds to step S80 in which the currently stored "best" values are adopted. That is, these values (including the value of m representative of these values) will serve as the basis of the suggestion of a desired spectrum configuration sent from BS2 to BS1 in Method A. It will of course be appreciated that step S79 may be optional, i.e. such that step S80 follows on from step S77 without any decision as to whether to accept the result of method 70.

In this and the following flow diagrams involving comparisons between values using "<" and ">", and a consequent choice of paths, the skilled person will appreciate that where the values to be compared are equal, the method should default along one pathway or the other to avoid completion errors.

FIG. 17 is a flow-diagram of a method 80, being yet another example of a spectrum-selection operation. Method 80 comprises steps S81 to S80, and may be considered an alternative to method 70.

In step S81, the current values of received interference, inflicted interference, bandwidth and spectrum configuration are evaluated and stored as "best" values. In step S82, a variable m is preset to m=1.

In step S83, the expected received interference, inflicted interference, bandwidth and spectrum configuration are evaluated for the current value of m, i.e. for the spectrum configuration with that value of m. In step S84, the bandwidth evaluated in step S83 is compared against the corresponding "best" value. If the evaluated bandwidth is not greater than the corresponding "best" value, the method proceeds to step S87. If the evaluated bandwidth is greater than the corresponding "best" value, the method proceeds to step S85 in which the expected received interference evaluated in step S83 is compared against the corresponding "best" value. Similarly, if the evaluated expected received interference is not less than the corresponding "best" value, the method proceeds to step S87. If, however, the evaluated expected received interference is less than the corresponding "best" value, the method proceeds to step S86.

In step S86, it is considered that the values evaluated in step S83 are better than the "best" values. Therefore, the values evaluated in step S83 are set as the new "best" values. The method then proceeds to step S87.

In step S87 it is determined whether the current value of the variable m is the maximum value M. If this is not the case, the value of m is incremented in step S88 and then the method returns to step S83.

If, in step S87, it is determined that the current value of the variable m is the maximum value M, the method proceeds to step S89. In step S89, the currently-stored "best" values are adopted. That is, these values (including the corresponding value of m) will serve as the basis of the suggestion of the desired spectrum configuration sent from BS2 to BS1 in Method A.

Of course, although expected inflicted interference values may be evaluated in method 80, it will appreciated that this is not essential, since those values have no effect on the operation of method 80.

As mentioned above, as a result of a spectrum-selection operation (examples of which have been explained above), BS2 then informs BS1 of its suggestion of the spectrum configuration it would like to adopt following the proposed re-assignment. BS1 then performs a spectrum-evaluation operation to evaluate the suggested spectrum configuration and decides whether or not to approve the re-assignment. FIG. 18 is a flow-diagram of a method 90, being an example of such a spectrum-evaluation operation. Method 90 comprises steps S91 to S95.

Method 90 takes account of the current state of BS1, so that BS1 can determine whether the proposed re-assignment of spectrum is likely to improve that state, or not. In step S91, the current values of received interference and inflicted are evaluated and stored as "best" values, so that any other values can be compared against those "best" values to check that an improvement in conditions is likely to occur. Such stored values may be the current values, or recent best values.

In step S92, the suggestion of spectrum configuration $C_{2,m}$ (assuming the value of m is the value chosen by BS2) made by BS2 is considered, and the expected received interference for BS1 given the suggested new configuration for BS2 is evaluated. In step S93, the expected received interference for BS1 evaluated in step S92 is compared against the corresponding "best" value of step S91. If the evaluated expected received interference is less than the corresponding "best" value, the method proceeds to step S94. If, however, the evaluated expected received interference is not less than the corresponding "best" value, the method proceeds to step S95. In step S94 the proposed re-assignment is approved, and in step S95 the proposed re-assignment is disapproved.

It will of course be appreciated that although interference inflicted by BS1 is considered in step S91, it is not essential, since inflicted interference has no bearing on the execution of method 90.

FIG. 19 is a schematic diagram representing Method B, which embodies the present invention. FIG. 19 indicates the communications between BS1 and BS2, and the actions performed at those BSs during operation of Method B.

Method B, Selfish Approach

In Method B, BS2 informs BS1 that it has a requirement for extra spectrum, in the form of a spectrum request. For example, BS2 may have an overload of traffic at that time, or may be expecting an overload at the time of the proposed re-assignment. Effectively, BS2 may temporarily have, or be expecting to have, a shortage of available spectrum. Such a need for spectrum may be an urgent need for spectrum, or a high level of need for spectrum, and embodiments of the present invention may extend to indicating the level of importance of such a request for spectrum.

Having notified BS1 of such a requirement, BS2 performs a spectrum-selection operation to identify a spectrum configuration that it would like to adopt following the proposed re-assignment. Examples of such an operation have already been described above with reference to FIGS. 14 to 17, and accordingly further such description is omitted. As a result of the spectrum-selection operation, BS2 then informs BS1 of its suggestion of its desired spectrum configuration following re-assignment.

BS1 then performs a spectrum-evaluation operation to evaluate the suggested spectrum configuration and decide whether or not to approve the re-assignment. Such an operation has already been described above with reference to FIG. 18. Following the spectrum-evaluation operation, BS1 then informs BS2 of whether or not it has approved the suggested spectrum re-assignment.

If BS1 approves the suggested re-assignment, that re-assignment occurs and BS1 and BS2 adopt their respective spectra taking account of the re-assignment. Accordingly, it will be appreciated that Method B is essentially similar to Method A, except that it is initiated by a request from BS2 for spectrum, rather than by an offer from BS1 of spectrum.

FIG. 20 is a schematic diagram representing Method C, which embodies the present invention. FIG. 20 indicates the communications between BS1 and BS2, and the actions performed at those BSs during operation of Method C.

Method C, Considerate Approach

Method C is closely similar to Method A in that it relates to an offer from BS1 to BS2 of available spectrum. The main difference between Method C and Method A, is that in Method C inflicted interference is taken into account as well as received interference. As a result, Method C may be considered to be a "considerate" approach, whereas Method A may be considered to be a "selfish" approach. In fact, it will become apparent that Methods C and D are "considerate" versions of "selfish" Methods A and B, respectively.

In Method C, BS1 informs BS2 that it has a portion of spectrum that is available for re-assignment. For example, BS1 may not have enough traffic load at that time, or may not be expecting enough traffic load at the time of the proposed re-assignment, to justify retaining all of its currently-assigned spectrum. Effectively, BS1 may temporarily have, or be expecting to have, available redundant spectrum.

In response, BS2 performs a spectrum-selection operation to identify a spectrum configuration that it would like to adopt following the prospective assignment. Spectrum-selection operations suitable for use in Method C may be considered to be "considerate" versions of the so-called "selfish" spectrum-selection operations of FIGS. 14 to 17. Examples of spectrum-selection operations suitable for Method C are shown in FIGS. 21 to 24. As a result of the spectrum-selection operation, BS2 then informs BS1 of its suggestion of the desired spectrum configuration.

BS1 then preferably performs a spectrum-evaluation operation to evaluate the suggested spectrum configuration and decides whether or not to approve the re-assignment. A spectrum-evaluation operation suitable for use in Method C may be considered to be a "considerate" version of the so-called "selfish" spectrum-evaluation operation of FIG. 18. An example of a spectrum-evaluation operation suitable for Method C is shown in FIG. 25. Following the spectrum-evaluation operation, BS1 then informs BS2 of whether or not it has approved the suggested spectrum re-assignment.

If BS1 approves the suggested re-assignment, that re-assignment occurs and BS1 and BS2 adopt their respective spectra taking account of the re-assignment.

As shown in FIG. 20, it is possible that BS1 would not carry out a spectrum-evaluation operation to evaluate the spectrum suggested by BS2, and in that way decide whether or not to approve the re-assignment. Instead, it is possible that BS1 would simply acknowledge the suggestion of BS2, following which the re-assignment would occur. That is, it is possible that BS1 automatically accepts the suggestion of BS2. Such automatic acceptance may usefully be employed in Method C (and also in Method D) given that the method is "considerate" and accordingly, as will be appreciated below, that BS2 has taken into account inflicted interference. In this way, it is possible to avoid carrying out a spectrum-evaluation operation. Of course, such automatic acceptance could be employed in Methods A and B, similarly to avoid carrying out a spectrum-evaluation operation.

FIGS. 21 to 24 are flow-diagrams of methods 100, 110, 120 and 130, being examples of spectrum-selection operations for use in Method C as mentioned above. Methods 100, 110, 120, and 130 are closely similar to methods 50, 60, 70 and 80, respectively, except that inflicted interference is considered as well as received interference. Accordingly, the detailed description of methods 50, 60, 70 and 80 applies analogously to methods 100, 110, 120 and 130, and therefore a detailed description of methods 100, 110, 120 and 130 is omitted. It is of course possible that methods 50, 60, 70 and 80 could be adapted to consider inflicted interference instead of received interference.

Similarly, FIG. 25 is a flow diagram of a method 140, being an example of a spectrum-evaluation operation for use in Method C as mentioned above. Method 140 is closely similar to method 90, except that inflicted interference is considered as well as received interference. Accordingly, the detailed description of method 90 applies analogously to method 140, and therefore a detailed description of method 140 is omitted. It is of course possible that method 90 could be adapted to consider inflicted interference instead of received interference.

FIG. 26 is a schematic diagram representing Method D, which embodies the present invention. FIG. 26 indicates the communications between BS1 and BS2, and the actions performed at those BSs during operation of Method D.

Method D, Considerate Approach

Method D is closely similar to Method B in that it relates to a request from BS2 to BS1 for extra spectrum. The main difference between Method D and Method B, is that in Method D inflicted interference is taken into account as well as received interference. As a result, Method D may be considered to be a "considerate" approach, whereas Method B may be considered to be a "selfish" approach.

In Method D, BS2 informs BS1 that it has a requirement for extra spectrum, in the form of a spectrum request. BS2 may have an overload of traffic at that time, or may be expecting an overload at the time of the proposed re-assignment. Effectively, BS2 may temporarily have, or be expecting to have, a shortage of available spectrum. Such a need for spectrum may be an urgent need for spectrum, or a high level of need for spectrum, and embodiments of the present invention may extend to indicating the level of importance of such a request for spectrum. The request is not essential, and neither is it in Method B, as the process could be triggered in another way.

Such a request may be responded to by BS1 in the form of an acknowledgement, or an initial acceptance or rejection of BS2's application for re-assignment (as shown in FIG. 26). This may be useful when, for example no spectrum-evaluation operation is performed, as suggested above with reference to Method C.

Having notified BS1 of such a requirement, BS2 performs a spectrum-selection operation to identify a spectrum configuration that it would like to adopt following the proposed re-assignment. Examples of such an operation have already been described above with reference to FIGS. 21 to 24, and accordingly further such description is omitted. As a result of the spectrum-selection operation, BS2 then informs BS1 of its suggestion of the desired spectrum configuration.

BS1 then optionally performs a spectrum-evaluation operation to evaluate the suggested spectrum and decide whether or not to approve the re-assignment. Such an operation has already been described above with reference to FIG. 25. Following the spectrum-evaluation operation, BS1 then informs BS2 of whether or not it has approved the suggested spectrum re-assignment.

If BS1 approves the suggested re-assignment, that re-assignment occurs and BS1 and BS2 adopt their respective spectra taking account of the re-assignment. Accordingly, it will be appreciated that Method D is essentially similar to Method C, except that it is initiated by a request from BS2 for spectrum, rather than by an offer from BS1 of spectrum.

FIGS. 14 to 17 and 21 to 24 show spectrum-selection operations and FIGS. 18 and 25 show spectrum-evaluation operations. Any such spectrum-selection operation and any such spectrum-evaluation operation may be used in Methods A to D, for example leading to hybrid "considerate/selfish" methods.

Looking back to FIG. 1, either of BS1 and BS2 may inform a GW or the CN or another BS of the result of spectrum negotiations. For example, information regarding whether re-assignment has been agreed and what spectrum is being assigned (and/or for how long) may be communicated across the network for processing elsewhere. A central record of re-assignments may for example be created.

In the above Methods A to D, it will be appreciated that the advantage of "selfish" approaches over "considerate" approaches is that information about the interference inflicted on other base stations is not required, leading to less signalling overhead or less complexity. "Considerate" approaches may be more advantageous than "selfish" approaches because they are more likely to lead to an overall improved network performance, for example in terms of fairness of performance between different BSs (which may belong to different operators).

Interference Measurements

In the Methods A to D, interference values (being indicators of expected interference) are evaluated and considered in order to select a spectrum configuration for re-assignment and also in order to decide whether to approve the re-assignment. It is envisaged that such values need not be evaluated each time the method is executed, and may for example be evaluated in advance and pre-stored. For example, Methods A to D may, instead of evaluating such values, access the values from a stored look-up table. Such values may be stored locally within the relevant BS, or may be stored remotely in an external apparatus.

The present invention extends to approaches to obtain interference values for use in methods embodying the present invention, for example in Methods A to D described above. A number of such approaches will now be described to enable a better understanding of the present invention.

The first to fifth approaches mentioned below relate to interference inflicted by one BS on another such BS. The sixth and seventh approaches relate to interference inflicted by UEs served by one BS on another BS. Both types of interference are important and therefore considered separately.

First Approach:

As a first approach, before making the system of BSs (i.e. the N BSs including BS1 and BS2 as mentioned above with reference to equation (1)) operational, a number of measurements/estimations are performed for each BS assuming isolated operation (i.e an absence of other causes of interference). These measurements/estimations are carried out such that if any specific BS switches on and starts to transmit using a particular spectrum configuration C, thereby having a change in transmission power (dP) in that spectrum configuration C, the expected resultant change in interference (dI) inflicted on any target BS of the system is known. Each BS then establishes a table of parameters so that for each possible spectrum configuration C and transmission power P, the expected interference inflicted on each other BS of the system is known.

The measurement is to give an idea to the BS about the amount of interference which is going to be inflicted on other BSs. An assumption here is that the other BSs will listen in and measure the interference all over the radio spectrum and not just for the specific combinations or configurations. It is the BS of interest that will try all the combinations of spectrum (i.e. all the configurations) and record the reported interference values.

Second Approach:

A second approach is envisaged, which is similar to the first approach. Each BS causes an initial measurement to be carried out, employing a particular spectrum configuration C and a default transmission power level P, so that it can determine how much interference rise it causes in any other target base station when it transmits in that particular spectrum configuration C with the default power P. The base interference rises in the other BSs are stored in the BS concerned. Each BS is also aware of the average propagation conditions between itself and each other BS (represented by η in the above equations). Each BS then, for each change of power (dP) and each different assignment C, estimates the potential change in interference (dI) expected at each other BS. This second approach accordingly generates a table of parameters similar to that generated in the first approach, but using the initial measurement to estimate the other required parameters.

Third Approach:

A third approach is envisaged which corresponds to one possible way of implementing the above-described second approach. It is assumed that the radio-channel fading conditions remain substantially unchanged when a BS changes from transmitting with one spectrum configuration (e.g. C1) to another spectrum configuration (e.g. C2). With this in mind, FIGS. 27 and 28 show possible actions and communications that could be carried out by BS1 and BS2 in the third approach.

In FIG. 27, BS1 initially indicates to BS2 that it is about to enter a test phase and test transmit using spectrum configuration C1 with power P1. As indicated by the dashed arrow in FIG. 27, this initial indication is not essential, as both BS1 and BS2 may carry out the third approach in response to an external trigger or at a pre-determined test time.

BS1 then test transmits using spectrum configuration C1 with power P1 and (although not shown in FIG. 27) BS2 takes a measure of the interference rise as a result of the test transmission from BS1. BS2 then signals to BS1 an index representing the approximate interference rise, and BS1 makes a record thereof.

As indicated in FIG. 27, BS1 then estimates the interference expected to be suffered by BS2 as a result of transmission using each of the other spectrum configurations C2, C3, . . . Cn. BS1 then signals to BS2 that it has completed its test phase, and that BS2 may carry out its own test phase.

FIG. 28 represents the same sequence of actions and communications as shown in FIG. 27, except that BS2 enters the test phase and transmits, and BS1 takes the interference measurement and signals an index back to BS2. Accordingly, duplicate description is omitted. Nevertheless, it can be appreciated that in this way a number of BSs can enter test phases one by one so as to gather information regarding expected levels of interference for different spectrum configurations C (and, although not shown in FIGS. 27 and 28, for different power levels P as will become apparent with reference to the fourth approach described below). It will be appreciated that in each test phase, the transmitting BS could receive interference indexes from a plurality of different BSs each taking their own measurements. In this way, each BS can collect information about a plurality of other BSs in its test phase, and complete a full set of values for those other BSs by estimation in the same way as shown in FIGS. 27 and 28.

Fourth Approach:

A fourth approach is envisaged which corresponds to one possible way of improving upon the third approach described above. In the third approach, the test transmission is made using power P1 and spectrum configuration C1, and thus the estimated values for configurations C2 to Cn correspond to transmissions using power P1. The fourth approach addresses the issue of changing transmission powers P as well as changing spectrum configurations C.

Again, it is assumed that the radio-channel fading conditions remain substantially unchanged when a BS changes from transmitting with one spectrum configuration (e.g. C1) to another spectrum configuration (e.g. C2). With this in mind, FIGS. 29 and 30 show possible actions and communications that could be carried out by BS1 and BS2 in the fourth approach.

In FIG. 29, BS1 initially indicates to BS2 that it is about to enter a test phase and test transmit using spectrum configuration C1 with power P1. Again, as indicated by the dashed arrow in FIG. 29, this initial indication is not essential, as both BS1 and BS2 may carry out the fourth approach in response to an external trigger or at a pre-determined test time.

BS1 then test transmits (as in the third approach) using spectrum configuration C1 with power P1 and (although not shown in FIG. 29) BS2 takes a measure of the interference rise as a result of the test transmission from BS1. BS2 then signals to BS1 an index representing the approximate interference rise, and BS1 makes a record thereof. Unlike in the third approach, in the fourth approach BS1 then test transmits again using spectrum configuration C1 with power P2 and receives for recordal a further index from BS2, and so on and so forth until BS1 has a record of the interference expected to be suffered by BS2 when it transmits using spectrum configuration C1 with any power from P1 to Pn.

BS1 then estimates the interference expected to be suffered by BS2 as a result of transmission using each of spectrum configurations C2, C3, . . . Cn, when combined with each of the power levels P2, P3 . . . Pn. BS1 then signals to BS2 that it has completed its test phase, and that BS2 may carry out its own test phase.

Of course, although Cn and Pn suggest that there are the same number of different spectrum assignments C and power levels P, this need not be so. Further, although it may be desirable to obtain estimations of every possible combination of C and P, it may be more desirable in terms of processing time to only obtain estimations for a number of "likely" combinations, or to only generate estimations when they are required (effectively "on the fly").

FIG. 30 represents the same sequence of actions and communications as shown in FIG. 29, except that BS2 enters the test phase and transmits, and BS1 takes the interference measurements and signals indexes back to BS2. Accordingly, duplicate description is omitted. Nevertheless, it can be appreciated that in this way a number of BSs can enter test phases one by one so as to gather information regarding expected levels of interference for different spectrum configurations C. In each test phase, the transmitting BS could receive interference indexes from a plurality of different BSs each taking their own measurements. In this way, each BS can collect information about a plurality of other BSs in its test phase, and complete a full set of values for those other BSs by estimation in the same way as shown in FIGS. 29 and 30.

Fifth Approach:

A fifth approach is envisaged which is analogous to the third and fourth approaches, but which considers the scenario in which the radio-channel fading conditions are substantially changeable when a BS changes from transmitting with one spectrum configuration (e.g. C1) to another spectrum configuration (e.g. C2), and/or when it changes from one transmission power (e.g. P1) to another transmission power (e.g. P2).

The fifth approach is therefore based more on individual measurements and feedback than on estimations as in the third and fourth approaches. In the fifth approach, when the radio-channel fading is not similar for the potential spectrum assignments C and/or transmission powers P, individual measurement is performed for each potential channel (spectrum) assignment C (and/or for each potential transmission power P). With this in mind, FIGS. 31 and 32 show possible actions and communications that could be carried out by BS1 and BS2 in the fifth approach.

In FIG. 31, BS1 initially indicates to BS2 that it is about to enter a test phase and test transmit using spectrum configuration C1 with power P1. Again, as indicated by the dashed arrow in FIG. 31, this initial indication is not essential, as both BS1 and BS2 may carry out the fifth approach in response to an external trigger or at a pre-determined test time.

BS1 then test transmits (as in the third approach) using spectrum configuration C1 with power P1 and (although not shown in FIG. 31) BS2 takes a measure of the interference rise as a result of the test transmission from BS1. BS2 then signals to BS1 an index representing the approximate interference rise, and BS1 makes a record thereof. Unlike in the third approach, in the fifth approach BS1 then test transmits again using spectrum configuration C2 with power P1 and receives for recordal a further index from BS2, and so on and so forth until BS1 has a record of the interference expected to be suffered by BS2 when it transmits using spectrum configurations C1 to Cn with power P1. Accordingly, no estimation is carried out at BS1, and instead its values are obtained by individual measurements.

BS1 then signals to BS2 that it has completed its test phase, and that BS2 may carry out its own test phase. FIG. 32 represents the same sequence of actions and communications as shown in FIG. 31, except that BS2 enters the test phase and transmits, and BS1 takes the interference measurements and signals indexes back to BS2. Accordingly, duplicate description is omitted.

Of course, although FIGS. 31 and 32 essentially correspond to the fifth-approach version of FIGS. 27 and 28 (the third approach), it would be similarly possible to carry out a fifth-approach version of FIGS. 29 and 30 (the fourth approach) by carrying out measurements at different power levels P and using different spectrum assignments C.

As mentioned above, the following sixth and seventh approaches are proposed to measure the interference inflicted from UEs served by one BS on other BS.

Sixth Approach:

A sixth approach is envisaged which takes into account UEs. Such an approach is suitable to be carried out before the network (including the BSs and UEs) becomes fully operational, i.e. as part of a network setup/configuration/initialisation process (similarly to the first to fifth approaches described above).

In the sixth approach, before making the system or network fully operational, some measurement/estimation is performed assuming isolated operation. The aim is to discover, for a group of UEs served by a particular BS and starting to transmit (thereby having a change in transmission power (dP) in a possible spectrum configuration C), what the expected change in interference (dI) at a target BS will be. As a result of the sixth approach (similarly to the first to fifth approaches) the particular BS establishes a table of parameters representing the expected interference inflicted at target BSs as a result of its served UEs transmitting with (or within) any specific spectrum configuration C with any specific transmission power P or modulation and coding scheme S.

In order to gain useful results with acceptable complexity, the geographical area served by the particular BS (known as a cell) is divided into a number of component regions by a grid, and different numbers of UEs are considered in the different regions, for example including a maximum expected number of UEs (transceivers) per grid region or per cell.

In order to carry out the sixth approach, a multi-stage process is envisaged. FIGS. 33 to 35 are schematic diagrams showing an example geographical layout of three BSs, namely BS1, BS2, and BS3, for use in understanding the sixth approach. In FIGS. 33 to 35, BS1 is considered to be the BS in charge, i.e. the BS in whose cell the UEs are present and therefore the BS gaining information about the effect its served UEs may have on other BSs. Those "other" BSs in FIGS. 33 to 35 are BS2 and BS3. As can be seen, the cell of BS1 is divided up into a number of component grid regions by a grid.

Before the network becomes live and fully operational, a number of UEs (from only one to the maximum expected number of UEs) is allocated within a specific grid region of the cell of BS1 (the BS in charge). BS1 is aware of the most probable or practical modulation and coding scheme S the UEs within the grid regions are most likely to be assigned for transmission purposes. BS1 (the BS in charge in this example) informs the other BSs, BS2 and BS3, that test transmissions are about to be carried out.

BS1 divides the possible spectrum configurations C into a number of sub-bands, and then informs the UEs in the current grid region of interest which sub-band of which spectrum configuration C, and which modulation and coding scheme S they are about to transmit with. As indicated in FIG. 33, BS1 then requests the UEs in the grid region of interest (in this case four UEs are shown in a particular grid region) to sweep the specified spectrum configuration C starting from the first sub-band. The other BSs, in this case BS2 and BS3, then measure the associated interference rise in each sweep attempt and then report their findings back to BS1, as shown in FIG. 34. BS1 then makes a record of the various interference rises.

The above process could of course be repeated for different numbers of UEs, different grid regions, different spectrum assignments C, different transmission powers P, and different modulation and coding schemes S. The above process could also be repeated with different BSs being the BS in charge. Moreover, the first to fifth approaches could be adapted for application in the present sixth approach. As another level of complexity, the mobility of UEs may also be taken into account, and measurements may be taken when different numbers of UEs move from one grid region to another at different speeds. In one variation, the mobile UEs may be configured to transmit when they are all allocated in the same grid region (or grid cell). When the network becomes operational, and before ST spectrum assignments are carried out, a BS considering such assignments may access the recorded information to determine the interference being (and/or expected to be being) caused on other BSs. FIG. 35 is an example of a possible such scenario.

As shown in FIG. 35, four UEs are currently in grid region 2 (i.e. G2), one UE is moving in grid region 6 (G6), and two more UEs are allocated in grid region 12 (G12). BS1 is the BS considering spectrum configuration and would look at the transmission parameters and the spectrum configuration under consideration and would come up with the best combination of the stored measurements from all these grid regions (G2, G6 and G12) to come up with the best estimation of expected interference on BS2 and BS3 based upon the current spectrum configuration and/or a prospective spectrum configuration following re-assignment. For example, BS1 would look at the result of measurements relating to G2 to determine the relevant expected interference level when only four UEs are in G2, and would similarly look at other results to determine the relevant expected interference level when one moving UE is present in G6 and two UEs are allocated in G12. BS1 could then, in the present example, sum the results for the three grid regions to come up with an estimation for the superposition of interferences which would be inflicted on BS2 and BS3 as a result of the current and/or prospective spectrum configuration C.

Seventh Approach:

A seventh approach is envisaged which, like the sixth approach, takes into account UEs. Such an approach is directed at being suitable to be carried out while the network (including the BSs and UEs) is fully operational. This may be advantageous if it is not desirable to adopt the measurement scheme of the sixth approach, which is performed before the network becomes fully operational.

The seventh approach can be understood by reference to FIGS. 36 and 37. Again, BS1, BS2 and BS3 are considered, with BS1 being the BS having UEs in its cell and being the BS considering a prospective re-assignment of spectrum.

Before the ST assignment is fully considered (ideally immediately beforehand), BS1 considers whether the potential spectrum configuration involves adding an extra amount of spectrum to the current amount of assigned spectrum (i.e. whether BS1 is due to gain or lose spectrum). This may be carried out by comparing the pre-re-assignment spectrum configuration with the prospective post-re-assignment spectrum configuration. BS1 then identifies which sub-channel(s) would be allocated to which UEs within that extra potential spectrum after the proposed ST spectrum re-assignment has been successfully completed.

BS1 then informs the other BSs (in this example, BS2 and BS3) that test transmissions are about to be made within the extra potential spectrum in order to cause those other BSs (BS2 and BS3) to go into a measurement and listening mode. BS1 then instructs the UEs in its cell to transmit test transmissions within specified sub-channels of the extra potential spectrum, with an assigned (or their current) modulation and coding scheme, and with an assigned power, as shown in FIG. 36. BS1 need not decode the information transmitted by the UEs within that extra potential spectrum.

BS2 and BS3, having been informed of the test transmissions, measure the interference rise as a result of the test transmissions and inform BS1 of the results of their measurements, as shown in FIG. 37. In this way, BS1 can effectively assess the potential effect of its prospective re-assignment of spectrum on BS2 and BS3.

Of course, before the prospective ST assignment is carried out, BS1 may attempt carry out the seventh approach several times, for example for different prospective re-assignments of spectrum (i.e. to understand the possible effects of other potential spectrum assignments and allocations of spectrum sub-chunks or sub-channels), and record the further related interference values.

FIG. 38 is a schematic diagram useful for summarising the possible communications between BSs and actions at the different BSs in the seventh approach. It is noted that signalling is required to carry out this seventh approach (and also in similar ways in the first to sixth approaches described above), however it is submitted that the required signalling overhead is negligible if the period of ST spectrum assignment is in the region of a couple of hundred milliseconds, or even in the region of a second.

It will be appreciated that any combination of the above seven approaches may be combined with any of Methods A to D to form embodiments of the present invention.

Accounting Processes

As mentioned above, it is envisaged that the present invention may extend to embodiments in which an account of spectrum re-assignments is made. Such an account may be useful for purely technical reasons, for example to identify trends in re-assignments. Such trends may be useful for streamlining the various methods and approaches of embodiments of the present invention, for example so that un-required, or uncommonly required, values and measurements and estimations are not involved unless necessary. This can have a beneficial effect of reduced processing time, reduced power consumption, and/or reduced required storage capacity. Further, in this way the signalling overhead related to the present invention can be reduced or even minimised.

A further benefit of such accounting can be that availability or utilisation of spectrum for some snapshots (groups) of spectrum negotiations (spectrum re-assignments) can be improved, as well as the associated experienced interference. Such a study of previous re-assignments can lead to an improvement in spectrum utilisation without necessarily increasing interference suffered.

A further possible use of such accounting may be to enable operators (operating different BSs) to trade in spectrum, and therefore to gain some financial benefit from spectrum re-assignments. Such trade can be automated by means of such an accounting process, for example by setting a number of parameters by which such trade may be governed.

FIG. 39 is a schematic diagram representing one possible accounting process that may be employed by embodiments of the present invention. As can be seen, BS1 and BS2 conduct a series of N negotiations, i.e. N re-assignments of spectrum between one another. The spectrum re-assigned after each such negotiation, or after the series of N negotiations, is recorded and reported back to a spectrum register. Such a spectrum register may be stored within the BSs, or within an external apparatus such as a higher network entity.

Each BS may have its own associated spectrum register, or a single shared register may be maintained. In the case that different operators operate the BSs, it may be beneficial for each BS to have its own spectrum register. Based on the register(s), it is possible to assess the aggregate amount of spectrum lent or borrowed, and therefore to control transfers of money between the two operators.

Performance Evaluation, and Simulation Results

It order to appreciate possible advantages of embodiments of the present invention, a number of simulations have been performed, and results of those simulations are presented in FIGS. 40A to 43B. For those simulations, it is assumed that the BSs employ Method C described above. Only BS1 and BS2 are considered and the impact of interference from other cells (BSs and served UEs) has been ignored.

Four different simulations are shown (corresponding to FIGS. 40 to 43, respectively), each having simulation results before spectrum re-assignment (FIGS. 40A, 41A, 42A, and 43A) and after re-assignment (FIGS. 40B, 41B, 42B, and 43B). Accordingly, the spectrum configurations of BS1 and BS2 change as a result of the re-assignments. The results shown in these Figures are snap-shots showing the experienced SIR and interference values inflicted on the other BS (Int2) before and after the re-assignments, and the bandwidth BW amounts used by those BSs. For the benefit of simplicity, is assumed that the entire available bandwidth is divided into 8 spectrum units for the purpose of such re-assignments. Each BS may use some or all of its allocated bandwidth at any time.

Looking now at FIGS. 40 to 43, each snap-shot graphically shows the spectrum currently used by each BS (which may the same as or less than its allocated spectrum) by a row of blobs each corresponding to one of the spectrum units. A value for the used bandwidth BW (from 0 to 8), and values for the experienced SIR and inflicted interference Int2 are also shown.

Looking at the entries for BS1, it is worth noting that the white spaces (in the overall spectrum assignments for BS 1) allocated to BS 1 may be controlled in time by its own RAN and spectrum-allocation policy. This enables an independent exploitation of spectrum availability feasible, especially in border cells. Adaptive channel coding rates for a data packet and radio node have been considered to enable the radio nodes to adjust their transmission rates and consequently the target SIR values. The BER requirements selected for the simulations is $10^{-3}$, and the use of a Reed-Muller channel code RM(1,m) is assumed. The coding rates (given as the ratio of two code rates) and the corresponding SIR target requirements used for the simulations are shown below in Table 1.

TABLE 1

Code Rates of Reed-Muller Code RM (1, m) and
Corresponding SIR Requirements for Target BER

| m | Code Rate | SIR (dB) |
|---|---|---|
| 2 | 0.75 | 6 |
| 3 | 0.5 | 5.15 |
| 4 | 0.3125 | 4.6 |
| 5 | 0.1875 | 4.1 |
| 6 | 0.1094 | 3.75 |
| 7 | 0.0625 | 3.45 |
| 8 | 0.0352 | 3.2 |

TABLE 1-continued

Code Rates of Reed-Muller Code RM (1, m) and
Corresponding SIR Requirements for Target BER

| m | Code Rate | SIR (dB) |
|---|---|---|
| 9 | 0.0195 | 3.1 |
| 10 | 0.0107 | 2.8 |

Turning now to the individual simulations, in the re-assignment from FIG. 40A to FIG. 40B, it can be seen that the white space (i.e. the non-used spectrum) has been exploited by BS2 to provide better bandwidth (i.e. improved from 5 spectrum units to 6 spectrum units). Additionally, both BS1 and BS2 have improved their SIR and have reduced the interference they inflict on each other. This shows an overlap in allocation, i.e. 3+6=9 which is >8.

In the re-assignment from FIG. 41A to FIG. 41B, it can be seen that BS2 has again gained bandwidth (i.e. improved from 6 spectrum units to 7 spectrum units). Additionally, both BS1 and BS2 have improved their SIR and have reduced the interference they inflict on each other.

Similarly, in the re-assignment from FIG. 42A to FIG. 42B, it can be seen that BS2 has again gained bandwidth (i.e. improved from 3 spectrum units to 5 spectrum units). Additionally, both BS1 and BS2 have improved their SIR and have reduced the interference they inflict on each other.

In the re-assignment from FIG. 43A to FIG. 43B, it can be seen that BS2 has doubled its bandwidth (i.e. improved from 3 spectrum units to 6 spectrum units). Additionally, both BS1 and BS2 have improved their SIR and have reduced the interference they inflict on each other.

In general, the simulations show BS2 progressively exploiting the white spaces available to BS1. This is why the bandwidth BW used by BS1 does not reduce as a result of the re-assignments.

Figure 44B:
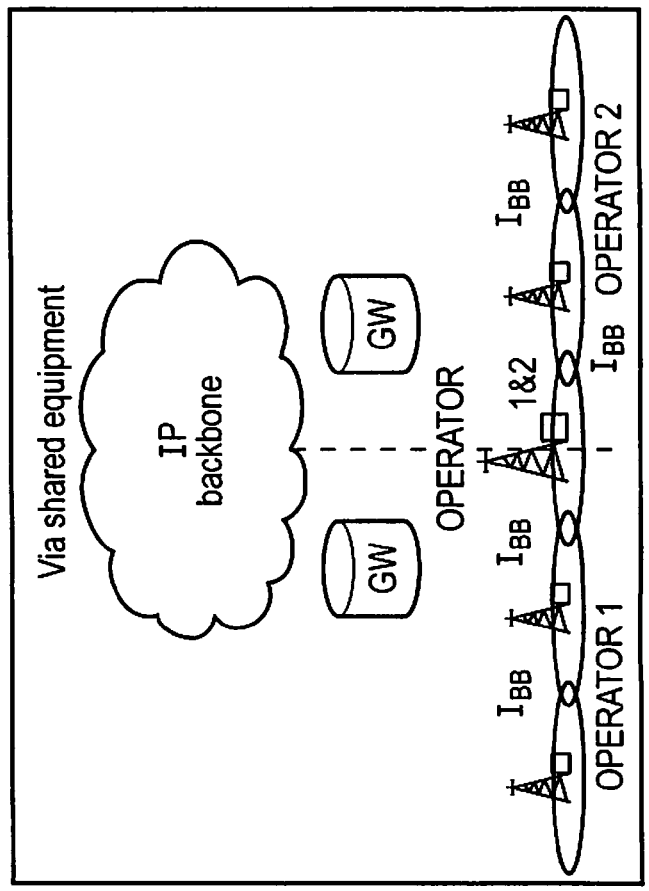
Figure 44A:
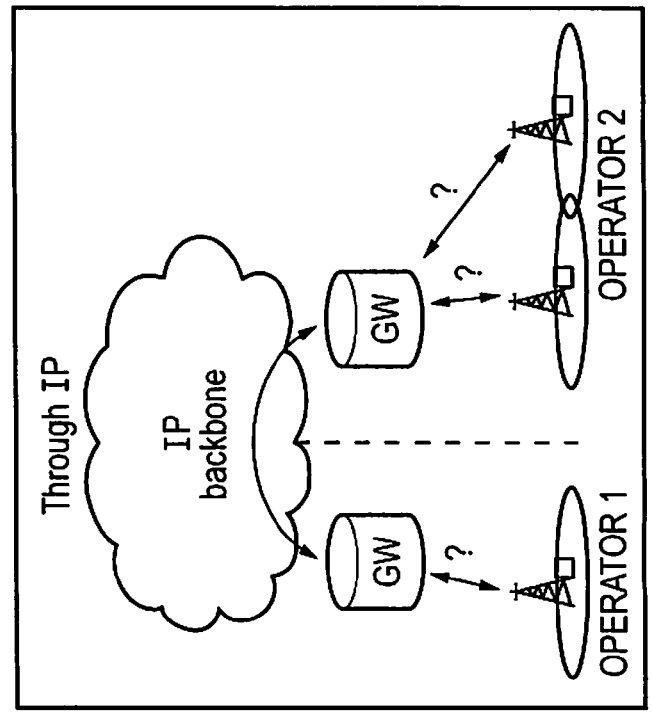
Figure 45A:
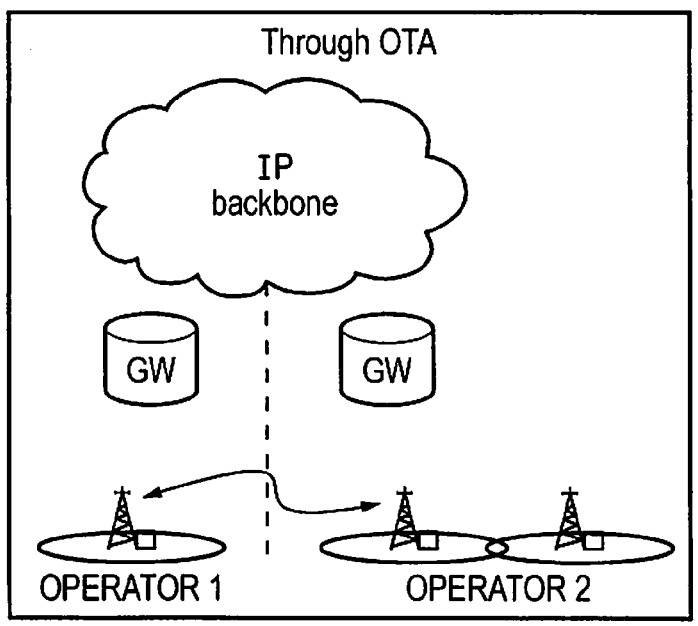
Figure 45B:
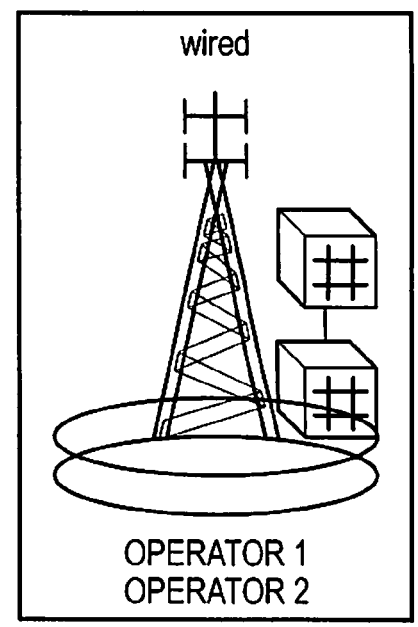

As mentioned above, BSs may communicate with one another in a number of different ways. FIGS. 44 and 45 are schematic diagrams useful for understanding a few such possible ways. In FIG. 44(A), BSs are able to communicate with one another via their respective GWs (assuming they belong to different RANs), and thus via an IP network known as an IP backbone. In FIG. 44(B), BSs belonging to different RANs are able to communicate with one another via shared equipment, for example via a shared intermediate BS or other radio transceiver. In FIG. 45(A), BSs are able to communicate with one another using Over The Air (OTA) communications, for example using radio or microwave links. In FIG. 45(B), BSs are able to communicate with one another using wired links, which may be most useful when they are in close proximity with one another, for example effectively co-located.

The above aspects may be considered to be semi-blind techniques, and may be considered to have the following benefits. The techniques enable exploitation of temporary availability of redundant spectrum (i.e. fine tuning) on a localized basis, for example in so-called hot spots, while still allowing the overall spectrum allocation in each BS over a longer term to be controlled by a higher entity (e.g. a GW) on an independent basis. The selfish techniques enable two BSs in a hot spot to exchange spectrum in an efficient way when, due to the arrangement of directional antennas, the two cells of interest have the highest impact on each other and a negligible impact on or from other cells. Also provided are two considerate techniques for performing short-term spectrum re-assignment with some degree of coordination between the involved BSs. Also provided are signalling methods and mechanisms for implementing embodiments of the present invention. Consideration is made as to how to jointly improve spectrum utilization and reduce interference (inflicted and/or suffered). Techniques for assessing a "best" ST re-assignment from a number of candidates such re-assignments are explored. The disclosed techniques also provide a procedure to monitor in one BS the assignment being performed or proposed by another BS. These procedures are provided in an independent (i.e. non-overlapped in time) form and thus may be combined in any way.

Embodiments of the present invention jointly improve spectrum utilization and interference levels in a mobile wireless network. Spectrum availability is exploited on a short-term basis. This enables an improvement in QoS, overall network coverage and throughput, and revenue for the lending party by making sure that radio resource is available when needed in peak times. In this way, an extra source of income for operators can be generated, as the lending party can make sure that redundant radio spectrum is not wasted and is made available to be employed in an efficient way. This can reduces potential call blockage, especially at cell edges.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A spectrum-assignment method for use in a wireless communication system, the system comprising at least first and second communication apparatuses each having a portion of communication spectrum pre-assigned to it for communication, the method comprising:
on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses;
for each such re-assignment, selecting a spectrum configuration to be adopted in dependence upon one or more indicators of the at least one indicator;
identifying a plurality of candidate configurations for such selection;
selecting the configuration to be adopted from the plurality of candidate configurations; and
identifying the plurality of candidate configurations by identifying a first such candidate configuration and identifying the further candidate configuration(s) by carrying out an iterative process on the first candidate configuration.

2. A spectrum-assignment method as claimed in claim 1, wherein such control is carried out within one of the first and second apparatuses or collectively between the first and second apparatuses.

3. A spectrum-assignment method as claimed in claim 1, wherein such control is carried out based upon negotiations between the first and second communication apparatuses.

4. A spectrum-assignment method as claimed in claim 1, wherein one or more indicators of the at least one said indicator is indicative of interference expected to be suffered by one or both of the first and second communication apparatuses as a result of such re-assignments.

5. A spectrum-assignment method as claimed in claim 1, wherein one or more indicators of the at least one said indicator is indicative of interference expected to be inflicted by one or both of the first and second communication apparatuses as a result of such re-assignments.

6. A spectrum-assignment method as claimed in claim 1, comprising carrying out at least one such re-assignment in response to a trigger.

7. A spectrum-assignment method as claimed in claim 6, wherein said trigger comprises a request for spectrum from one of the first and second communication apparatuses.

8. A spectrum-assignment method as claimed in claim 6, wherein said trigger comprises an offer of spectrum from one of the first and second communication apparatuses.

9. A spectrum-assignment method as claimed in claim 6, wherein said trigger comprises an overload in data to be transmitted by one of said communication apparatuses.

10. A spectrum-assignment method as claimed in claim 6, wherein said trigger comprises an excessive level of interference suffered by one of said communication apparatuses.

11. A spectrum-assignment method as claimed in claim 1, comprising obtaining the or each interference indicator by carrying out a measurement or an estimation between the first and second communication apparatuses.

12. A spectrum-assignment method as claimed in claim 11, comprising obtaining the or each interference indicator during a configuration phase and prior to an operation phase during which said re-assignments are controlled.

13. A spectrum-assignment method as claimed in claim 11, comprising obtaining the or each interference indicator during an operation phase during which said re-assignments are controlled.

14. A spectrum-assignment method for use in a wireless communication system, the system comprising at least first and second communication apparatuses each having a portion of communication spectrum pre-assigned to it for communication, the method comprising:
on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses;
for each such re-assignment, selecting a spectrum configuration to be adopted in dependence upon one or more indicators of the at least one indicator;
identifying a plurality of candidate configurations for such selection;
selecting the configuration to be adopted from the plurality of candidate configurations; and
carrying out said selecting by considering the candidate configurations in an order, and selecting the first such candidate portion meeting a predetermined requirement.

15. A spectrum-assignment method for use in a wireless communication system, the system comprising at least first and second communication apparatuses each having a portion of communication spectrum pre-assigned to it for communication, the method comprising:
on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses;

for each such re-assignment, selecting a spectrum configuration to be adopted in dependence upon one or more indicators of the at least one indicator;

identifying a plurality of candidate configurations for such selection;

selecting the configuration to be adopted from the plurality of candidate configurations; and carrying out said selecting by considering all of the candidate configurations and selecting the candidate configuration most favorable to the first and/or second communication apparatus.

16. A spectrum-assignment method for use in a wireless communication system, the system comprising at least first and second communication apparatuses each having a portion of communication spectrum pre-assigned to it for communication, the method comprising:

on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses;

for each such re-assignment, selecting a spectrum configuration to be adopted in dependence upon the or at least one said indicator;

for each such re-assignment, carrying out said selecting in the one of the first and second communication apparatuses that is to be an assignee of spectrum for that re-assignment or in the one of the first and second communication apparatuses that is to be an assignor of spectrum for that re-assignment; and for each such re-assignment, basing such selection on one or more of:

the expected change in bandwidth for the potential assignee or assignor as a result of the re-assignment;

the interference expected to be suffered by the potential assignee or assignor as a result of the re-assignment; and the interference expected to be inflicted by the potential assignee or assignor as a result of the re-assignment.

17. A spectrum-assignment method for use in a wireless communication system, the system comprising at least first and second communication apparatuses each having a portion of communication spectrum pre-assigned to it for communication, the method comprising:

on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses, wherein such re-assignments are initially prospective assignments, and wherein the control comprises considering the prospective re-assignments and deciding whether or not to approve those prospective re-assignments.

18. A spectrum-assignment method as claimed in claim 17, comprising, for each such prospective re-assignment:

selecting a spectrum configuration to be adopted; and deciding whether or not to approve the selected configuration.

19. A spectrum-assignment method as claimed in claim 18, further comprising, for each such prospective re-assignment, deciding whether or not to approve the selected configuration in dependence upon the or at least one said indicator.

20. A spectrum-assignment method as claimed in claim 18, comprising carrying out said deciding by determining whether the selected configuration meets a predetermined requirement.

21. A spectrum-assignment method as claimed in claim 18, comprising, for each such re-assignment, carrying out said deciding in the one of the first and second communication apparatuses that is to be an assignee of spectrum for that re-assignment or in the one of the first and second communication apparatuses that is to be an assignor of spectrum for that re-assignment.

22. A spectrum-assignment method as claimed in claim 21, comprising, for each such re-assignment, basing such decision on one or more of:

the expected change in bandwidth for the potential assignee as a result of the re-assignment;

the interference expected to be suffered by the potential assignee as a result of the re-assignment; and the interference expected to be inflicted by the potential assignee as a result of the re-assignment.

23. A spectrum-assignment method as claimed in claim 21, comprising, for each such re-assignment, basing such decision on one or more of:

the expected change in bandwidth for the potential assignor as a result of the re-assignment;

the interference expected to be suffered by the potential assignor as a result of the re-assignment; and the interference expected to be inflicted by the potential assignor as a result of the re-assignment.

24. A spectrum-assignment method for use in a wireless communication system, the system comprising at least first and second communication apparatuses each having a portion of communication spectrum pre-assigned to it for communication, the method comprising:

on a dynamic basis, controlling re-assignments of said spectrum between the first and second communication apparatuses in dependence upon spectrum requirements of those apparatuses and at least one indicator indicative of interference expected to result from such re-assignments, so as to tend to improve spectrum utilization between those communication apparatuses;

obtaining the at least one interference indicator by carrying out a measurement or an estimation between the first and second communication apparatuses;

for each such re-assignment, selecting a spectrum configuration to be adopted in dependence upon one or more indicators of the at least one said indicator;

wherein a plurality of candidate configurations are identified for such selection, an interference indicator is obtained in respect of each candidate spectrum configuration, and the configuration to be adopted is selected from the plurality of candidate configurations; and obtaining a said interference indicator in respect of one of the candidate spectrum configurations by measurement, and obtaining the interference indicator in respect of the or each other spectrum configuration by estimation based on the measured interference indicator.

25. A wireless communication system, comprising:

at least first and second communication apparatuses each operable to have a portion of communication spectrum pre-assigned to it for communication; and a controller configured, on a dynamic basis, to control re-assignments of said spectrum between the first and second communication apparatuses in dependence upon spectrum requirements of those apparatuses and at least one indicator indicative of interference expected to result from such re-assignments, so as to tend to improve spectrum utilization between those apparatuses, wherein such re-assignments are initially prospective assignments, and wherein the control comprises considering the prospective re-assignments and deciding whether or not to approve those prospective re-assignments.

26. A communication apparatus for use as a first communication apparatus in a wireless communication system further comprising at least a second such communication apparatus, the communication apparatuses each being operable to have a portion of communication spectrum pre-assigned to it for communication, the claimed first communication apparatus comprising:

a controller configured, on a dynamic basis and optionally in conjunction with the second communication apparatus, to control re-assignments of said spectrum between the first and second communication apparatuses in dependence upon spectrum requirements of those apparatuses and at least one indicator indicative of interference expected to result from such re-assignments, so as to tend to improve spectrum utilization between those apparatuses, wherein such re-assignments are initially prospective assignments, and wherein the control comprises considering the prospective re-assignments and deciding whether or not to approve those prospective re-assignments.

27. A spectrum-assignment method for use in a first communication apparatus of a wireless communication system further comprising at least a second such communication apparatus, the communication apparatuses each being operable to have a portion of communication spectrum pre-assigned to it for communication, the method comprising:

on a dynamic basis and optionally in conjunction with the second communication apparatus, controlling re-assignments of said spectrum between the first and second communication apparatuses in dependence upon spectrum requirements of those apparatuses and at least one indicator indicative of interference expected to result from such re-assignments, so as to tend to improve spectrum utilization between those apparatuses, wherein such re-assignments are initially prospective assignments, and wherein the controlling comprises considering the prospective re-assignments and deciding whether or not to approve those prospective re-assignments.

* * * * *